(12) United States Patent
Lee

(10) Patent No.: US 8,490,137 B2
(45) Date of Patent: Jul. 16, 2013

(54) IMAGE DISPLAY APPARATUS AND METHOD OF OPERATING THE SAME

(75) Inventor: Changgi Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/044,331

(22) Filed: Mar. 9, 2011

(65) Prior Publication Data

US 2012/0120316 A1    May 17, 2012

(30) Foreign Application Priority Data

Nov. 15, 2010    (KR) .................. 10-2010-0113363

(51) Int. Cl.
*G06F 13/00* (2006.01)
*G06F 3/00* (2006.01)

(52) U.S. Cl.
USPC .................................. 725/52; 725/43; 725/44

(58) Field of Classification Search
USPC ......................................... 725/38, 43, 44, 52
See application file for complete search history.

(56) References Cited

U.S. PATENT DOCUMENTS 8,156,526 B2 *   4/2012   Lee .................................. 725/44

| | | | |
|---|---|---|---|
| 2006/0150215 A1* | 7/2006 | Wroblewski | 725/47 |
| 2006/0184966 A1 | 8/2006 | Hunleth et al. | |
| 2009/0138922 A1* | 5/2009 | Thomas et al. | 725/87 |
| 2009/0144775 A1* | 6/2009 | Rosin et al. | 725/44 |
| 2010/0120470 A1 | 5/2010 | Kim et al. | |

FOREIGN PATENT DOCUMENTS

EP    2 141 574 A2    1/2010

OTHER PUBLICATIONS

European Search Report dated Mar. 12, 2012.

* cited by examiner

*Primary Examiner* — Hunter B Lonsberry
(74) *Attorney, Agent, or Firm* — KED & Associates, LLP

(57) ABSTRACT

An image display apparatus and a method for operating the same are disclosed. An image display apparatus as embodied and broadly disclosed herein may include a video image displayed in a first area of the display module. A first and second card objects may be displayed in a second and third areas of the display module. The first and second card objects may include at least one link for connecting to a content provider or to a storage device or at least one link for retrieving the video image. The first or second card objects may be scrolled across the display module to cause a third card object to be scrolled onto the display. The third card object may be displayed in the second or third areas of the display if the third card object is scrolled onto the display module a prescribed amount.

19 Claims, 53 Drawing Sheets

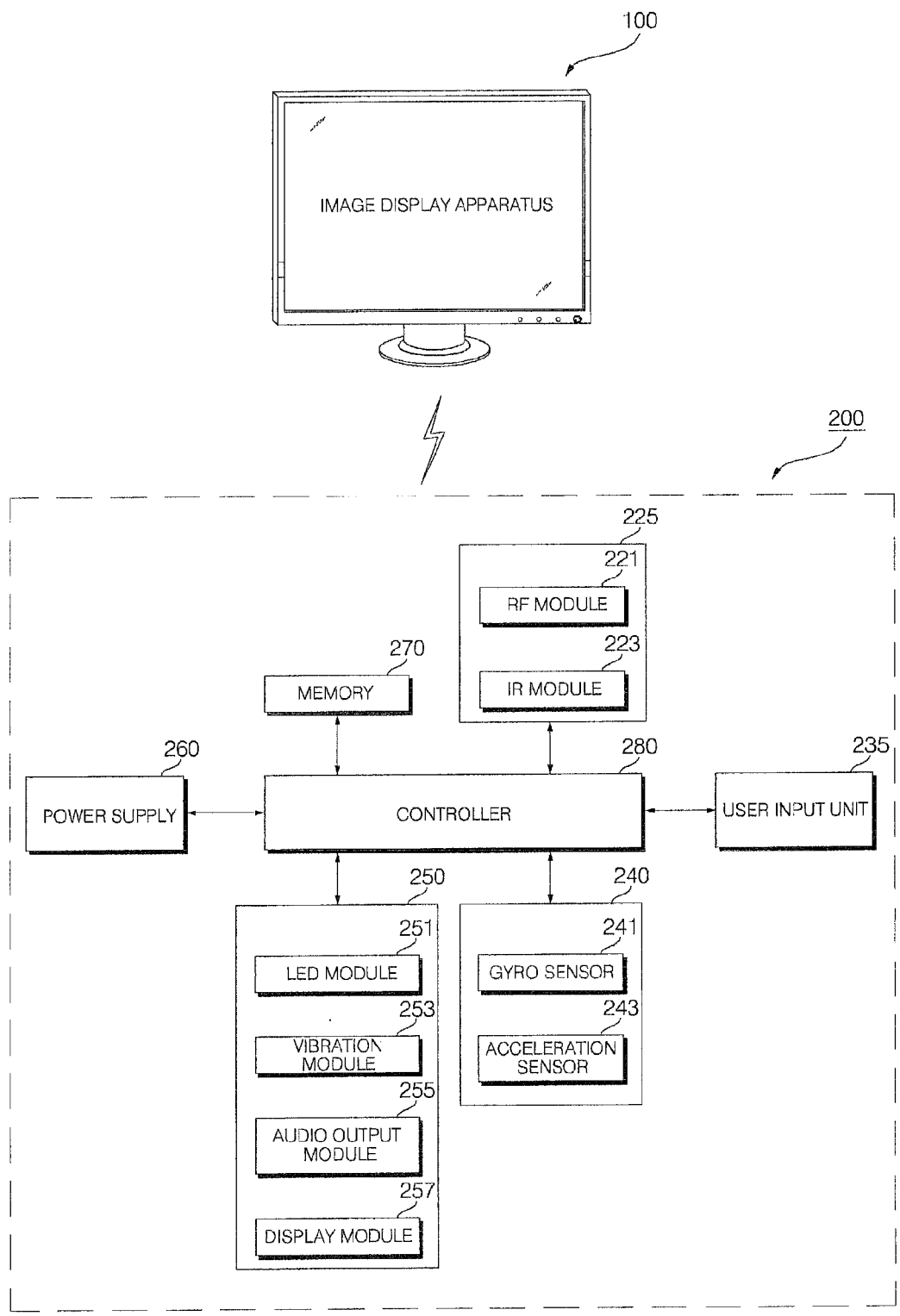

(a)        (b)

(a)        (b)

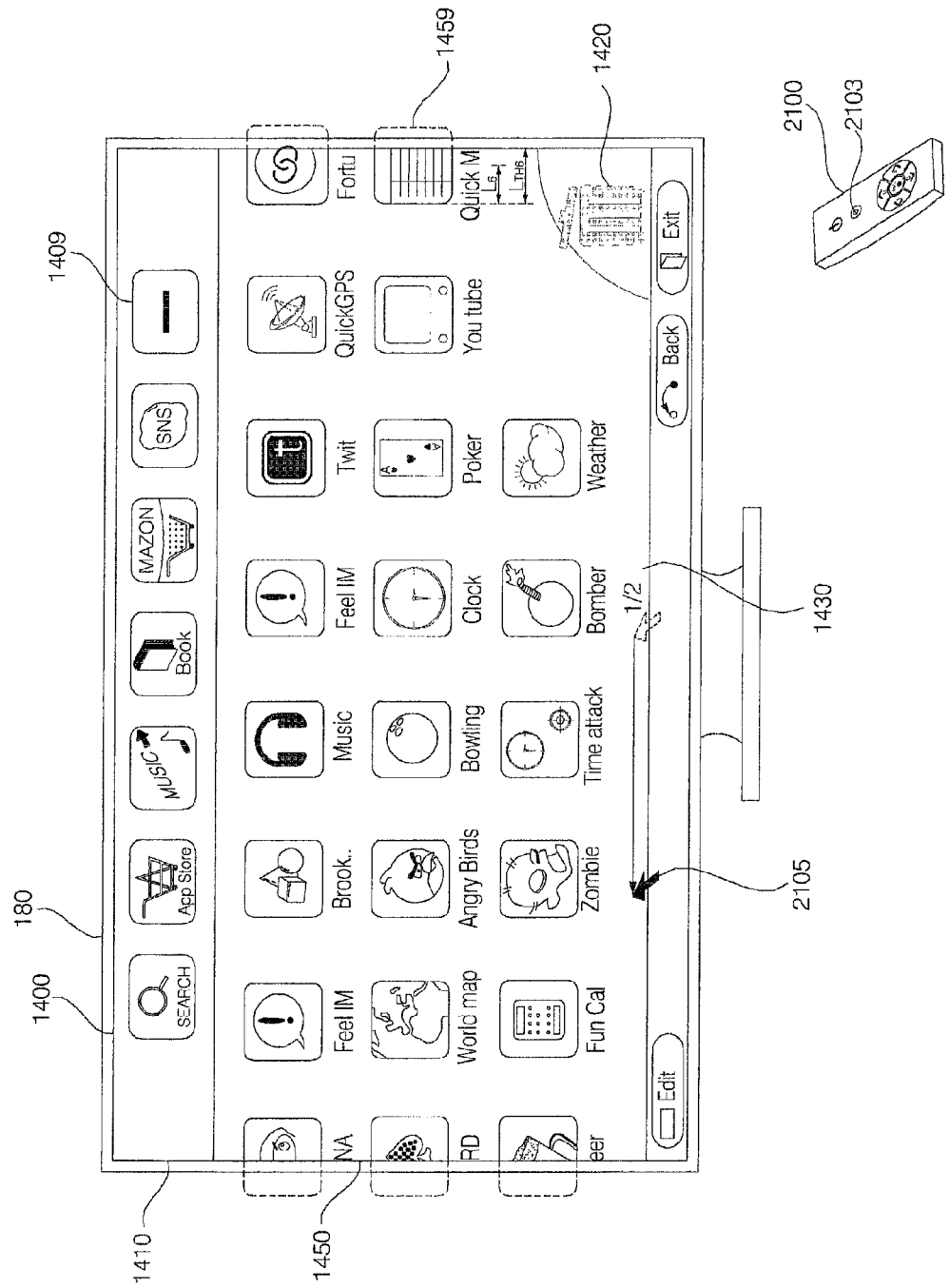

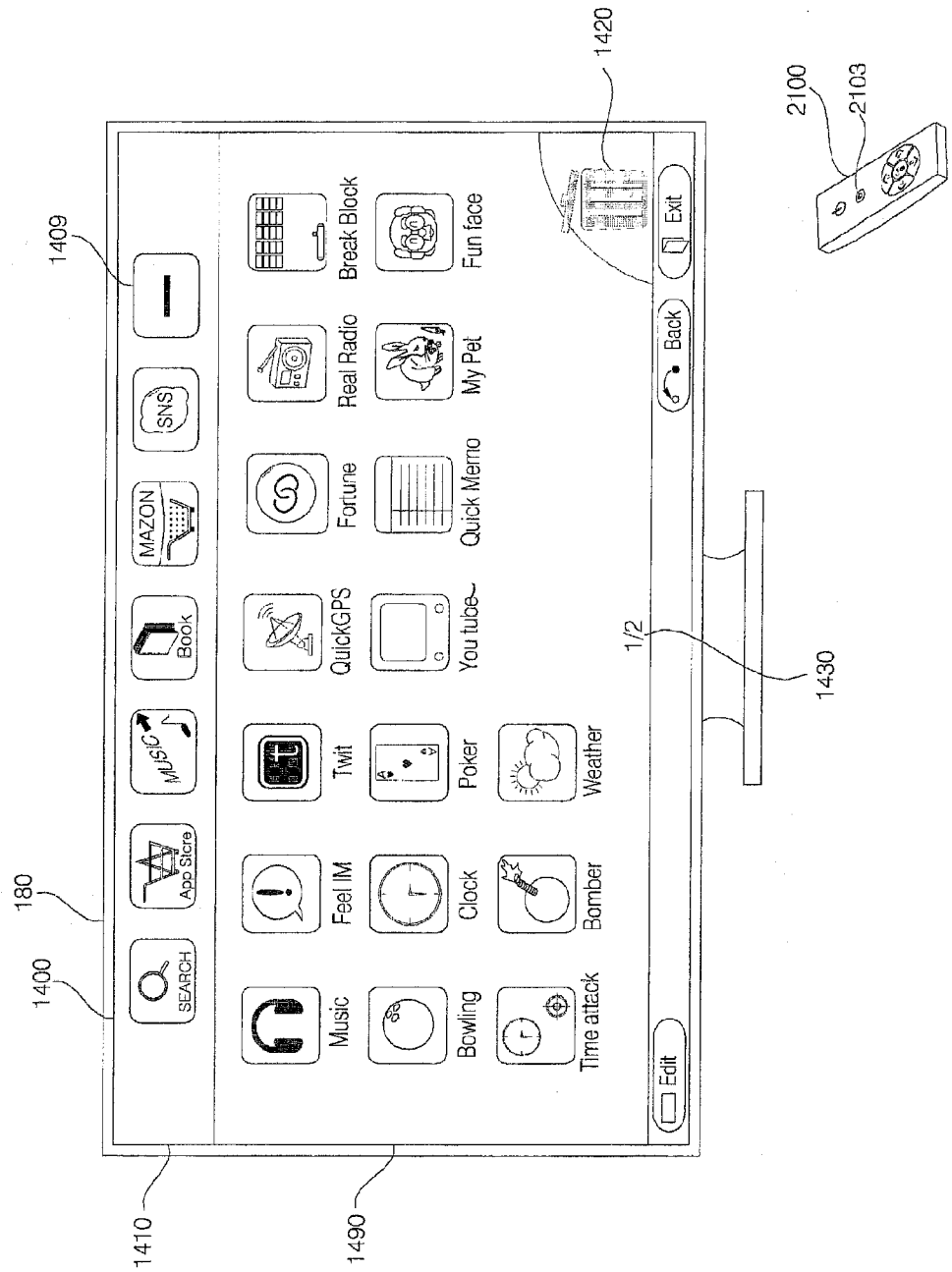

IMAGE DISPLAY APPARATUS AND METHOD OF OPERATING THE SAME

CROSS-REFERENCE TO RELATED APPLICATION

This application claims the benefit of Korean Patent Application No. 10-2010-0113363, filed in Korea on Nov. 15, 2010 in the Korean Intellectual Property Office, the disclosure of which is incorporated herein by reference.

BACKGROUND

1. Field

An image display apparatus and a method of operating the same are disclosed herein.

2. Background

Image display apparatuses and methods of operating the same are known. However, they suffer from various disadvantages.

BRIEF DESCRIPTION OF THE DRAWINGS

The embodiments will be described in detail with reference to the following drawings in which like reference numerals refer to like elements wherein:

FIG. 14 is a block diagram of a remote controller according to an embodiment of the present disclosure;

FIGS. 27A to 27D show a display screen to illustrate scrolling through an application list according to an embodiment.

DETAILED DESCRIPTION

Figure 1:
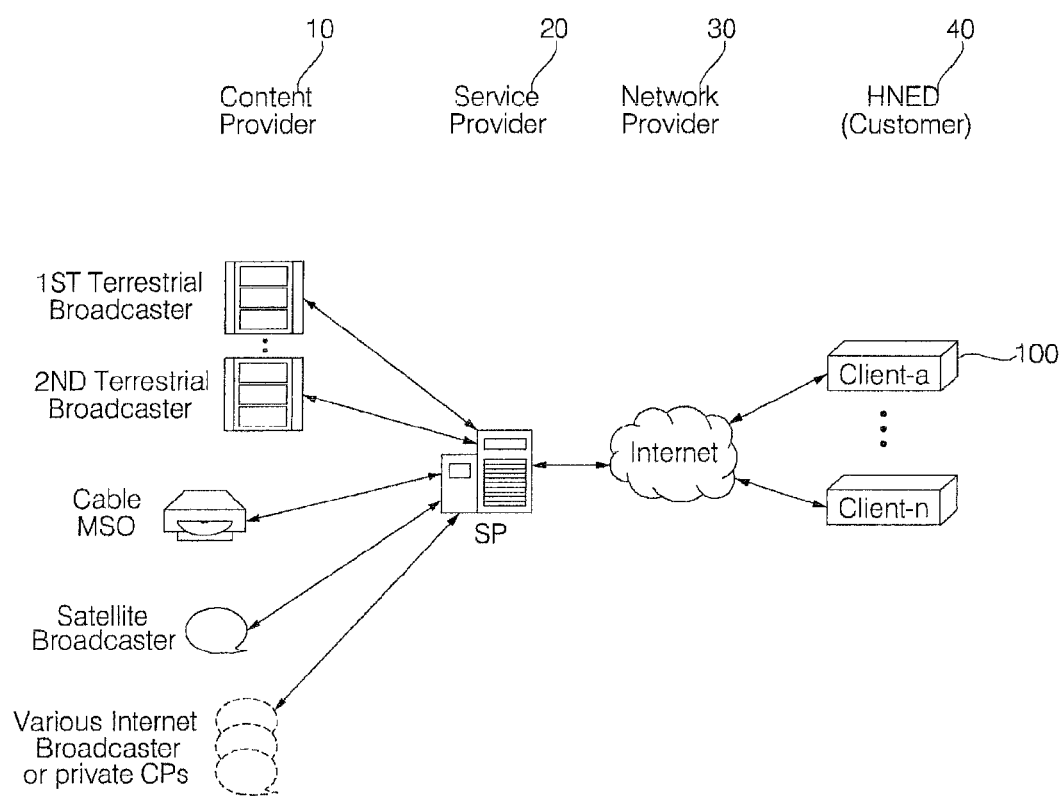
FIG. 1 is a diagram of a configuration of a broadcasting system that includes an image display apparatus according to an embodiment of the present disclosure.

The present invention relates to an image display apparatus and a method for operating the same, and more particularly, to an image display apparatus and a method for operating the same, which may increase user convenience.

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

Therefore, the present invention has been made in view of the above problems, and it is an object of the present invention to provide an image display apparatus and a method for operating the same, which can increase user convenience.

It is another object of the present invention to provide an image display apparatus and a method for operating the same, which can easily acquire desired information, set a screen configuration on a user account basis, and provide various user interfaces.

In accordance with an aspect of the present invention, the above and other objects can be accomplished by the provision of a method for operating an image display apparatus, including acquiring user account authentication information, performing a login operation using a user account corresponding to the acquired authentication information, receiving an account-based environmental setting input for screen configuration information of the user account, and storing the account-based environmental setting input in a memory in a state of being divided according to user accounts.

In accordance with another aspect of the present invention, there is provided a method for operating an image display apparatus, including displaying a screen, acquiring user account authentication information, performing a login operation using a user account based on the acquired user account authentication information, entering an edit mode of the screen, receiving an input for changing a screen configuration, and storing the input for changing the screen configuration in a memory.

In accordance with a further aspect of the present invention, there is provided a method for operating an image display apparatus, including displaying a screen, acquiring user account authentication information, performing a login operation using a user account based on the acquired user account authentication information, and switching the screen to a screen corresponding to environmental setting of the user account and displaying the switched screen.

According to the embodiment of the present invention, it is possible to set various screen configurations on a user account basis. Accordingly, it is possible to set a screen configuration according to user preference and to readily obtain a variety of information. Thus, user convenience is increased.

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, it is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

FIG. 1 is a diagram of a configuration of a broadcasting system that includes an image display apparatus according to an embodiment of the present disclosure. Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment. The image display apparatus may be a network TV, a smart TV, an Internet Protocol TV (IPTV), etc.

The CP 10 may create and provide content. The CP 10 may be, for example, a terrestrial broadcaster, a cable System Operator (SO) or Multiple System Operator (MSO), a satellite broadcaster, an Internet broadcaster, as illustrated in FIG. 1, or another appropriate content provider. Besides broadcast content, the CP 10 may also provide various applications.

The SP 20 may provide content received from the CP 10 in a service package. For instance, the SP 20 may package a first terrestrial broadcasting, second terrestrial broadcasting, cable broadcasting, satellite broadcasting, Internet broadcasting, and/or applications and may provide the package to users. The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server may transmit the data to a single receiver.

Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service may be provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
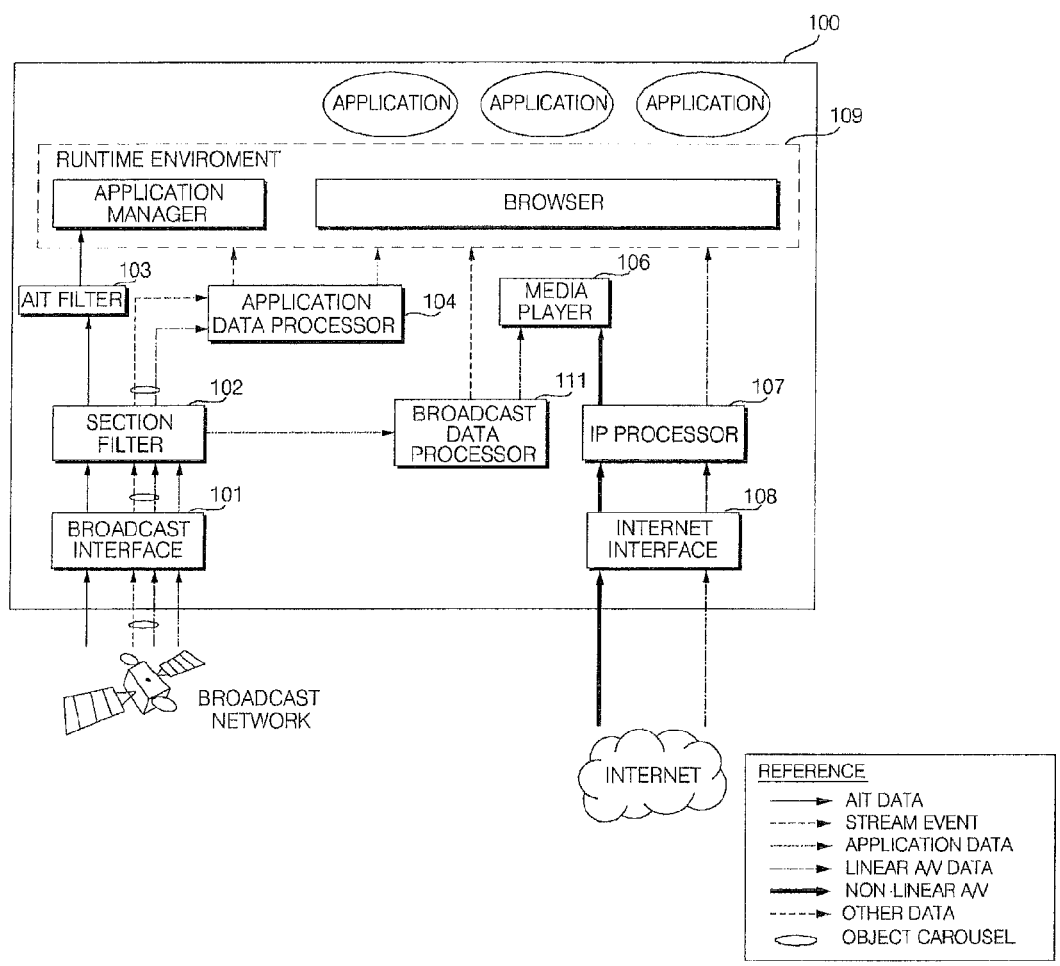
FIG. 2 shows a broadcasting system including an image display apparatus according to another embodiment of the present disclosure.

FIG. 2 shows a broadcasting system including an image display apparatus according to another embodiment of the present disclosure. Referring to FIG. 2, the image display apparatus 100 may be connected to a broadcast network and the Internet. The image display apparatus 100 may be, for example, a network TV, a smart TV, an HbbTV, or another appropriate multifunctional display device. The image display apparatus 100 may include, for example, a broadcast interface 101, a section filter 102, an Application Information Table (AIT) filter 103, an application data processor 104, a broadcast data processor 111, a media player 106, an IP processor 107, an Internet interface 108, and a runtime module 109. The image display apparatus 100 may receive AIT data, real-time broadcast content, application data, and stream events through the broadcast interface 101. The real-time broadcast content may be referred to as a linear Audio/Video (A/V) content.

The section filter 102 may perform section filtering on the four types of data received through the broadcast interface 101. The section filter 102 may output the AIT data to the AIT filter 103, the linear A/V content to the broadcast data processor 111, and the stream events and application data to the application data processor 104.

Meanwhile, the image display apparatus 100 may receive non-linear A/V content and application data through the Internet interface 108. The non-linear A/V content may be, for example, a Content On Demand (CoD) application. The non-linear A/V content and the application data may be transmitted to the media player 106 and the runtime module 109, respectively. The runtime module 109 may include, for example, an application manager and a browser as illustrated in FIG. 2. The application manager controls the life cycle of an interactive application using the AIT data, for example. The browser displays and processes the interactive application.

Figure 3:
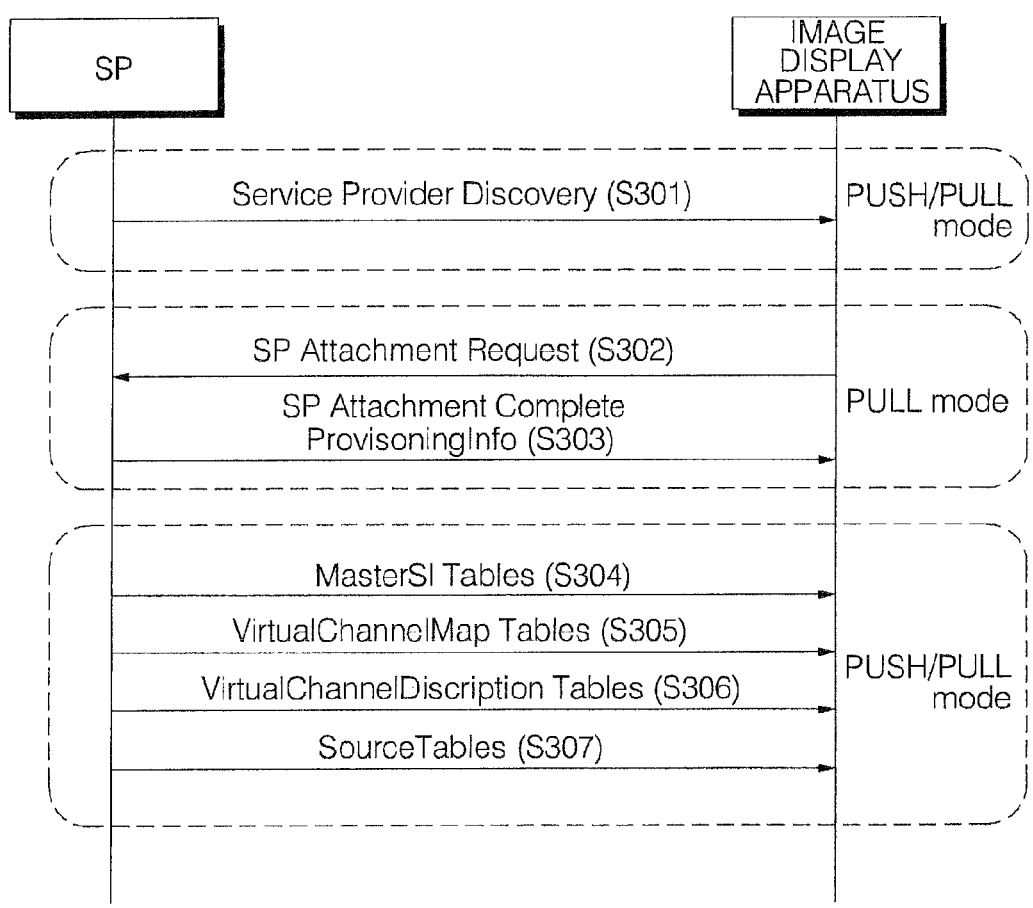
FIG. 3 is a diagram illustrating a signal flow between a Service Provider (SP) and an image display apparatus of FIG. 1 or 2, according to an embodiment of the present disclosure.

FIG. 3 illustrates an operation for connecting to an SP and receiving channel information from the SP in the image display apparatus of FIG. 1 or 2. Referring to FIG. 3, an SP may perform an SP Discovery operation (S301) and the image display apparatus may transmit a Service Provider Attachment Request signal to the SP (S302). Upon completion of attachment to the SP, the image display apparatus may receive provisioning information from the SP (S303). Further, the image display apparatus may receive Master System Information (SI) Tables, Virtual Channel Map Tables, Virtual Channel Description Tables, and Source Tables from the SP (S304 to S307). More specifically, SP Discovery is a process by which SPs that provide IPTV services may search for Service Discovery (SD) servers having information about the offerings of the SPs.

In order to receive information about the SD servers, an SD server address list can be detected, for example, using three methods. Specifically, the SD server address list may be obtained by an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record may include information needed to perform Service Discovery on an SP basis. The image display apparatus may then start a Service Discovery operation using the SP Discovery record. These operations can be performed in a push mode or a pull mode.

The image display apparatus may access an SP attachment server specified by an SP attachment locator included in the SP Discovery record and performs a registration procedure (or a service attachment procedure). Further, after accessing an authentication service server of an SP specified by an SP authentication locator and performing an authentication procedure, the image display apparatus may perform a service authentication procedure. After service attachment is successfully performed, a server may transmit data in the form of a provision information table to the image display apparatus.

During service attachment, the image display apparatus may include an Identifier (ID) and location information thereof in data, and transmit the data to the service attachment server. Thus, the service attachment server may specify a service that the image display apparatus has subscribed to based on the ID and location information. In addition, the service attachment server may provide, in the form of a provisioning information table, address information from which the image display apparatus can obtain Service Information (SI). The address information may correspond to access information about a Master SI Table. This method facilitates provisioning of a customized service to each subscriber.

The SI may be divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
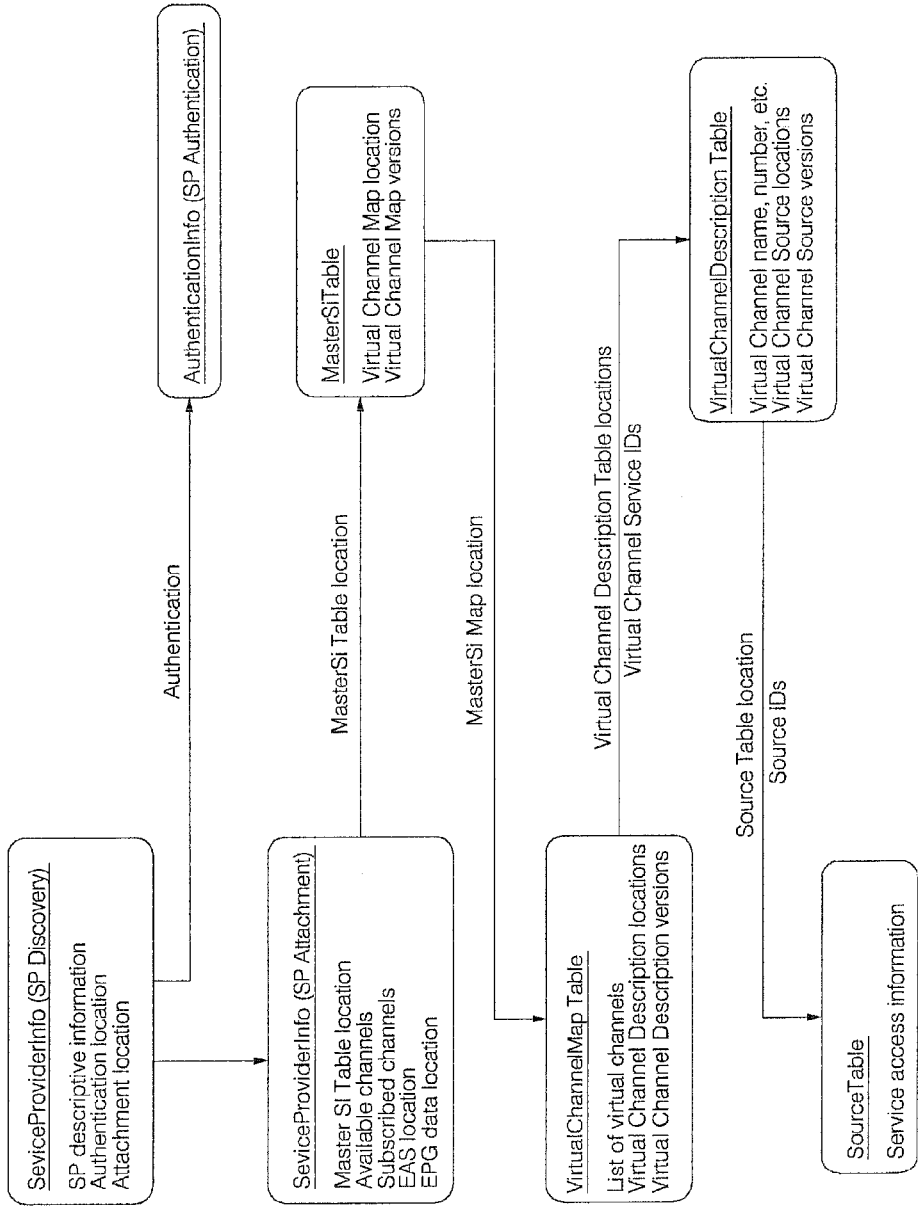
FIG. 4 illustrates data accessed during the operation of FIG. 3.

FIG. 4 illustrates an example of data used in the signal flow illustrated in FIG. 3, and a relationship among data in the SI. Referring to FIG. 4, a Master SI Table may contain information about the location and version of each Virtual Channel MAP. Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. Hence, a change in any lower table may lead to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus, it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table may be delivered in four logically separate flows, in a push mode or a pull mode. For version management, the Master SI Table may be multicast, and thus, a version change may be monitored by receiving a multicast stream of the Master SI Table.

Figure 5:
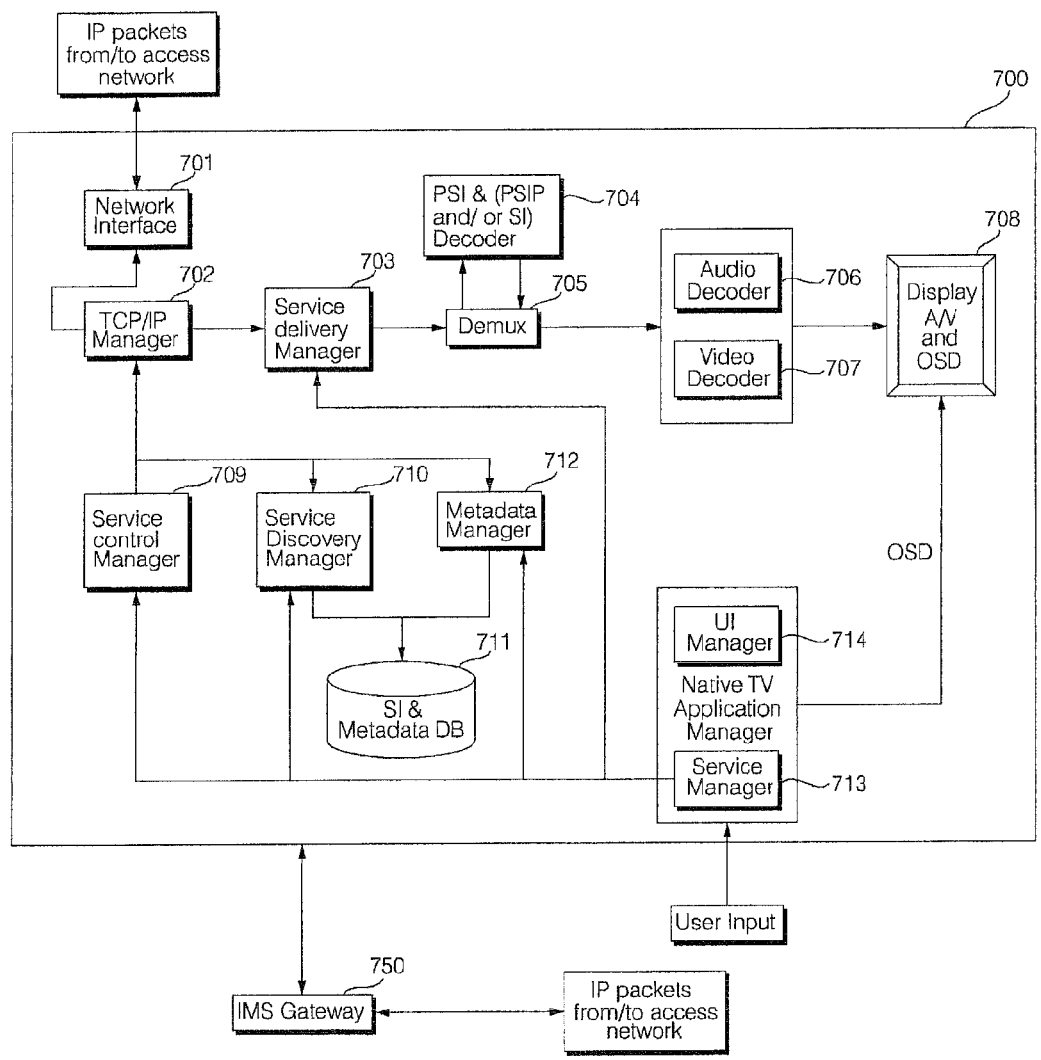
FIG. 5 is a block diagram of an image display apparatus according to an embodiment of the present disclosure.

FIG. 5 is a detailed block diagram of the image display apparatus of FIG. 1 or 2 according to an embodiment of the present disclosure. Referring to FIG. 5, an image display apparatus 700 may includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata DataBase (DB) 711, a User Interface (UI) manager 714, a service manager 713, or another appropriate component based on the application of the display apparatus.

The network interface 701 may transmit packets to and receives packets from a network. Specifically, the network interface 701 may receive services and content from an SP over the network.

The TCP/IP manager 702 is involved in packet reception and transmission of the image display apparatus 700, that is, packet delivery from a source to a destination. The TCP/IP manager 702 may classify received packets according to appropriate protocols and may output the classified packets to the service delivery manager 705, the service discovery manager 710, the service control manager 709, and/or the metadata manager 712.

The service delivery manager 703 may control received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 may parse the received real-time streaming data using RTP and output the parsed real-time streaming data to the DEMUX 705. The service deliver manager 703 may also store the parsed real-time streaming data in the SI & metadata DB 711 under the control of the service manager 713. In addition, the service delivery manager 703 may feed back network reception information to a server that provides the real-time streaming data service using RTCP.

The DEMUX 705 may demultiplex a received packet into audio data, video data, and PSI data and outputs the audio data, video data, and PSI data to the audio decoder 706, the video decoder 707, and the PSI & (PSIP and/or SI) decoder 704, respectively.

The PSI & (PSIP and/or SI) decoder 704 may decode SI such as PSI. More specifically, the PSI & (PSIP and/or SI) decoder 704 may decode PSI sections, PSIP sections, or SI sections received from the DEMUX 705. The PSI & (PSIP and/or SI) decoder 704 may construct an SI DB by decoding the received sections and may store the SI DB in the SI & metadata DB 711.

The audio decoder 706 and the video decoder 707 may decode the audio data and the video data received from the DEMUX 705 and may output the decoded audio and video data through the display A/V and OSD module 708.

The UI manager 714 and the service manager 713 may manage the overall state of the image display apparatus 700, provide UIs, and manage other managers. The UI manager 714 may provide a Graphical User Interface (GUI) in the form of an OSD and may perform a reception operation corresponding to a key input received from the user. For example, upon receipt of a key input signal regarding channel selection from the user, the UI manager 714 may transmit the key input signal to the service manager 713.

The service manager 713 may control managers associated with services, such as the service delivery manager 703, the service discovery manager 710, the service control manager 709, and/or the metadata manager 712. The service manager 713 may also make a channel map and may select a channel using the channel map according to the key input signal received from the UI manager 714. The service manager 713 may set the audio/video Packet ID (PID) of the selected channel based on SI about the channel received from the PSI & (PSIP and/or SI) decoder 704.

The service discovery manager 710 may provide information necessary to select an SP that provides a service. Upon receipt of a channel selection signal from the service manager 713, the service discovery manager 710 may detect a service based on the channel selection signal.

The service control manager 709 may manage selection and control services. For example, if a user selects live broadcasting, such as a conventional broadcasting service, the service control manager may select and control the service using Internet Group Management Protocol (IGMP) or Real-Time Streaming Protocol (RTSP). If the user selects Video on Demand (VoD), the service control manager 709 may select and control the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols disclosed herein are given by way of example, and other protocols may be applicable in other embodiments.

The metadata manager 712 may manage metadata related to services and store the metadata in the SI & metadata DB 711. The SI & metadata DB 711 may store the SI decoded by the PSI & (PSIP and/or SI) decoder 704, the metadata managed by the metadata manager 712, and the information required to select an SP, received from the service discovery manager 710. The SI & metadata DB 711 may store setup data for the system. The SI & metadata DB 711 may be constructed in a Non-Volatile RAM (NVRAM) or a flash memory. Moreover, an IMS gateway 705 is a gateway equipped with functions needed to access IMS-based IPTV services.

Figure 6:
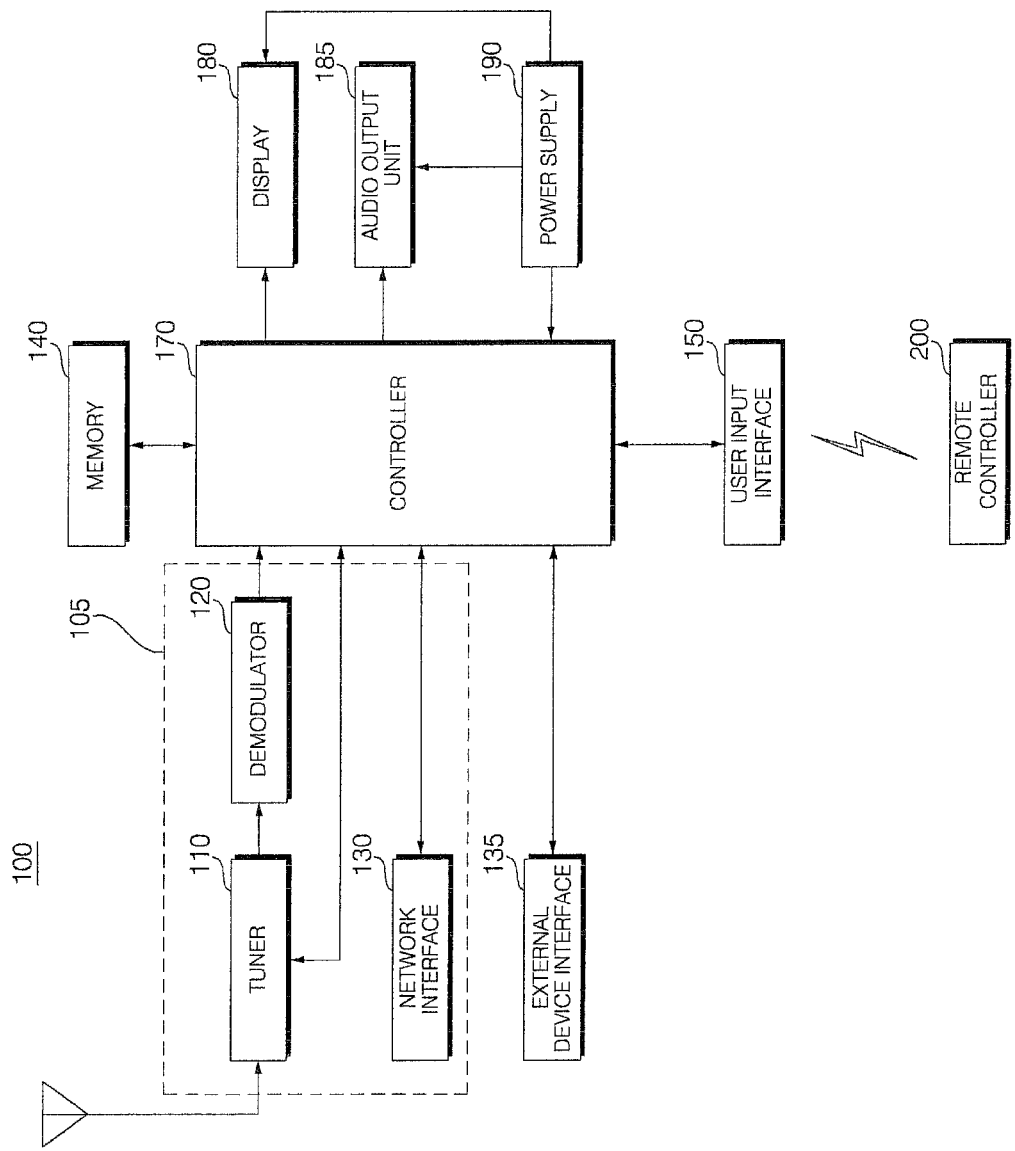
FIG. 6 is a block diagram of an image display apparatus according to another embodiment of the present disclosure.

FIG. 6 is a block diagram of the image display apparatus of FIG. 1 or 2 according to another embodiment of the present disclosure. Referring to FIG. 6, the image display apparatus 100 may include a broadcasting receiver 105, an external device interface 135, a memory 140, a user input interface 150, a controller 170, a display 180, an audio output circuit 185, a power supply 190, a camera module, or another appropriate component based on the application of the display apparatus 100. The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna. The tuner 110 may downconvert the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The broadcast signal may be input through the external device interface 135 or network interface 130 in addition to the tuner 110. In one embodiment, the image display apparatus may not include the tuner.

The demodulator 120 receives the digital IF signal DIF from the tuner 110 and demodulates the digital IF signal DIF. For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and/or a Reed-Solomon decoder so as to perform convolution decoding, de-interleaving, and/or Reed-Solomon decoding, respectively.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload. In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output circuit 185, respectively.

The external device interface 135 may serve as an interface between an external device and the image display apparatus 100. For interfacing, the external device interface 135 may include an A/V Input/Output (I/O) interface and/or a wireless communication module.

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video, and data signals from or to the external device, the external device interface 135 may includes the A/V I/O interface and/or the wireless communication module.

The A/V I/O interface of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-sub port, or another appropriate port for connecting to an external device.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports, and thus, may receive data from or transmit data to the various set-top boxes. The external device interface 135 may receive applications or an application list from an adjacent external device and provide the applications or the application list to the controller 170 or the memory 140.

The network interface 130 may serve as an interface between the image display apparatus 100 and a wired/wireless network such as the Internet. The network interface 130 may include an Ethernet port for connection to a wired network. The wireless communication module of the external signal I/O circuit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), High Speed Downlink Packet Access (HSDPA), or another wireless communication protocol.

The network interface 130 may transmit data to or receive data from another user or electronic device over a connected network or another network linked to the connected network. For example, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, broadcast signals as well as information related to the content from a CP or an NP. Also, the network interface 130 may receive update information about firmware and update files of the firmware from the NP. The network interface 130 may transmit data over the Internet or to the CP or the NP. The network interface 130 may selectively receive a desired application among open applications over a network.

In an embodiment of the present disclosure, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals. The memory 140 may temporarily store a video, audio and/or data signal received from the external device interface 135 or the network interface 130. The memory 140 may store information about broadcast channels by the channel-add function. The memory 140 may store applications or a list of applications received from the external device interface 135 or the network interface 130. The memory 140 may also store a variety of platforms. In one embodiment, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), a Read-Only Memory (ROM) such as an Electrically Erasable and Programmable Read Only Memory, or another appropriate type of storage device. The image display apparatus 100 may reproduce content stored in the memory 140 (e.g. video files, still image files, music files, text files, or application files). While the memory 140 is shown in FIG. 6 as being configured to be separate from the controller 170, the present disclosure is not limited thereto. For example, the memory 140 may be incorporated into the controller 170.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, and a volume key, and setting values. Also, the user input interface 150 may transmit a control signal received from a sensor that senses a user gesture to the controller 170 or transmit a signal received from the controller 170 to the sensor. The sensor may include a touch sensor, a voice sensor, a position sensor, a motion sensor, or another appropriate type of sensor.

The controller 170 may demultiplex the stream signal TS received from the tuner 110, the demodulator 120, or the external device interface 135 into a number of signals and process the demultiplexed signals into audio and video data. The video signal processed by the controller 170 may be displayed as an image on the display 180. The video signal processed by the controller 170 may also be transmitted to an external output device through the external device interface 135. The audio signal processed by the controller 170 may be output to the audio output device 185. Also, the audio signal processed by the controller 170 may be transmitted to the external output device through the external device interface 135.

The controller 170 may include a DEMUX and a video processor. In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. The controller 170 may also access a network and download an application or application list selected by the user to the image display apparatus 100 over the network. For example, the controller 170 may control the tuner 110 to receive a channel selected according to a specific channel selection command received through the user input interface 150 and process a video, audio and/or data signal of the selected channel. The controller 170 may output the processed video or audio signal along with information about the user-selected channel to the display 180 or the audio output device 185.

The controller 170 may also output a video or audio signal received from an external device such as a camera or a camcorder through the external device interface 135 to the display 180 or the audio output device 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

In one embodiment, upon receipt of a go-to-home screen input, the controller 170 may control display of the home screen on the display 180. The home screen may include a plurality of card objects classified according to content sources. The card objects may include at least one card object representing a thumbnail list of broadcast channels, a card object representing a broadcast program guide, a card object representing a program reservation (scheduled recording) list or a program recording list, or a card object representing a media list of a device connected to the image display apparatus 100. The card objects may further include at least one of a card object representing a list of connected external devices or a card object representing a call-associated list. The home screen may further include an application menu with at least one application that can be executed.

The image display apparatus according to the embodiment of the present disclosure may include a card object generator that generates and displays the card object. In one embodiment, the card object generator may be an OSD generator 340 or a functional part included in the controller or another component.

Upon receipt of a card object move input, the controller 170 may control movement of a card object corresponding to the card object move input on the display 180, or if the card object is not displayed on the display 180, the controller 170 may control the display to show the card object on the display 180. Examples of a display apparatus and method for moving or scrolling objects on the same are disclosed in U.S. patent application Ser. Nos. 13/044,310 and 13/044,340, which are hereby incorporated by reference in their entirety.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size and/or position through a lock setting. The controller 170 may also control a display of a set-up object for at least one of image setting, audio setting, screen setting, reservation setting, setting of a pointer controlled by the remote controller, or network setting on the home screen.

The controller 170 may control display of a login object, a help object, or an exit object on a part of the home screen. The controller 170 may also control display of an object representing the total number of available card objects or the number of card objects displayed on the display 180 among all card objects, on a part of the home screen. Moreover, if one of the card objects displayed on the display 180 is selected, the controller 170 may display the selected card object as a fullscreen image to cover the entirety of the display 180.

Upon receipt of an incoming call at a connected external device or the image display apparatus 100, the controller 170 may control the display to focus-on or shift a call-related card object among the plurality of card objects. Furthermore, if an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present disclosure, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180, and reception of a selection signal indicating a user terminal selected for use as a user controller from among the listed user terminals through the user input interface 150.

The controller 170 may control output of a game play screen of the game application, inclusive of player information about each user terminal and game play information, through the display 180. The controller 170 may determine the specific signal received from a user terminal through the network interface 130 as game play information, and thus, control the game play information to be reflected in the game application in progress. Moreover, the controller 170 may control transmission of the game play information about the game application to a specific server connected to the image display apparatus 100 over a network through the network interface 130. In one embodiment, upon receipt of information about a change in the game play information from the server through the network interface 130, the controller 170 may control output of a notification message in a predetermined area of the display 180.

The image display apparatus 100 may further include a channel browsing processor configured to generate thumbnail images corresponding to channel signals or external input signals. The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded.

Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

Examples of thumbnails and methods of using the same are disclosed in U.S. patent application Ser. No. 12/651,730, which is hereby incorporated by reference in its entirety.

The display 180 may convert a processed video signal, a processed data signal, and an OSD signal received from the controller 170 or a video signal and a data signal received from the external device interface 135 into RGB signals to generate drive signals. The display 180 may be various types of displays such as a Plasma Display Panel (PDP), a Liquid Crystal Display (LCD), an Organic Light-Emitting Diode (OLED) display, a flexible display, a 3D display, or another appropriate type of display. The display 180 may also be a touch screen that can be used not only as an output device but also as an input device.

The audio output device 185 may receive a processed audio signal (e.g., a stereo signal, a 3.1-channel signal or a 5.1-channel signal) from the controller 170 and output the received audio signal as sound. The audio output device 185 may employ various speaker configurations.

To sense a user gesture, the image display apparatus 100 may further include a sensor circuit that has at least one of a touch sensor, a voice sensor, a position sensor, and a motion sensor, as stated before. A signal sensed by the sensor may be output to the controller 170 through the user input interface 150.

The image display apparatus 100 may further include the camera for capturing images of a user. Image information captured by the camera may be input to the controller 170. The controller 170 may sense a user gesture from an image captured by the camera or a signal sensed by the sensor. The controller 170 may also combine the captured image and the sensed signal to generate an input signal.

The power supply 190 supplies power to the image display apparatus 100. Particularly, the power supply 190 may supply power to the controller 170, the display 180, and the audio output device 185, which may be implemented as a System On Chip (SOC). The power supply 190 may include a converter for converting Alternating Current (AC) into Direct Current (DC). If the display 180 is configured with, for example, a liquid crystal panel having a plurality of backlight lamps, the power supply 190 may further include an inverter capable of performing Pulse Width Modulation (PWM) to control the luminance or dimming.

The remote controller 200 may transmit a user input to the user input interface 150. For transmission of user input, the remote controller 200 may use various communication techniques such as Bluetooth, RF communication, IR communication, UWB, ZigBee, or another appropriate communication protocol.

In addition, the remote controller 200 may receive a video signal, an audio signal or a data signal from the user input interface 150 and output the received signals visually, audibly, or as vibrations.

The above-described image display apparatus 100 may be a fixed digital broadcast receiver capable of receiving at least one of ATSC (8-VSB) broadcast programs, DVB-T (COFDM) broadcast programs, and/or ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 and the audio output device 185, a DVD player, a Blu-ray player, a game console, a computer, or another appropriate device that processes image signals. The set-top box is described in further detail hereinbelow with reference to FIGS. 7 and 8.

Figure 7:
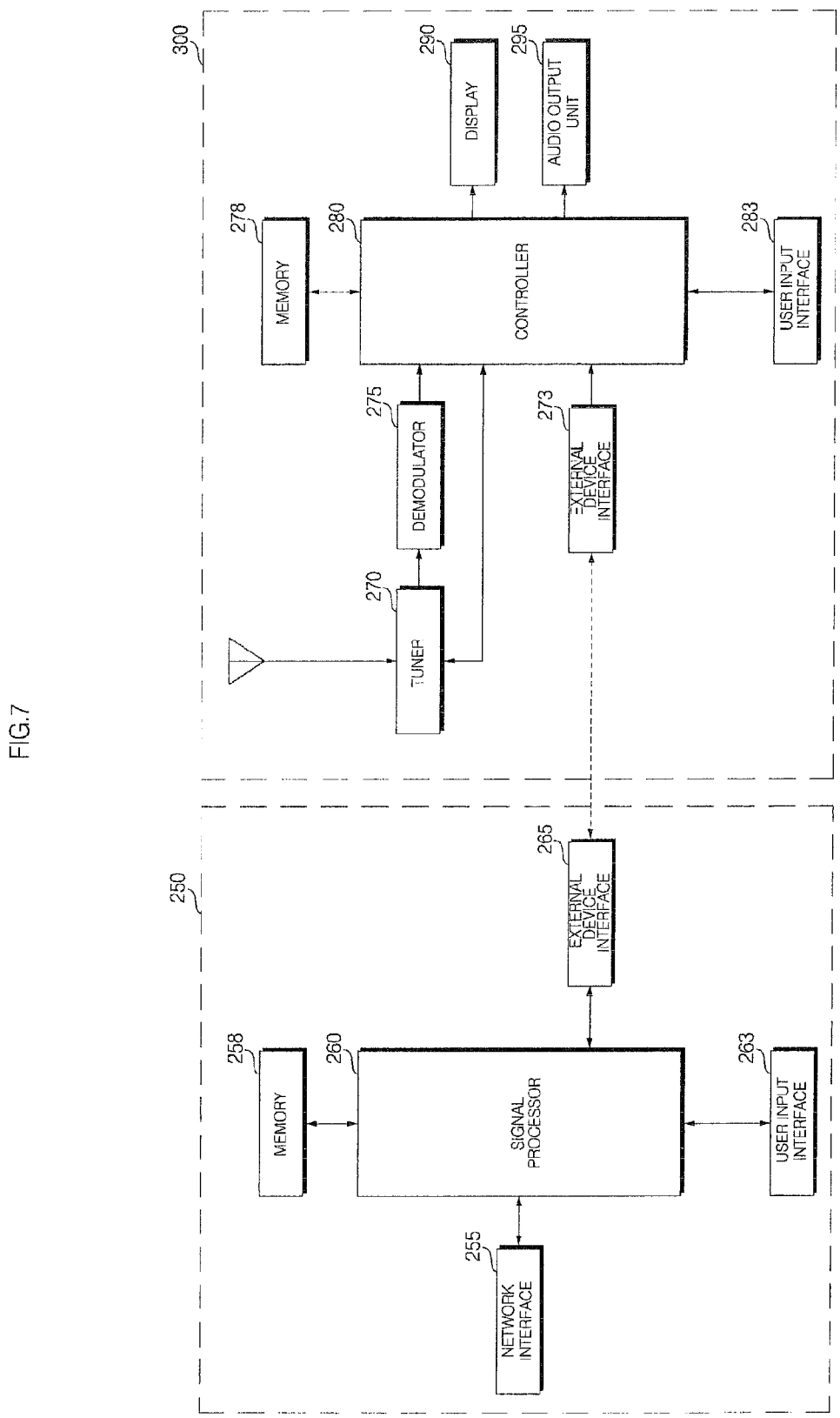
FIGS. 7 and 8 are block diagrams showing a set-top box and a display device of an image display apparatus according to an embodiment of the present disclosure.
Figure 8:
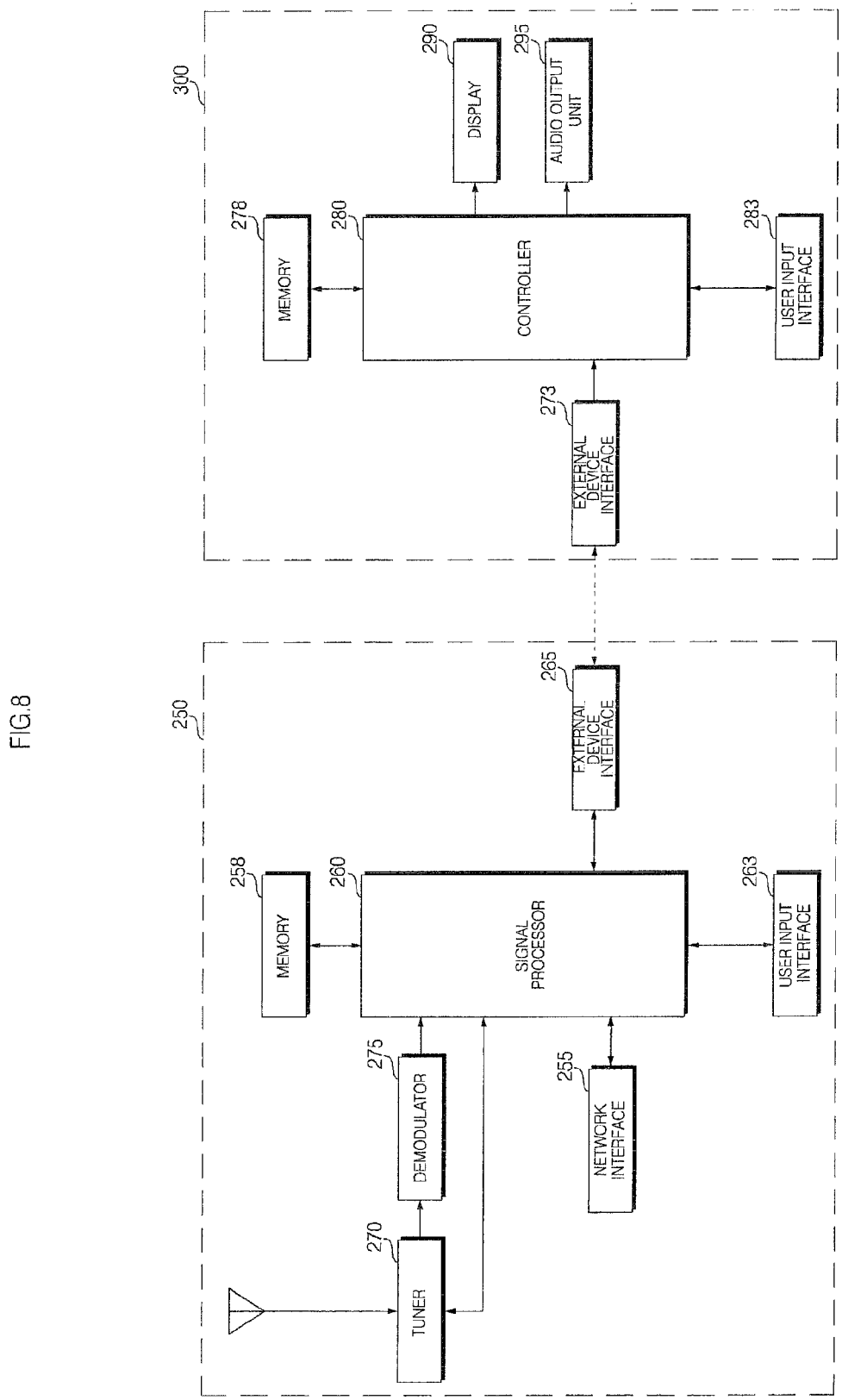

FIGS. 7 and 8 are block diagrams showing the image display apparatus configured separately as a set-top box and a display device. Referring to FIG. 7, a set-top box 250 and a display device 300 may transmit or receive data wirelessly or by wire. The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms, described in further detail with reference to FIGS. 11 and 12 hereinafter.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 may transmit a signal received from the user to the signal processor 260 or a signal received from the signal processor 260 to the user. For example, the user input interface 263 may receive various control signals such as a power on/off signal, an operation input signal, or a setting input signal through activation of a local key or the remote controller 200, and may output the control signals to the signal processor 260.

The external device interface 265 may serve as an interface between the set-top box 250 and an external device that is connected wirelessly or by wire, particularly the display device 300, for signal transmission or reception. The external device interface 265 may also interface with an external device such as a game console, a camera, a camcorder, a computer (e.g. a laptop computer), or another appropriate external device, for data transmission or reception.

The set-top box 250 may further include a media input device for media playback. The media input device may be a Blu-ray input device, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output device 295. The tuner 270, the demodulator 275, the memory 278, the controller 280, the user input interface 283, the display 290, and the audio output device 295 are identical respectively to the tuner 110, the demodulator 120, the memory 140, the controller 170, the user input interface 150, the display 180, and the audio output device 185 as described in reference to FIG. 6, and thus, a description thereof is not repeated hereinbelow.

The external device interface 273 serves as an interface between the display device 300 and a wireless or wired external device, particularly the set-top box 250, for data transmission or reception. Hence, a video signal or an audio signal received through the set-top box 250 may be output through the display 290 or the audio output unit 295 through the controller 280.

Referring to FIG. 8, the configuration of the set-top box 250 and the display device 300 illustrated in FIG. 8 is similar to that of the set-top box 250 and the display device 300 as described with reference to FIG. 7, except that the tuner 270 and the demodulator 275 are provided in the set-top box 250, not in the display device 300. Here, the signal processor 260 may process a broadcast signal received through the tuner 270 and the demodulator 275. The user input interface 263 may receive a channel selection input, a channel store input, etc.

Figure 9:
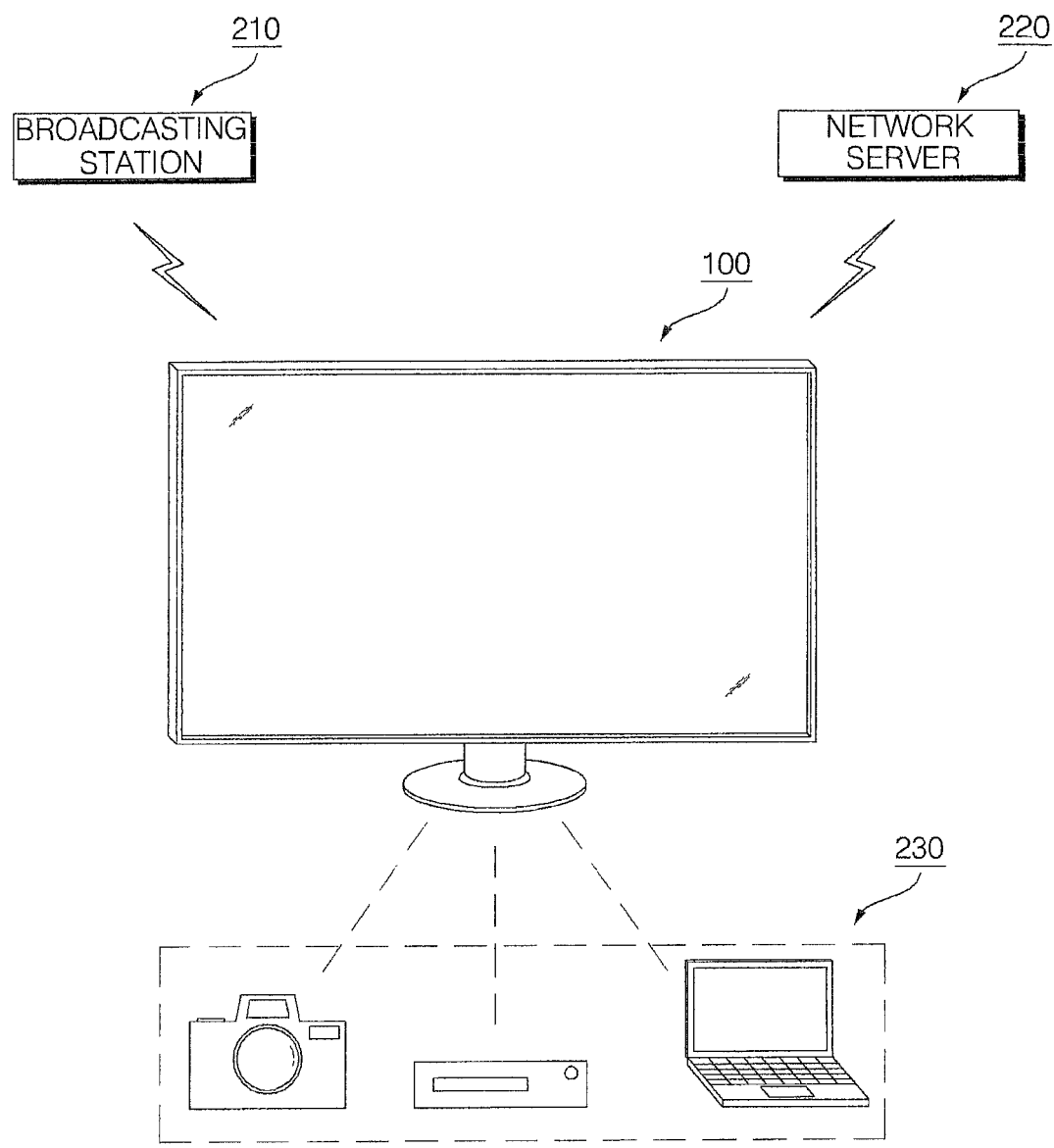
FIG. 9 shows a plurality of external devices in communication with an image display apparatus according to an embodiment of the present disclosure.

FIG. 9 illustrates an operation for communicating with third devices in the previously disclosed embodiments of the image display apparatus according to an embodiment. Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals embedded in the broadcast signal or the data signal of the broadcast signal, for example, into a format suitable for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a multimedia player. That is, the external device 230 may be any of a camera, a DVD player, a Blu-ray player, a PC, or another appropriate device based on the required functionality.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230, and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
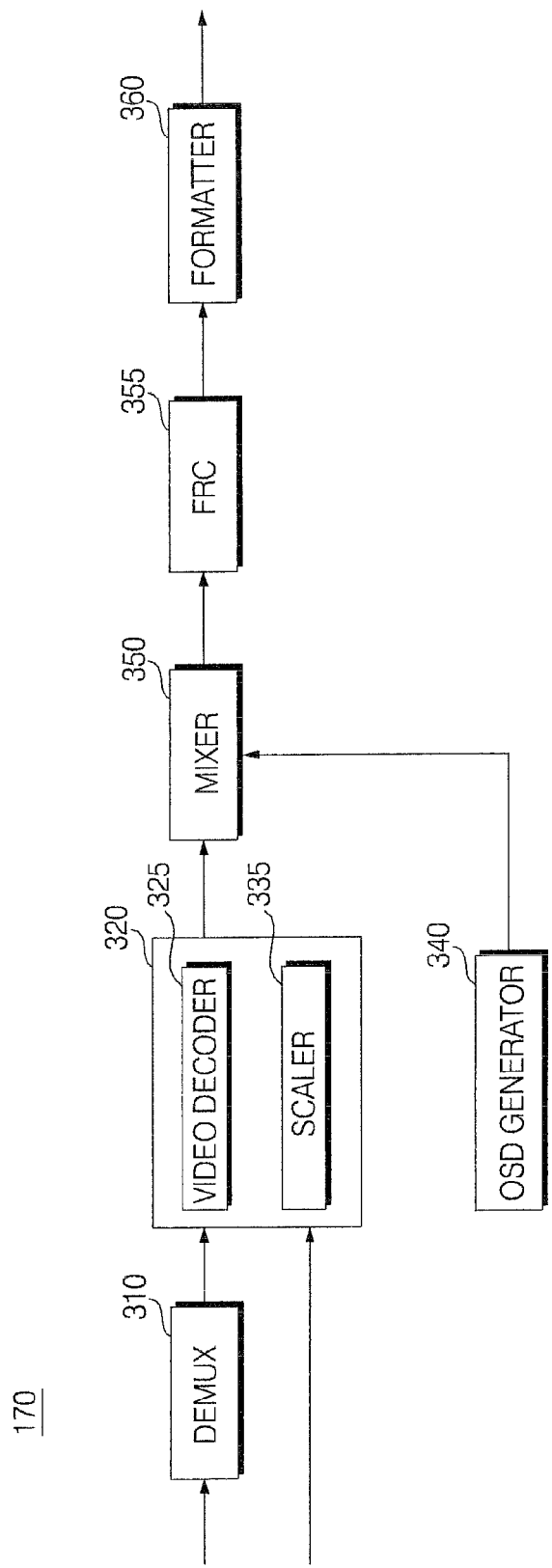
FIG. 10 is a block diagram of a controller of an image display apparatus according to an embodiment of the present disclosure.

FIG. 10 is a block diagram of the controller of FIG. 6. Referring to FIG. 10, the controller 170 may include a DEMUX 310, a video processor 320, an OSD generator 340, a mixer 350, a Frame Rate Converter (FRC) 355, and a formatter 360. The controller 170 may further include an audio processor and a data processor.

The DEMUX 310 may demultiplex an input stream. For example, the DEMUX 310 may demultiplex an MPEG-2 TS into a video signal, an audio signal, or a data signal. The input stream signal may be received from the tuner 110, the demodulator 120, or the external device interface 135.

The video processor 320 may process the demultiplexed video signal. For video signal processing, the video processor 320 may include a video decoder 325 and a scaler 335. The video decoder 325 decodes the demultiplexed video signal and the scaler 335 scales the resolution of the decoded video signal so that the video signal can be displayed on the display 180.

The video decoder 325 may be provided with decoders that operate based on various standards. If the demultiplexed video signal is, for example, an MPEC-2 encoded video signal, the video signal may be decoded by an MPEC-2 decoder. On the other hand, if the video signal is an H.264-encoded DMB or DVB-handheld (DVB-H) signal, the video signal may be decoded by an H.264 decoder. The video signal decoded by the video processor 320 may be provided to the mixer 350.

The OSD generator 340 may generate an OSD signal autonomously or based on to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc. For example, the OSD generator 340 may generate a signal by which subtitles are displayed with a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz may be converted into a frame rate of 120 or 240 Hz. When the frame rate is to be changed from 60 Hz to 120 Hz, a first frame may be inserted between the first frame and a second frame, or a predicted third frame may be inserted between the first and second frames. If the frame rate is to be changed from 60 Hz to 240 Hz, three identical frames or three predicted frames may be inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor of the controller 170 may process a demultiplexed audio signal. For audio signal processing, the audio processor may have a plurality of decoders. If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, an AC-3 decoder, or another type of decoder based on the format of the audio signal. The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI). ATSC-PSIP information or DVB-SI may be included in the header of a TS, i.e., a 4-byte header of an MPEG-2 TS.

The controller 170 as embodied and broadly described herein is not limited to the configuration as illustrated in the block diagram of FIG. 10. Depending upon the specifications of the controller 170, the components of the controller 170 may be combined, omitted, or additional components may be added to the controller 170.

Figure 11:
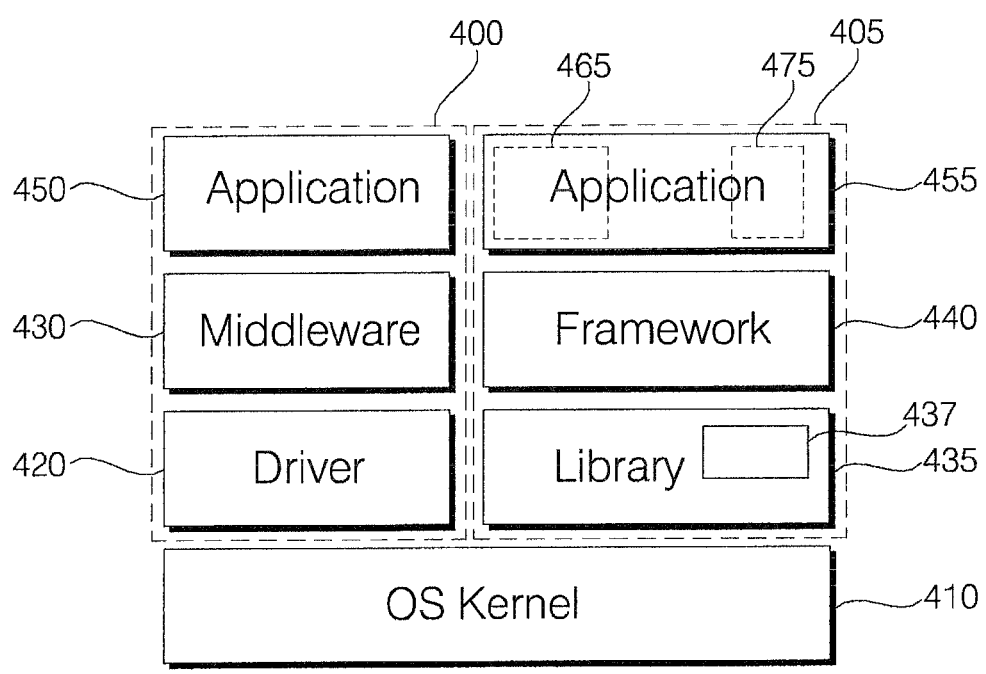
FIG. 11 illustrates a platform architecture for an image display apparatus according to an embodiment of the present disclosure.
Figure 12:
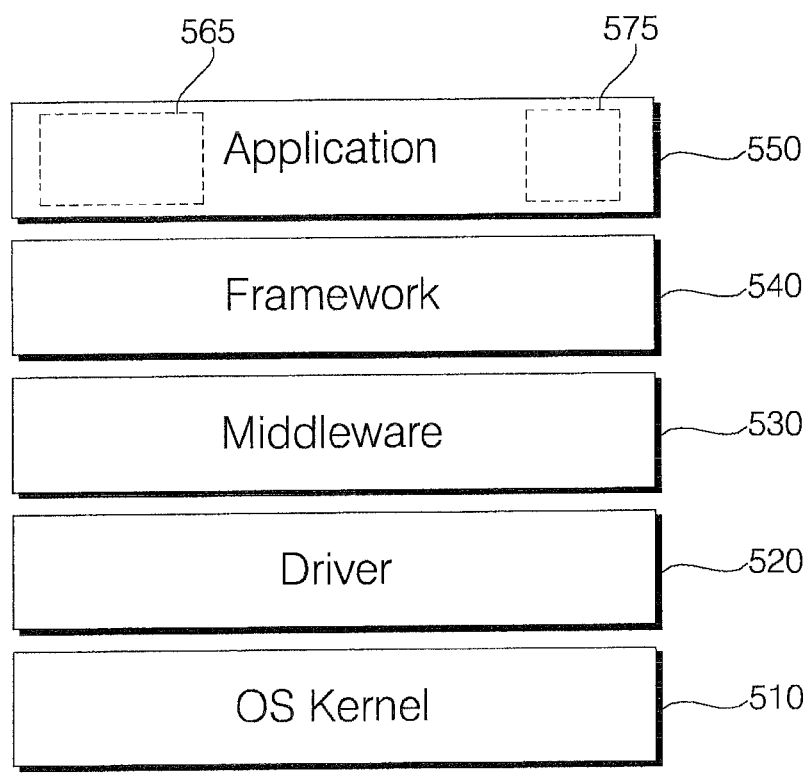
FIG. 12 illustrates a platform architecture for an image display apparatus according to another embodiment of the present disclosure.

FIG. 11 illustrates a platform architecture implemented in the image display apparatus according to one embodiment, and FIG. 12 illustrates another platform architecture implemented in the image display apparatus according to another embodiment.

A platform for the image display apparatus may have OS-based software to implement the above-described operations. Referring to FIG. 11, a platform for the image display apparatus may be a separate type. For example, the platform may be designed separately as a legacy system platform 400 and a smart system platform 405. An OS kernel 410 may be shared between the legacy system platform 400 and the smart system platform 405.

The legacy system platform 400 may include a stack including a driver 420, middleware 430, and an application layer 450 on the OS kernel 410. On the other hand, the smart system platform 405 may have a stack including a library 435, a framework 440, and an application layer 455 on the OS kernel 410.

The OS kernel 410 is the core of an operating system. When the image display apparatus is driven, the OS kernel 410 may be responsible for the operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management operations.

The hardware drivers of the OS kernel 410 may include, for example, at least one of a display driver, a Wi-Fi driver, a Bluetooth driver, a USB driver, an audio driver, a power manager, a binder driver, or a memory driver. Moreover, the hardware drivers of the OS kernel 410 may also include drivers for hardware devices within the OS kernel 410. The hardware drivers may include a character device driver, a block device driver, and/or a network device driver. The block device driver may need a buffer to buffer data on a block basis as data may be transmitted on a block basis. The character device driver may not need a buffer since data may be transmitted on a basic data unit basis, that is, on a character basis. The OS kernel 410 may be implemented based on any of various OSs such as Unix (Linux), Windows, etc. The OS kernel 410 may be a general-purpose open OS kernel which can be implemented in other electronic devices.

The driver 420 may be interposed between the OS kernel 410 and the middleware 430. Along with the middleware 430, the driver 420 may drive devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers may operate in conjunction with the hardware drivers of the OS kernel 410.

In addition, the driver 420 may further include a driver for the remote controller 200, especially a pointing device as described below. The remote controller driver may reside in the OS kernel 410 or the middleware 430, instead of the driver 420.

The middleware 430 may reside between the OS kernel 410 and the application layer 450. The middleware 430 may mediate between different hardware devices or different software programs for data transmission and reception between the hardware devices or the software programs. Therefore, the middleware 430 can provide standard interfaces, support various environments, and enable interaction between tasks conforming to heterogeneous communication protocols. Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, or DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program. The application layer 450 may further include at least one of a TV guide application, a Bluetooth application, a reservation application, a Digital Video Recorder (DVR) application, and a hotkey application.

In the smart system platform 405, the library 435 may be positioned between the OS kernel 410 and the framework 440, and may form the basis of the framework 440. For example, the library 435 may include Secure Socket Layer (SSL) being a security-related library, WebKit being a Web engine-related library, C library (libc), and Media Framework being a media-related library that specifies, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 may form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver of the OS kernel 410 may operate. The binder driver and the runtime 437 may connect Java applications to C-based libraries. The library 435 and the runtime 437 may correspond to the middleware 430 of the legacy system platform 400.

In the smart system platform 405, the framework 440 may include programs on which applications of the application layer 455 are based. The framework 440 may be compatible with any application and may allow component reuse, movement, or exchange. The framework 440 may include supporting programs and programs for interconnecting different software components. For example, the framework 440 may include an activity manager related to activities of applications, a notification manager, and/or a CP for abstracting common information between applications. This framework 440 may be written in Java.

The application layer 455 on top of the framework 440 may include a variety of programs that are executed and displayed in the image display apparatus. The application layer 455 may include, for example, a core application suite having at least one of an e-mail, Short Message Service (SMS), calendar, map, browser, or another appropriate application based on the desired functionality. The application layer 455 may be written in Java.

In the application layer 455, applications may be categorized into user-undeletable applications 465 or user-installed/deletable applications 475. User-undeletable applications 465 may be applications stored in the image display apparatus 100 that cannot be modified. User-installable or user-deletable applications 475 may include application which may be downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment may be an integrated type. The integrated platform may include an OS kernel 510, a driver 520, middleware 530, a framework 540, and an application layer 550. Compared to the separate-type platform, as illustrated in FIG. 11, the integrated-type platform is characterized by the absence of the library 435. Moreover, in this embodiment, the application layer 550 may be an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As previously described, the legacy system middleware may include MHEG or ACAP as data broadcasting-related middleware, PSIP or SI middleware as broadcasting information-related middleware, and DLNA middleware as peripheral device communication-related middleware, whereas the image display system middleware may include SSL as a security-related library, WebKit as a Web engine-related library, libc, and Media Framework as a media-related library. The middleware 530 may further include the runtime as previously described.

The application layer 550 may include a menu-related application, a TV guide application, a reservation application, etc. as legacy system applications. The application layer 550 may also include an e-mail, SMS, a calendar, a map, and/or a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may implement functions that provide connectivity to specific sub-routines for execution of the functions within a program. APIs may also be implemented as programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened. The various open APIs may allow developers to create applications executable in the image display apparatus 100 or applications required to control operations of the image display apparatus 100 based on the platforms as illustrated in FIGS. 11 and 12.

The platforms of FIGS. 11 and 12 may be general-purpose platforms that can be implemented in many other electronic devices as well as in the image display apparatus as disclosed herein. The platforms may be stored or loaded in the memory 140, the controller 170, or any other processor. To execute applications, an additional application processor may be further provided.

Figure 13A:
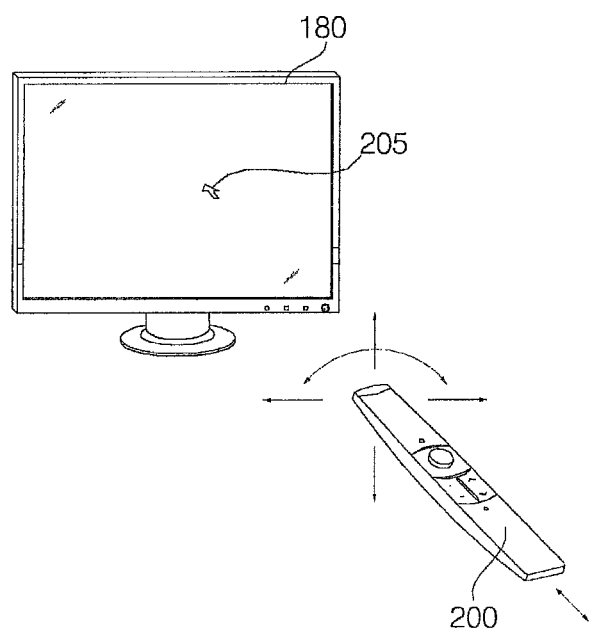
FIGS. 13A to 13C illustrate a remote controller controlling a pointer displayed on an image display apparatus according to an embodiment of the present disclosure.
Figure 13B:
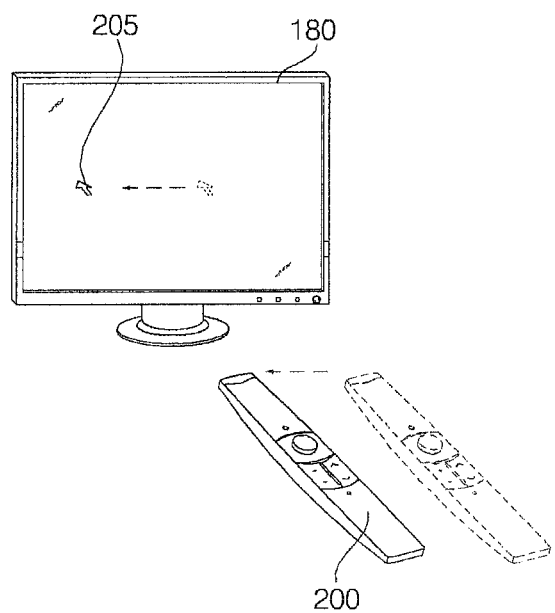
Figure 13C:
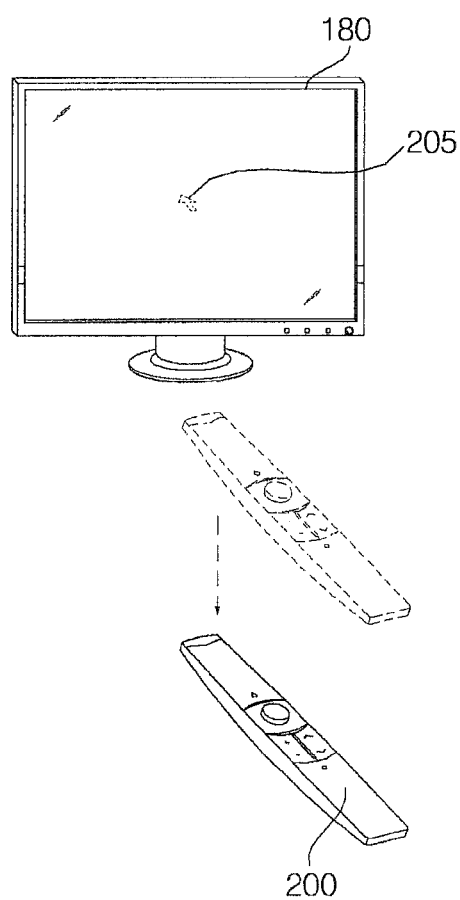

FIGS. 13A to 13C illustrates a method for controlling the image display apparatus using a remote controller according to an embodiment of the present disclosure. Referring to FIG. 13A, a pointer 205 representing movement of the remote controller 200 may be displayed on the display 180. The remote controller 210 may be a motion sensing remote controller that senses a movement of the remote controller 210. The user may move or rotate the remote controller 200 up and down, side to side (FIG. 13B), and back and forth (FIG. 13C). Since the pointer 205 moves in accordance with the movement of the remote controller 200, the remote controller 200 may be referred to as a pointing device.

Referring to FIG. 13B, if the user moves the remote controller 200 to the left, the pointer 205 may move to the left on the display 180 in response thereto. A sensor provided on the remote controller 200 may detect the movement of the remote controller 200 and transmit corresponding motion information to the image display apparatus. Then, the image display apparatus may determine the movement of the remote controller 200 based on the motion information received from the remote controller 200. The controller may then calculate the coordinates of a target location to which the pointer 205 should be shifted in accordance with the movement of the remote controller 200. The image display apparatus may then display the pointer 205 at the calculated coordinates.

Referring to FIG. 13C, the remote controller 200 may be moved away from the display 180 while a predetermined button on the remote controller 200 is depressed. Then, a selected area corresponding to the pointer 205 may be zoomed in to enlarge a image on the display 180. On the contrary, if the user moves the remote controller 200 toward the display 180, the area corresponding to the pointer 205 may be zoomed out, and thus, reducing the size of the image on the display 180. The opposite may also be possible. That is, when the remote controller 200 moves away from the display 180, the selection area may be zoomed out and when the remote controller 200 approaches the display 180, the selection area may be zoomed in.

With the predetermined button pressed on the remote controller 200, an up, down, left or right movements of the remote controller 200 may be ignored. That is, when the remote controller 200 moves away from or approaches the display 180, only the back and forth movements (e.g., the distance from the display 180) of the remote controller 200 are sensed, while the up, down, left and right movements of the remote controller 200 are ignored. When the predetermined button is not selected at the remote controller 200, the pointer 205 may move in accordance with the up, down, left or right movement of the remote controller 200. Moreover, the speed and direction of the pointer 205 on the display 180 may correspond to the speed and direction of the remote controller 200. The sensitivity of the pointer 205 relative to the movement of the remote controller 200 may be adjusted.

The pointer 205 is an object displayed on the display 180 in correspondence with the movement of the remote controller 200. Therefore, the pointer 205 may have various shapes other than the arrow illustrated in FIGS. 13A to 13C. For example, the pointer 205 may be a dot, a cursor, a prompt, a thick outline, etc. The pointer 205 may be displayed across a plurality of points, such as a line and a surface as well as at a single point on a horizontal and vertical axes.

FIG. 14 is a block diagram of the remote controller in the image display apparatus according to an embodiment of the present disclosure. Referring to FIG. 14, the remote controller 200 may include a wireless communication module 225, a user input device 235, a sensor 240, an output device 250, a power supply 260, a memory 270, a controller 280, or another appropriate component based on the application or desired functionality of the display device.

The wireless communication module 225 may transmit signals to and/or receives signals from the image display apparatus 100 as disclosed herein. The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

In this embodiment, the remote controller 200 may transmit motion information that represents a movement of the remote controller 200 to the image display apparatus 100 through the RF module 221. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223. In certain embodiments, the command signals may also be transmitted through the RF module 221.

The user input device 235 may include a keypad, a plurality of buttons, a touchpad and/or a touch screen. The user may enter commands to the image display apparatus 100 by manipulating the user input circuit 235. If the user input circuit 235 includes a plurality of hard buttons, the user may input various commands to the image display apparatus 100 by activating the hard buttons. Moreover, if the user input circuit 235 includes a touch screen displaying a plurality of soft keys, the user may input various commands to the image display apparatus 100 by touching the soft keys on the display 180. The user input device 235 may also include various input tools other than those set forth herein, such as a scroll key, a jog wheel, or another appropriate user input device.

The sensor 240 may include a gyro sensor 241 and/or an acceleration sensor 243. The gyro sensor 241 may sense a movement of the remote controller 200, for example, along the X-, Y-, and Z-axis, and the acceleration sensor 243 may sense the acceleration and speed of the remote controller 200. The sensor 240 may further include a distance sensor (proximity sensor) to sense the distance between the remote controller 200 and the display 180.

The output device 250 may output a video and/or audio signal corresponding to manipulation of the user input device 235 or corresponding to a signal received from the image display apparatus 100. The user may easily identify whether the user input device 235 has been manipulated or whether the image display apparatus 100 has been controlled, based on the video and/or audio signal output by the output device 250.

The output device 250 may include a Light Emitting Diode (LED) module 351 which may be activated whenever the user input circuit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the motion sensing remote controller 200 in order to save power. The power supply 260 may again supply power if a predetermined key on the motion sensing remote controller 200 is manipulated.

The memory 270 may store various types of programs and application data necessary to control or drive the remote controller 200. The motion sensing remote controller 200 may wirelessly transmit signals to and/or receive signals from the image display apparatus 100 over a predetermined frequency band with the aid of the RF module 221. The controller 280 of the remote controller 200 may store the frequency band information associated with the paired image display apparatus 100 in the memory 270 for subsequent use.

The controller 280 may provide overall control of the remote controller 200. The controller 280 may transmit a signal corresponding to a key manipulation detected from the user input device 235 or a signal corresponding to a motion of the motion sensing remote controller 200, as sensed by the sensor 240, to the image display apparatus 100.

Figure 15:
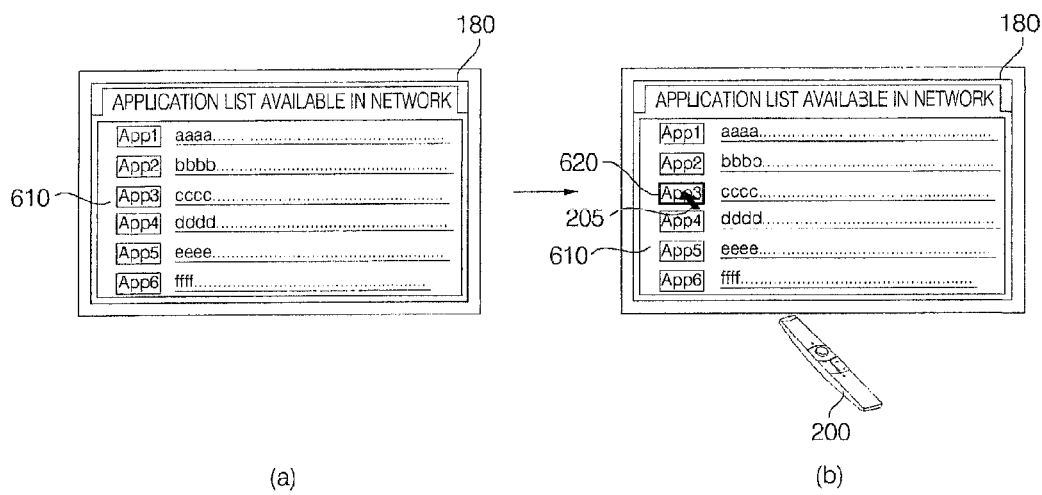
FIGS. 15 to 18 illustrate various types of a user interface (UI) in an image display apparatus according to embodiments of the present disclosure.

FIGS. 15 to 18 illustrate various types of UIs in an image display apparatus according to embodiments of the present disclosure. Referring to FIG. 15, an application list of applications available over a network may be displayed on the display 180. A user may access a CP or an NP directly, search for various applications, or download the applications from the CP or the NP.

Specifically, FIG. 15A illustrates the display 180 which displays an application list 610 of applications which may be available on a server connected to the display apparatus. The application list 610 may include an icon for each application as well as a brief description of the application. Because the image display apparatus as disclosed herein may have full browser functionality, the icons or the descriptions may be enlarged on the display 180 of the image display apparatus. Accordingly, the user may readily identify the desired applications, as described in further detail hereinafter. FIG. 15B illustrates a selection of one application 620 from the application list 610 using a pointer 205. The pointer 205 may be controlled by a movement of the remote controller 200. Thus, the selected application 620 may be easily selected, downloaded, or remotely executed over the network.

Figure 16:
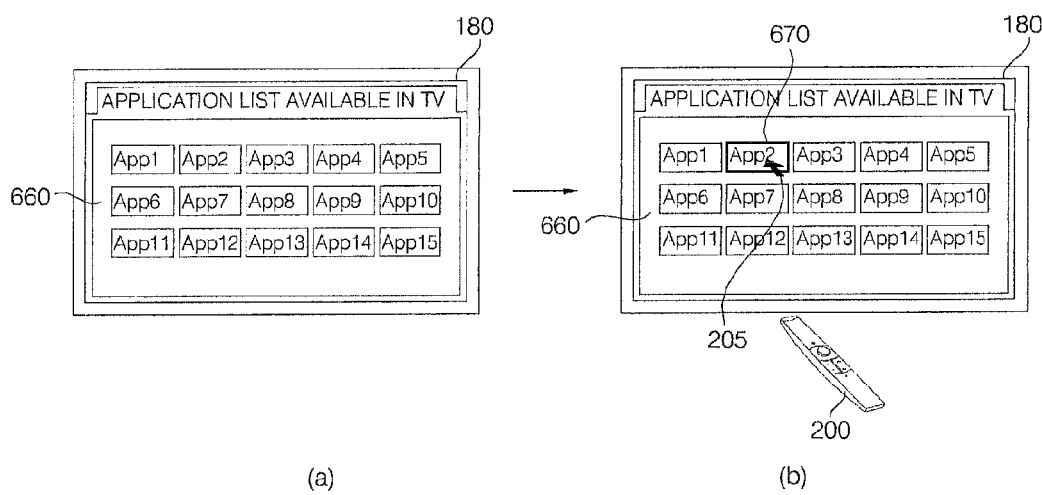

FIG. 16 illustrates an application list displayed on the display 180 according to another embodiment. Referring to FIG. 16, when an application list view menu is selected by manipulating the remote controller 200, a list of applications 660 stored in the image display apparatus may be displayed on the display 180. The icons may include identifying information related to the corresponding application to facilitate identification of the application. Moreover, while only icons representing the applications are shown in FIG. 16, the application list 660 may also include brief descriptions of the applications, as in the application list 610 of FIG. 15. Therefore, the user may access additional information to readily identify the applications if desired. FIG. 16(b) illustrates a selection of one application icon 670 from the application list 660 using the pointer 205. The pointer 205 may be controlled by moving the remote controller 200. Accordingly, the selected application 670 may be easily selected and executed.

Moreover, in certain embodiments, the application lists 610 or 660 may display icons representing both applications available over the network as well as applications available locally. In this embodiment, the icons or the descriptions may include additional indicia to differentiate the remote and local applications. For example, the description may include a network address for the corresponding application.

Furthermore, in certain embodiments, the icons may be thumbnails. While icons may include images which are related to the corresponding content (e.g., name or logo of a content server, an image representing a category, etc.), thumbnails may include a representation of the corresponding content (e.g., an image of the content). For example, if the thumbnail corresponds to a still image, a reduced sized version of the still image may be displayed on the thumbnail. Moreover, if the corresponding content is a video image (e.g., a broadcast content), a version of the video image may be played on the thumbnail.

While FIGS. 15 and 16 show that a desired application may be selected by moving the pointer 205 using the remote controller 200, the application may be selected in many other ways. For example, the user may select a specific application by moving a cursor around the display 180 using dedicated keys (e.g., arrow keys and an OK key) on the remote controller 200. In another example, if the remote controller 200 equipped with a touch pad, the pointer 205 may be controlled using the touch pad. Accordingly, the user may select a specific item using the pointer 205 and various types of input devices.

Figure 17:
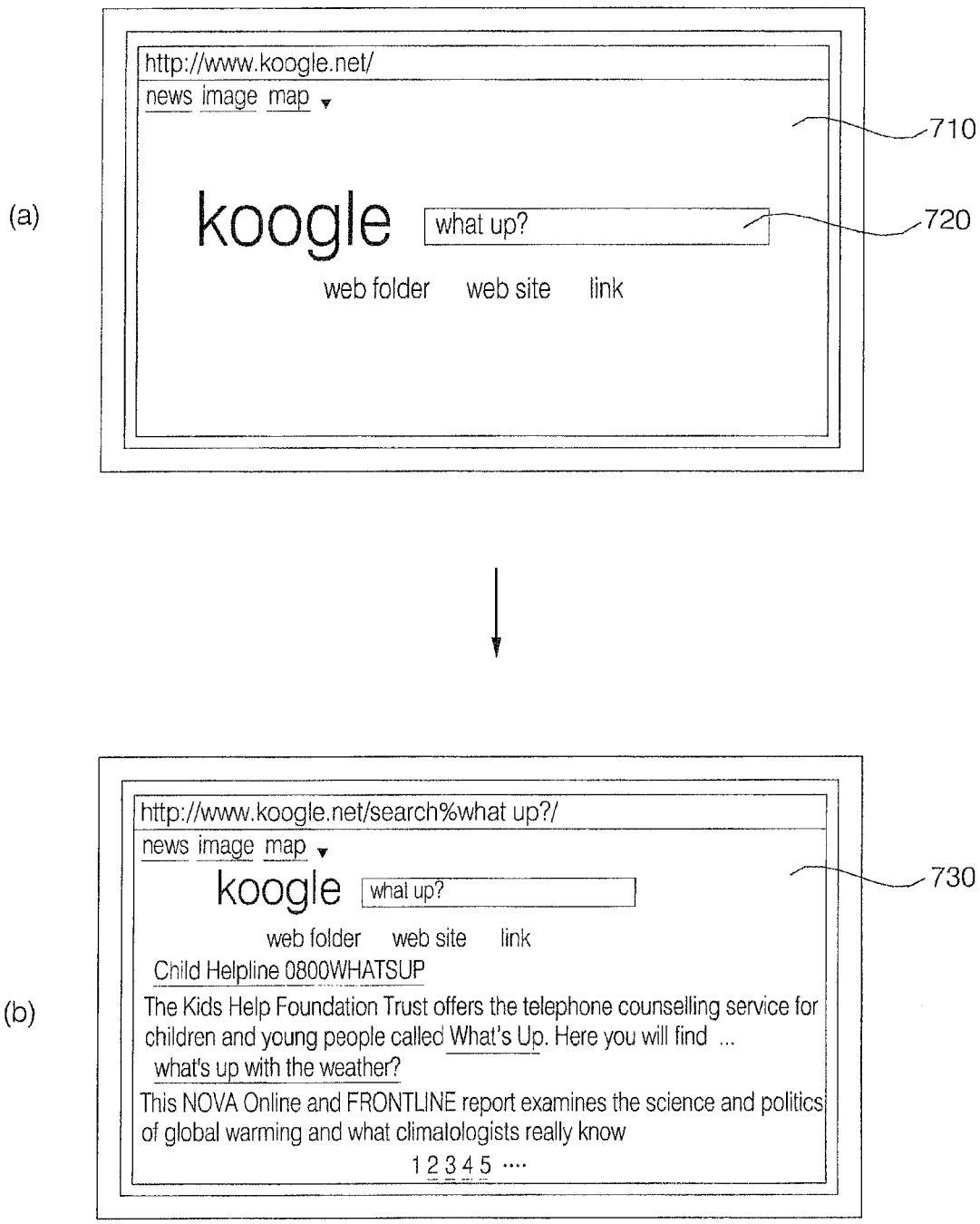

FIG. 17 illustrates a Web page displayed on the display 180. Specifically, FIG. 17 illustrates a Web page 710 with a search window 720 displayed on the display 180. A keyword or search string may be input to the search window 720 using a keypad displayed on the display 180, local keys provided on the display apparatus, or character keys provided on the remote controller 200.

FIG. 17 illustrates a search result page 730 which may display a search result matching the keyword entered in the search window 720. Since the image display apparatus may have browser functionalities, the user may access a Web page from the search result on the image display apparatus.

Figure 18:
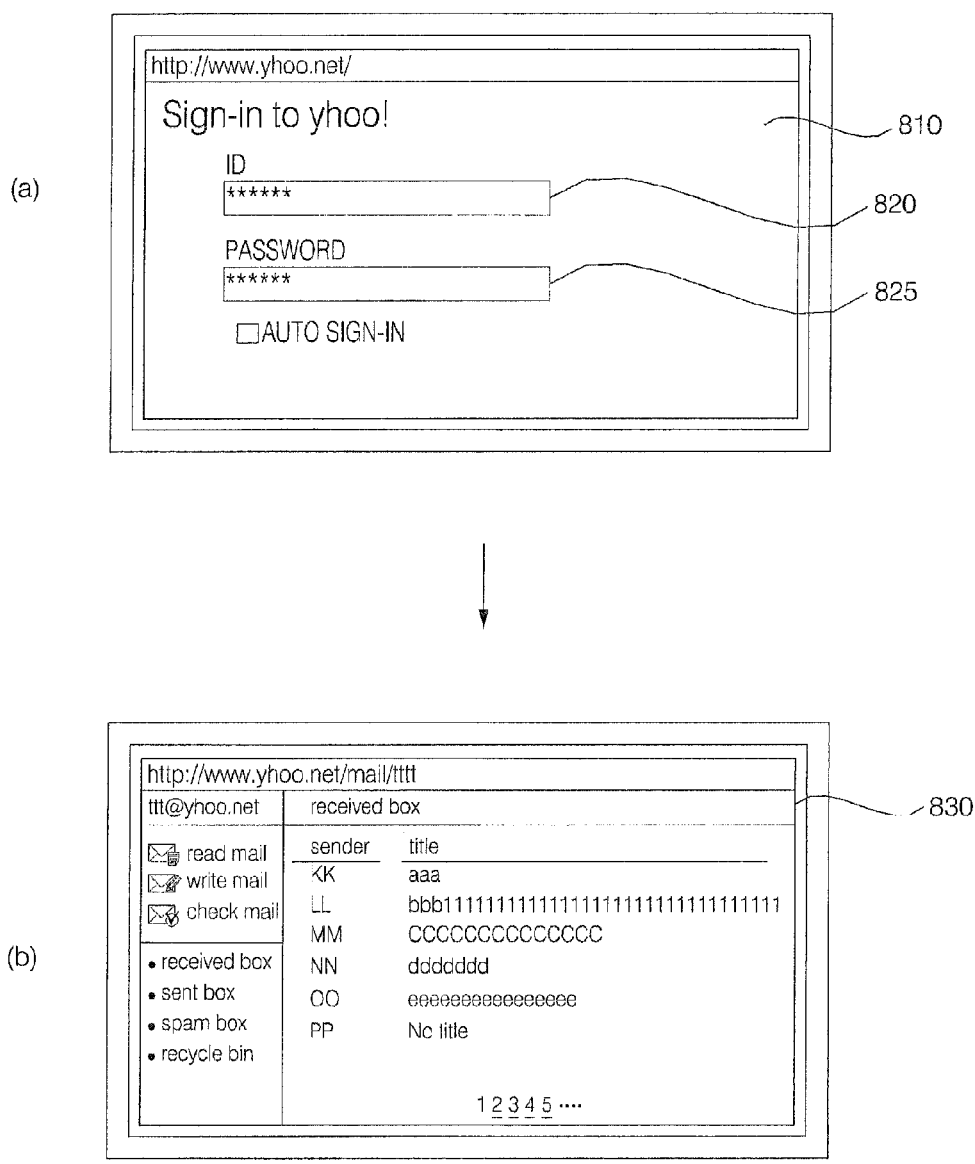

FIG. 18 illustrates another Web page displayed on the display 180. Specifically, FIG. 18 illustrates a mail service page 810, including an ID input window 820 and a password input window 825, displayed on the display 180. The user may enter an alphanumeric user ID and password into the ID input window 820 and the password input window 825. The user ID and password may be inputted using a keypad displayed on the mail service page 810, character keys provided as local keys, or character keys provided on the remote controller 200. Hence, the user may login to an online mail service using the image display apparatus.

FIG. 18 illustrates a mail page 830 which may be displayed on the display 180 after logging-in to the mail service. The mail page 830 may contains items "read mail," "write mail," "sent box," "received box," "recycle bin," or another appropriate mail related items. Moreover, in the "received box" item, mail may be sorted according to sender or by title. The image display apparatus may be configured to have full browser functionality when displaying the mail service page.

Therefore, the user may conveniently access the mail service through the image display apparatus.

Figure 19:
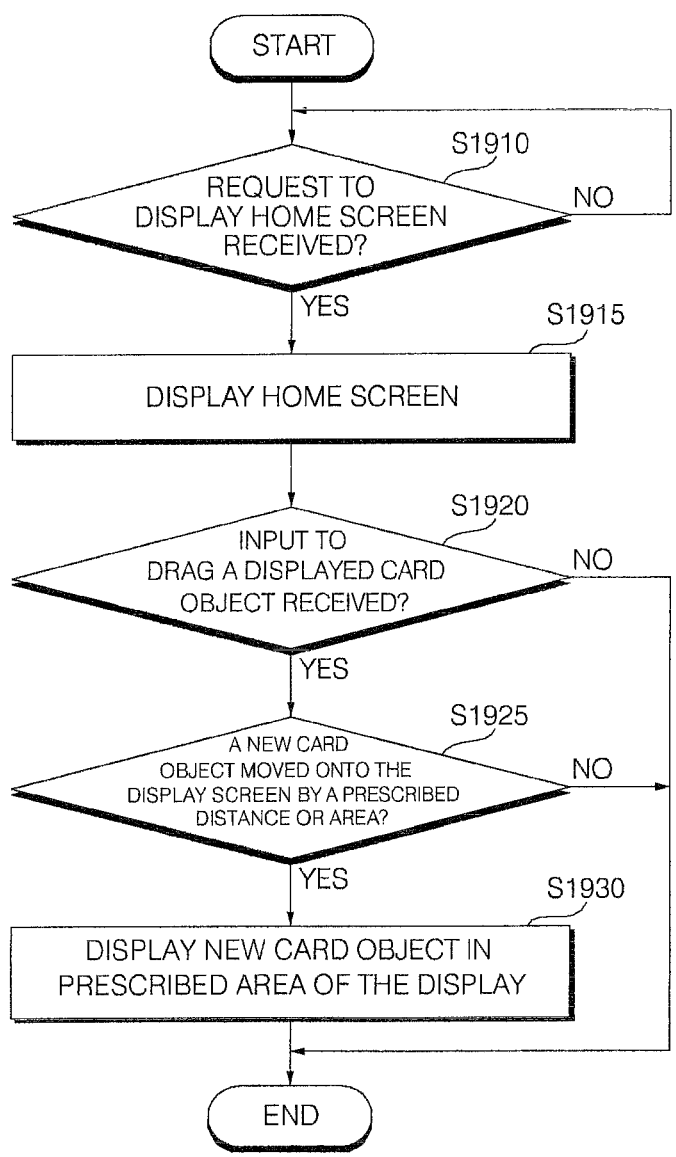
FIG. 19 is a flowchart illustrating a method for operating an image display apparatus according to an embodiment.

FIG. 19 is a flowchart of a method for operating an image display apparatus according to an embodiment, and FIGS. 20A to 30B show screen images to illustrate the method of FIG. 19. Referring to FIG. 19, first, it may be determined whether a return-to-home screen input is received, in step S1910. This input may also be a request to display a home screen while viewing a broadcast on the image display apparatus, or while viewing another window for accessing various content available on the image display apparatus (e.g., an App Store screen or My Apps screen). If it is determined that the input for the home screen has been received, the home screen 2000 including an area to display a video, an area for card objects and/or an area for an application menu may be displayed, in step S1915.

The controller 170 may be configured to determine whether the input for the home screen is received by a selection of a local key provided on the display apparatus or a remote controller. The home screen request may be generated by the controller 170, for example, when the image display apparatus is powered on or wakes up from a standby mode, or when a local key or a home key on the remote controller 2100 is pressed. The remote controller 2100 may include similar features as remote controller 200 of FIG. 13 as previously described.

In the displayed home screen, the card object area of the home screen may include a plurality of card objects which are categorized according to content sources, content type, or another appropriate category. For example, the plurality of card objects may include a card object that displays a broadcast image, a card object that displays a Content Provider (CP) list, or a card object that displays an application list. The card objects are described in further detail hereinafter with reference to FIG. 20A.

The plurality of card objects may be generated by a card object generator of the image display apparatus 100. The card object generator may be included in the OSD generator 340 of the controller 170 or may be separately provided as a graphic processing unit. The plurality of card objects generated by the card object generator may be transmitted to and displayed on the display 180.

The application menu area of the home screen may include a plurality of application items. The application items may be icons representing applications which are available through the image display apparatus. Moreover, the application menu may include mandatory application icons or user specified application icons as set by a user. The application menu may be a compact-view menu of the application icons that displays a limited number of predefined application icons or may further include a full-view menu of the application icons that displays all application icons which are available. The application menu is described in further detail hereinafter with reference to FIG. 20A.

The application menu may be generated by an application menu generator of the image display apparatus 100. The application menu generator may be included in the OSD generator 340 of the controller 170 or may be separately provided as a graphic processing unit. The application menu generated by the application menu generator may be transmitted to and displayed on the display 180.

Next, it may be determined whether a card object displayed on the home screen is selected and dragged in a first direction, in step S1920. The input to drag a displayed card object across the screen (e.g., scroll a displayed card object) may cause a new card object to be scrolled onto the screen as a result. That is, the displayed card objects may be scrolled together as a group by a single input to drag one of the displayed card objects. Moreover, if the displayed card objects are scrolled to the left across the display, a new card object may be scrolled onto the display following the last card object on the right side. The new card object may be scrolled onto the display to fill the area previously occupied by the last card object.

If it is determined that a card object is selected and dragged in the first direction (e.g., horizontally towards the left side of the display screen), it may then be determined whether the new card object is scrolled onto the display by a prescribed distance or area, in step S1925. That is, as the card objects are being scrolled across the screen, the controller 170 may detect an amount of the new card object that has been scrolled onto the display. This amount may be determined based on a length of a portion of the new card object which is displayed or on an area of the portion of the new card object which is displayed.

If the displayed amount is greater than or equal to a predetermined value, the new card object may be moved to and displayed at a predetermined position designated for the card object, in step S1930. For example, the home screen may be configured to have predetermined areas designated to display a card object. The predetermined areas may be aligned on a grid, for example, to align the displayed card objects to each other. When the new card object is scrolled onto the home screen more than the prescribed amount, the new card object may be automatically moved into a card object area left vacant by a preceding card object. The new card object may be positioned to be automatically aligned to the other card objects.

The controller 170 may be configured to perform the method steps of FIG. 19. For example, the controller 170 may be configured to detect a request to display a home screen on the display apparatus, and may display the home screen in response thereto. The controller may also be configured to detect whether a particular card object is selected and dragged as well as a method in which the particular card object is selected and dragged on the display screen.

For example, the controller 170 may detect whether a pointer, displayed on the display 180 and controlled by a movement of the remote controller, is used to scroll the card object. Here, once the pointer is moved over a card object, the card object may be selected when a button on the remote controller is pressed. The card object may then be dragged based on a movement of the remote controller while the button is depressed. Moreover, the drag operation may also be performed by a touch input if the display 180 is a touch screen display.

Next, if the drag operation is performed, the controller 170 may control the movement and the display of the selected card object. The controller 170 may calculate a change in a display coordinate of the pointer corresponding to the movement of the remote controller and may control the display 180 to display the pointer based on the change in the display coordinate. If the card object is dragged using the pointer, the selected card object may be moved and displayed under the control of the controller 170.

If the length or the display area of the portion of the new card object displayed on the display by the drag operation is equal to or greater than the predetermined value, the selected card object may be moved to and displayed at the position of an adjacent card object or may replace another card object under the control of the controller 170. In other words, when a displayed card object is selected and dragged across the display screen, it may be either displayed in another area designated for displaying a card object (e.g., a position adjacent to its original position) or it may be scrolled off the screen. In the latter case, a new card object may be generated for display in place of the original card object. For example, the scrolling of one card object by a prescribed amount may cause all of the displayed card objects to be replaced with different card objects, e.g. all displayed card objects are scrolled off the screen and new card objects are scrolled into their respective positions. Moreover, the amount in which the new card object is scrolled onto the display screen may be determined by the controller based on the movement of the pointer.

While the method of FIG. 19 has been disclosed herein with reference to an image display apparatus having a display, this disclosure is not limited thereto, and may also be applicable to a set top box configured to output an image or data for display on an external display. For example, the controller 170 may determine whether the return-to-home screen input is received, in step S1910, and if received, may output data to display a home screen that includes a card object area and an application menu area. Such data may be input to the display 180, which may be separately provided to display the home screen. Moreover, the inputs to move a displayed card object may be received from the display, for example, at the set top box. Hence, the output of the image or the data for displaying the screen images may be equally applied to the previously disclosed method steps S1915 to S1930.

Figure 20A:
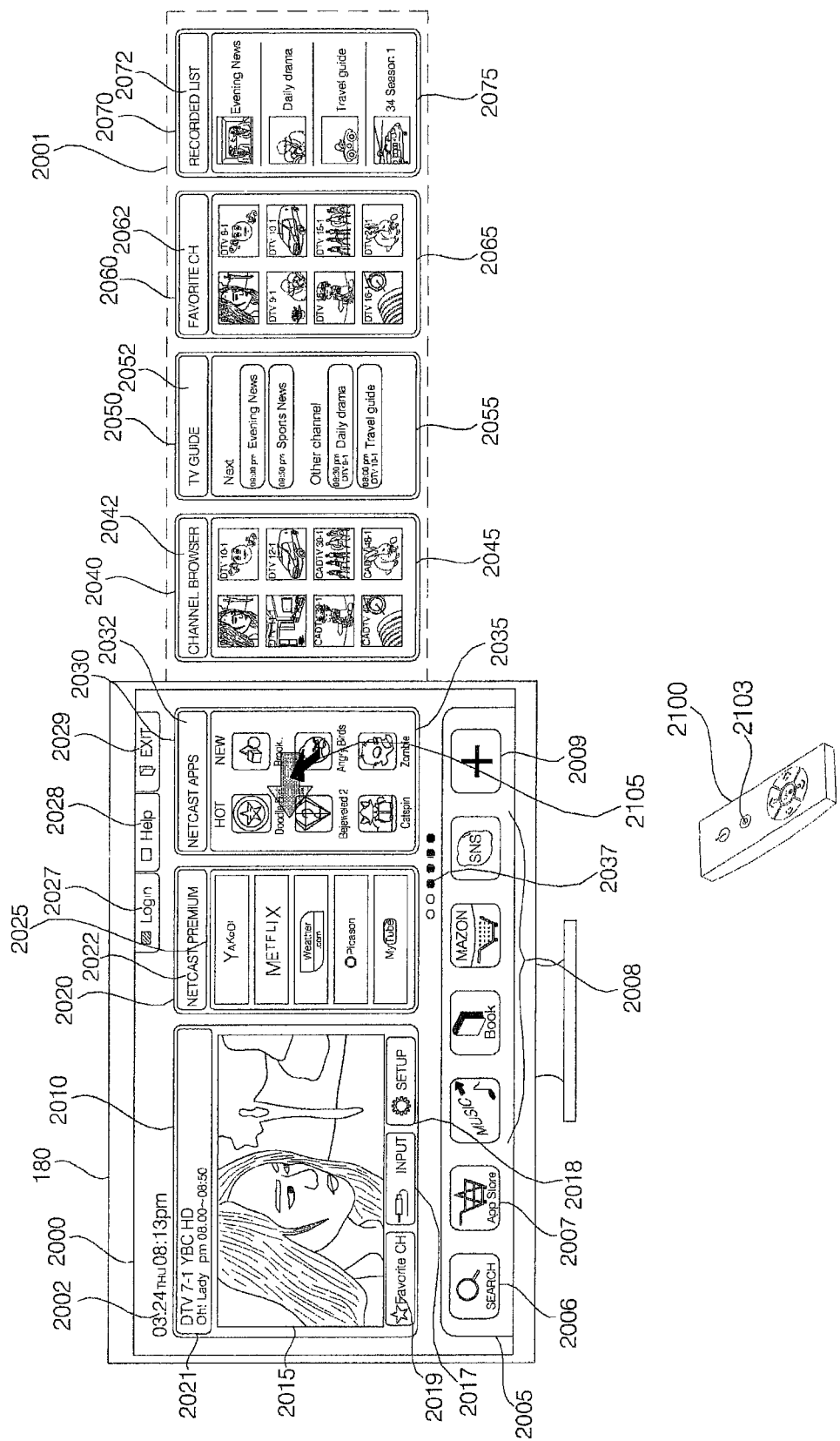
FIGS. 20A to 20C show schematic views of a home screen displayed on a display according to an embodiment.

FIG. 20A shows one embodiment of a home screen displayed on a display. The configuration of the home screen 2000, as shown in FIG. 20A, may be a default screen configuration of the above-described smart TV. The home screen 2000 may be set as an initial screen which may be displayed when the image display apparatus is powered on or wakes from a standby mode, or as a default screen that is displayed when a local key on the display apparatus or a home key on the remote controller 2100 is manipulated.

The home screen 2000, as shown in FIG. 20A, may include a card object area and an application menu area. The card object area may include a plurality of card objects 2010, 2020, 2030 which may be categorized based on, for example, content sources, types of content, or another appropriate type of category for the available content.

In FIG. 20A, a broadcast image card object 2010 (BROADCAST) for displaying a video image, a CP card object 2020 (NETCAST PREMIUM) for providing a CP list, and an application card object 2030 (NETCAST APP) for providing a list of applications may be displayed on the display 180. Here, the video image may be a broadcast video which was being displayed prior to accessing the home screen 2000.

While the video image is disclosed herein as being displayed in a card object 2010, this disclosure is not limited thereto. In certain embodiments, the video image display area may be provided separately from the card object area and configured to display a scaled version of a video image which was being displayed prior to accessing the home screen 2000. Here, the displayed video image may be separated from the card objects such that it is not affected by manipulations of the card objects, e.g. a scrolling operation.

In FIG. 20A, additional card objects 2040, 2050, 2060, 2070 are shown positioned outside the display and surrounded by the dotted line. These card objects represent hidden card objects which may be additionally available when the displayed card objects are scrolled. For example, these other card objects which are arranged in a hidden area 2001 and hidden from view, may be shifted or scrolled to show up on the display 180, substituting for card objects displayed on the display 180. As shown, the hidden card objects may include a CHANNEL BROWSER card object 2040 for providing a thumbnail list of broadcast channels, a TV GUIDE card object 2050 for providing a broadcast guide list, a FAVORITE CH card object 2060 for providing a favorite channel card object, a RECORDED LIST card object 2070 for providing a recorded program list, or another appropriate card object. The number, order, or type of card object is not limited.

The broadcast image card object 2010 may include a broadcast image 2015 received through the tuner 110 or the network interface 130, an object 2021 for providing information related to the broadcast image, an object 2017 representing an external device, a setup object 2018, and a favorite channel object 2019 for accessing a favorite channel.

The broadcast image 2015 may be a broadcast video which was being view on the display apparatus prior to accessing the home screen. For example, if a request to display the home screen is received while a broadcast image is being displayed on the display 180 in full screen, the controller 170 may scale down the received broadcast image such that the scaled-down broadcast image can be displayed in the broadcast image card object 2010. The scaling operation may be performed by a scaler 335 included in the image processor 320 of the controller 170, as shown in FIG. 10.

The card object generator may generate the broadcast image card object 2010 including the scaled-down broadcast image 2015 or the object 2021 that includes information about the broadcast image. The display 180 may then display the generated broadcast image card object 2010, as shown in FIG. 20A.

The broadcast image 2015 may be displayed as a card object. The card object for the broadcast image 2015 may be fixed in size and/or position by a lock function such that the user may continue viewing the broadcast image while navigating through the various menu screens.

It may also be possible to scale the broadcast image 2015 according to user manipulation. For instance, the broadcast image 2015 may be resized by dragging an edge of the broadcast image 2015 (or the card object 2010) using the pointer 205. As the broadcast image 2015 is scaled up or down, the number of displayed card objects may be updated accordingly. For instance, four or two card objects may be displayed on the display 180 instead of the three card objects as displayed in FIG. 20A.

When the broadcast image 2015 is selected in the broadcast image card object 2010, the broadcast image 2015 may be displayed on the display 180 in a fullscreen mode. Moreover, the object 2021 representing information about the broadcast image may include a channel number (DTV7-1), a channel name (YBC HD), the title of a broadcast program (Oh! Lady), and airing time (8:00-8:50 PM) of the broadcast program. Therefore, the user can be readily aware of information about the displayed broadcast image 2015. If the user selects the object 2021 representing information about the broadcast image, related EPG information may be displayed on the display 180.

An object 2002 may include a date (03.24), a day (THU), and a current time (8:13 PM). The object 2002 may be positioned above the broadcast image card object 2010 such that the user can readily identify the time using the object 2002. The object 2017 may represent an external device connected to the image display apparatus 100. For example, if the object 2017 is selected, a list of external devices connected to the image display apparatus 100 may be displayed. The setup object 2018 may be used to set various settings of the image display apparatus 100, such as video settings, audio settings, screen settings, reservation settings, setting of the pointer 205 of the remote controller 200, network settings, or another appropriate setting for the image display apparatus. The FAVORITE CH card object 2019 may be used to display a favorite channel. For example, when the object 2019 is selected, the FAVORITE CH card object 2019 may be displayed.

The Netcast Premium card object 2020 may include a list of CPs available on the image display apparatus. The card object 2020 may contain a card object name 2022 (NETCAST PREMIUM) and a CP list 2025. While Yakoo, Metflix, weather.com, Pcason, and My tube are shown as CPs listed in the CP list 2025, as shown in FIG. 20A, it should be apparent that many other CPs may be listed.

If a request to display the home screen 2000 is received while a broadcast image is displayed on the display 180 in fullscreen mode, the card object generator may generate the CP card object 2020 using registered CPs (e.g., CPs to which the display apparatus or a user is registered). The generated CP card object 2020 may then be displayed, as shown in FIG. 20A.

If the card object name 2022 is selected, the card object 2020 may be displayed on the display 180 in fullscreen mode. If a particular CP listed the CP list 2025 is selected, a screen which includes a list of content provided by the CP may be displayed on the display 180. For example, a web page for the CP may be retrieved through the network interface and displayed on the image display apparatus.

The Netcast Apps card object 2030 may display a list of applications available through the display apparatus. The card object 2030 may include a card object name 2032 (NETCAST APPS) and an application list 2035. The applications may be represented by icons or another type of indicia. The applications may be sorted in the application list 2035 based on predetermined categories. As shown in FIG. 20A, applications may be sorted by popularity (HOT) and/or by time (NEW). Additional categories may be also provided to arrange the application icons based on the categories.

The applications card object 2030 may be generated by the card object generator based on an application list received through the network interface 130. The generated application card object 2030 may be displayed, as shown in FIG. 20A. The application list may be received from a CP or a SP which runs an app store. Moreover, the card object 2030 may be generated using an application list which was previously stored in the memory 140.

If the card object name 2032 is selected, the card object 2030 may be displayed on the display 180 in fullscreen mode. If an application icon listed in the application list 2035 is selected, a screen for providing information related to the application may be displayed on the display 180. The screen related to the application may be a web page for downloading or accessing the application. Moreover, the application may be executed by the controller 170 in response to the selection of the icon, and displayed on the display 180.

The home screen may include a Login menu item 2027, a Help menu item 2028, and/or an Exit menu item 2029 which may be displayed above the card objects 2020 and 2030. The Login menu item 2027 may be used to log in to the APP STORE or a network connected to the image display apparatus. The Help menu item 2028 provides guidance on operation of the image display apparatus 100. The Exit menu item 2029 may be used to exit the home screen. When the Exit menu item 2029 is selected, a received broadcast image may be displayed on the display 180 in fullscreen mode.

An indicator 2037 may be displayed under the card objects 2020 and 2030 to indicate a total number of available card objects. Moreover, the indicator 2037 may be configured to indicate the number of card objects being displayed on the display 180 or the relative positions of the displayed card objects among all available card objects.

As previously discussed, a plurality of additional card objects may be available on the display. These card objects may be hidden from view and scrolled onto the display. As shown in FIG. 20A, the Channel Browser card object 2040 may display a list of thumbnails of broadcast channels available on the image display apparatus. The channel browser card object 2040 may include a card object name 2042 (CHANNEL BROWSER) and a thumbnail list 2045 of broadcast channels. The images displayed on the thumbnails may be still images or may be moving picture images. Moreover, the thumbnail list may include information about the channels along with the thumbnail images, so that the user can readily identify broadcast programs of the channels. The thumbnail images may display images related to the channel currently being viewed or to other channels, e.g., channels that come before or after a channel for the broadcast image 2015 that is being displayed in the broadcast image card object 2010. Although eight thumbnail images are displayed in the figure, many other configurations may be possible. Moreover, the thumbnail images in the thumbnail list 2045 may be periodically updated.

If an input for the home screen is received while a broadcast image is being displayed on the display 180 in fullscreen mode, a channel browsing processor or the controller 170 may generate thumbnail images based on received broadcast images. The card object generator may generate the channel browser card object 2040 using the generated thumbnail images. The card object may be displayed on the display or may be hidden from view for subsequent access, as shown in FIG. 20A. Here, the input may also be an input requesting a display of the channel browser card object or an input to refresh the contents of the channel browser card object.

If the card object name 2042 is selected, the card object 2040 may be displayed on the display 180 in a fullscreen mode. That is, the thumbnail list may be displayed on the display 180. If a particular thumbnail image in the thumbnail list 2045 is selected, a broadcast image corresponding to the thumbnail image may be displayed on the display 180. Alternatively, a selection of a thumbnail may cause the corresponding broadcast image to be displayed in the broadcast card object 2010 instead of being displayed in fullscreen. This mode of displaying may be configured in a preference setting of the display apparatus.

The TV Guide card object 2050 may display a list of programs available on the display apparatus. The TV Guide card object 2050 may contain a card object name 2052 (TV GUIDE) and a program list 2055. The program list 2055 may list broadcast programs scheduled to air after the current broadcast program which is being displayed in the broadcast image card object 2010 as well as broadcast programs scheduled for other channels.

If a request for the home screen is received while a broadcast image is being displayed on the display 180 in fullscreen mode, or a selection of an item in the TV Guide card object is received while the home screen is displayed, the card object generator may generate the card object 2050 that includes the program list 2055 using broadcast program guide information (EPG) received through a tuner 110 or broadcast guide information received from a CP or a SP. The TV GUIDE card object 2050 may be configured for display as shown in FIG. 20A.

If the card object name 2052 is selected, the TV Guide card object 2050 may be displayed on the display 180 in fullscreen mode. If a particular broadcast item in the broadcast guide list 2055 is selected, a broadcast image corresponding to the selected broadcast item may be displayed on the display 180 in fullscreen or in the broadcast card object 2010. Alternatively, instead of the broadcast program, information related to the selected broadcast program may be displayed on the display 180.

The Favorite CH card object 2060 may display a list of favorite channels. The Favorite CH card object 2060 may include a card object name 2062 (FAVORITE CH) and a favorite channel list 2065. The channels listed in the favorite channel list 2065 may be pre-stored favorite channels. The favorite channel items may be displayed as thumbnail images or icons. Moreover, the thumbnail images may be still images or video related to the corresponding channel. The favorite channel card object may also include information about the channels along with the thumbnail images of the favorite channels, so that the user can readily identify broadcast programs airing on their favorite channels. Although the favorite channel card object 2060 is shown in FIG. 20A as having eight favorite channels, many other configurations may be possible. Furthermore, the thumbnail images displayed in the favorite channel card object may be updated periodically or manually.

If a request for the home screen is received while a broadcast image is being displayed on the display 180 in fullscreen mode, or a selection of an item in the favorite channel list 2065 is received while the home screen is displayed, the card object generator may generate the favorite channel card object 2060 including the favorite channel list 2065 using a favorite channel list previously stored in the memory 140. The generated favorite channel card object 2060 may be configured for display as shown in FIG. 20A.

If the card object name 2062 is selected, the Favorite CH card object 2060 may be displayed on the display 180 in fullscreen mode. That is, the favorite channel list may be displayed on the display 180 in fullscreen. If a particular thumbnail image of the favorite channel list 2065 is selected, a broadcast image corresponding to the thumbnail image may be displayed on the display 180 or in the broadcast card object 2010.

A card object may be configured to display a list of recorded programs. The Recorded List card object 2070 (Reservation/REC) may include a card object name 2072 (RECORDED LIST or RESERVATION/REC) and a reserved (scheduled) or recorded program list 2075. The scheduled or recorded program list 2075 may be a list including programs scheduled for recording by the user or recorded programs. While a thumbnail image is displayed for each program in FIG. 20A, this is merely exemplary and various other configurations may be provided.

For example, if a request for a home screen is received while a broadcast image is being displayed on the display 180 in fullscreen mode, or a request for the Reservation/REC card object 2070 is received from the home screen, the card object generator may generate the Reservation/REC card object 2070 based on stored recordings or using a scheduled/recorded program list previously stored in the memory 140. The generated Reservation/REC List card object 2070 may be configured for display as shown in FIG. 20A.

If the card object name 2072 is selected, the Reservation/REC card object 2070 may be displayed on the display 180 in fullscreen mode. If a scheduled recording or a recorded program in the reserved or recorded program list 2075 is selected, the recorded broadcast program or information related to the scheduled or recorded broadcast program may be displayed on the display 180. Alternatively, the program or the information may be displayed in the Broadcast card object 2010.

The card objects 2020 and 2030 displayed on the display 180 and the card objects 2040, 2050, 2060 and 2070 which are located in the hidden area 2001 and thus hidden from view may be exchanged with each other. Specifically, at least one of the card objects 2020 and 2030 being displayed on the display 180 may move to the hidden area 2001 and in turn, at least one of the hidden objects 2040, 2050, 2060 and 2070 may appear on the display 180.

It should be appreciated that the card objects as disclosed herein are exemplary and the present disclosure is not limited thereto. Various types of card objects may be provided, for example, a My Apps card object to display a list of applications downloaded or purchased by a user or a card object to run an application within the card object, e.g., display an interface for an application program in the card object. Moreover, a custom card object may be provided to include any type of icon or link as configured by a user.

The home screen 2000 may also include an application menu 2005 having a plurality of application items. The application items may be icons, for example. Particularly, an application menu 2005 may display a predetermined selection of application items among all application items available on the display apparatus. Thus, the application menu 2005 may be referred to as an application compact-view menu.

The application menu 2005 may be include mandatory application items 2006, 2007, 2009 (Search, App Store, and '+') and optional application items 2008 (Music, Book, MAZON, and SNS) as set by a user or by default. The mandatory application menu items 2006, 2007, 2009 may be preset items which the user is not permitted to edit.

The Search application menu item 2006 may provide a search function based on an input search keyword. The App Store application menu item 2007 may enable direct user access to an application store. The '+' (View More) application menu item 2009 may provide a function for viewing all displayed application items. The user-set application items 2008 (Music, Book, MAZON, and SNS) may be edited to include any application icon, for example, those that the user frequently accesses.

The application menu 2005 may further include an Internet application menu item for launching a browser to access the Internet and/or a mail application menu item for accessing an email application program. For example, the web page screen, as shown in FIG. 17, may be displayed by a selection of the Internet application item and the mail screen, as shown in FIG. 18, may be displayed by a selection of the mail application item.

The Internet application item and/or the mail application item may be configured to be mandatory application items which cannot be edited (e.g., deleted or rearranged) by a user. Alternatively, the Internet application item and/or the mail application item may be configured as a user setting application item 2008 to provide the user access to modify the application items.

Moreover, while the application menu 2005 is disclosed herein as having seven application items, it is not limited thereto. For example, additional application items may be added to the application menu 2005. In this case, if the additional application items cannot be displayed in the provided space, the application menu 2005 may be scrolled to view the additional items.

FIG. 20A also illustrates a movement of the card objects using a pointer controlled by a remote controller 2100. That is, in FIG. 20A, the Netcast Apps card object 2030 is selected using a point 205 to be moved to the left. The pointer 205 may be controlled by a remote controller 2100 which may be a motion sensing remote controller. The applications card object 2030 may be flicked or scrolled to the left based on a corresponding motion of the remote controller 200.

Figure 20B:
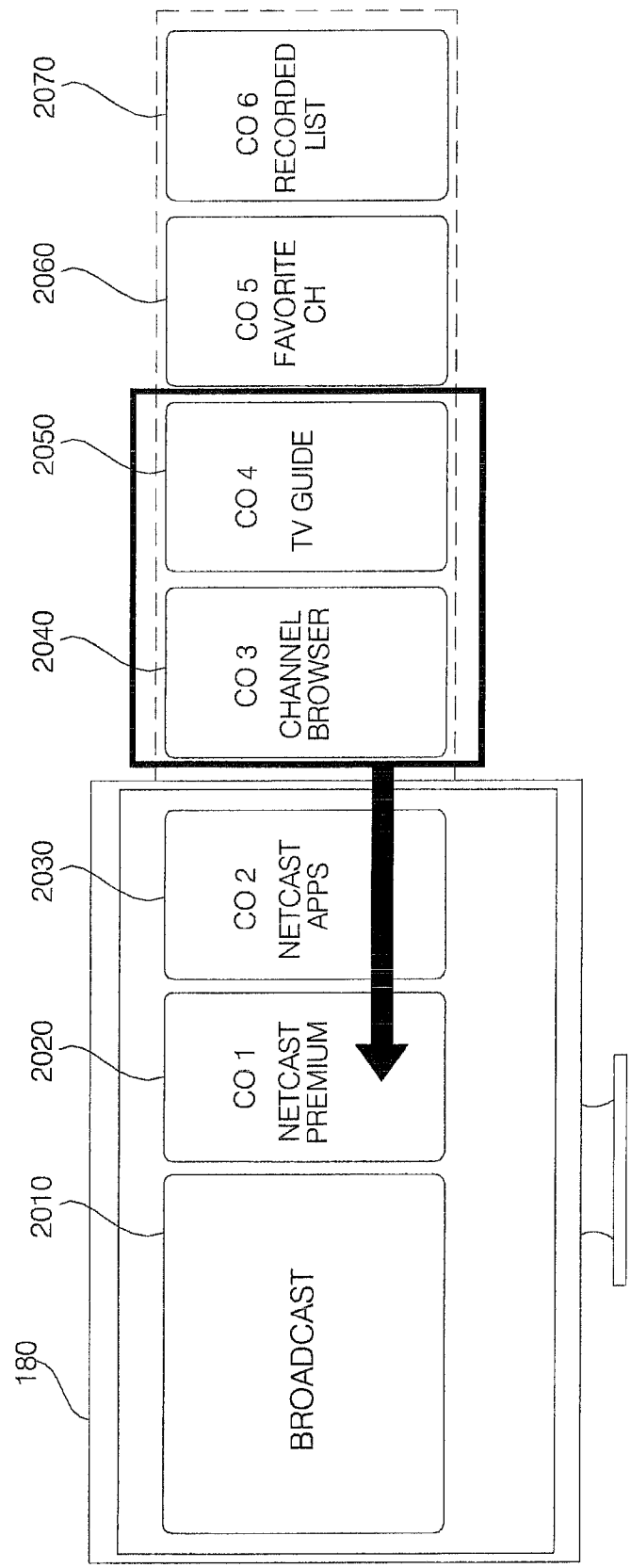
Figure 20C:
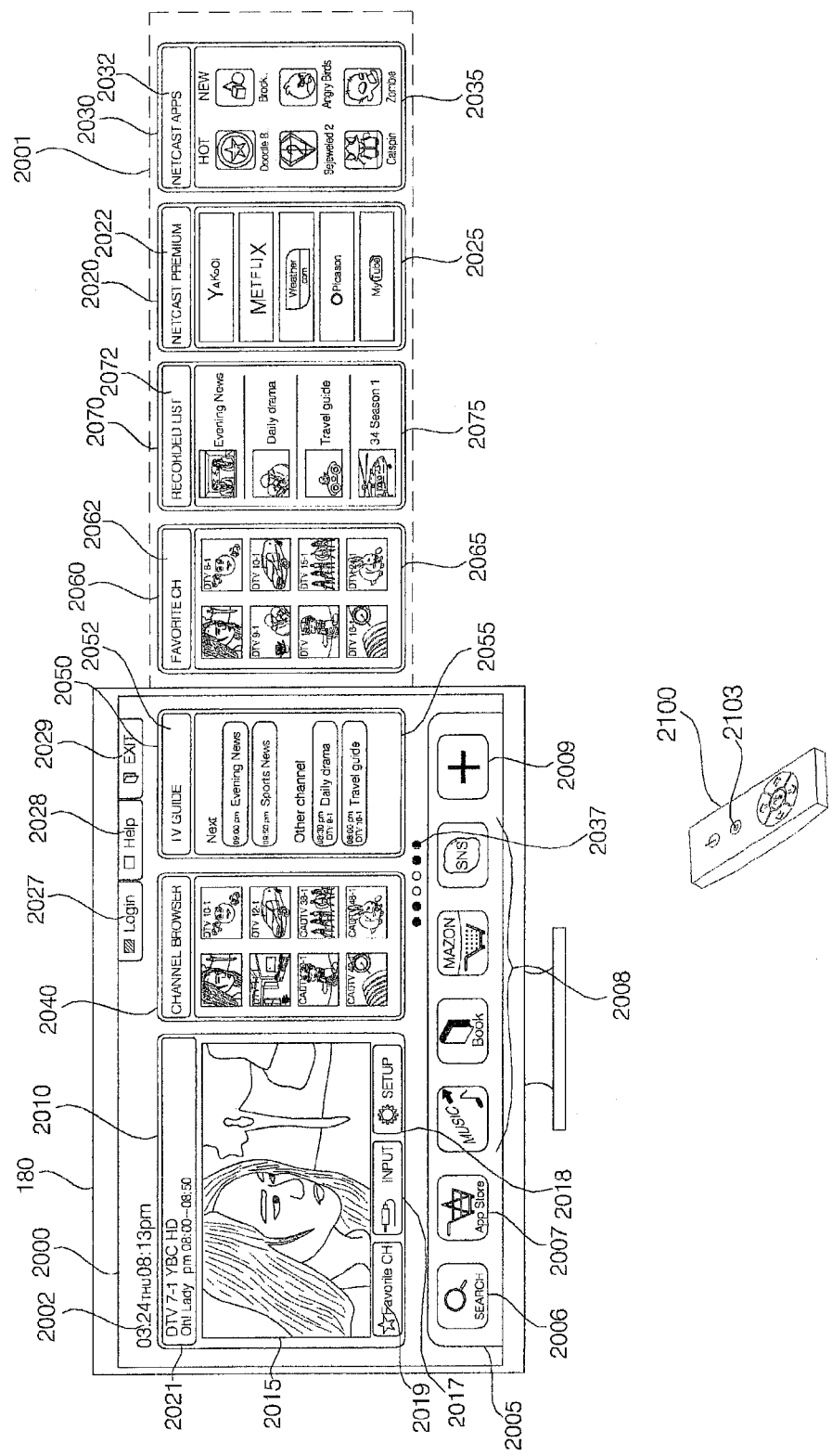

FIGS. 20B and 20C illustrate a movement of the channel browser card object 2040 and a TV Guide card object 2050. Referring to FIG. 20B, the Netcast Premium card object 2020, Netcast Apps card object 2030, Channel Browser card object 2040, TV Guide card object 2050, Favorite CH card object 2060, and the Recorded List card object 2070 are shown in an order CO1 through CO6, respectively. The order of the card objects may be predefined. The Broadcast card object 2010 may be fixed in place independent of movements of the other card objects. Moreover, the card objects 2010, 2020, 2030 are shown as being displayed on the display, while card objects 2040, 2050, 2060, 2070 are positioned off-screen, e.g., in a hidden area.

As shown in FIG. 20C, the Channel Browser card object 2040 and the TV Guide card object 2050 has replaced the Netcast Premium card object 2020 and Netcast Apps card object 2030 on the home screen 200. Here, the Broadcast card object 2010 may be fixed in place such that the broadcast program may continue to be viewed while the other card objects are being moved. That is, the broadcast image card object 2010, the favorite channel browser card object 2040 and the TV guide card object 2050 are now displayed in order. The previously displayed card objects (Netcast Premium card object 2020 and the Netcast Apps card object 2030) are illustrated as being positioned off-screen in the hidden area 2001, after the card object which is last in line (Recorded List card object 2070).

Hereinafter, the movement of the card objects will be described in further detail. FIGS. 21A to 21F illustrate a movement and display of the card objects based on a distance of the movement of the card object.

Figure 21A:
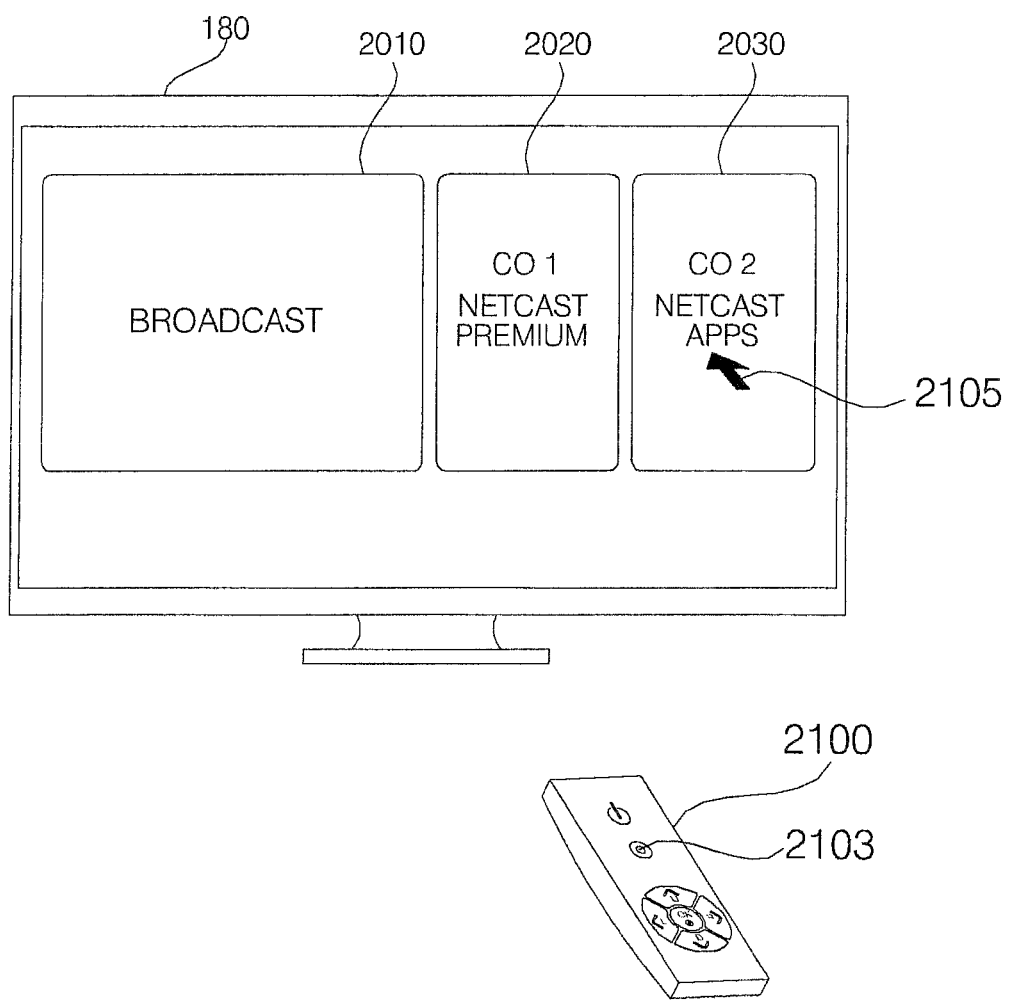
FIGS. 21A to 21E show schematic views of a home screen to illustrate a movement of the card objects according to an embodiment.

FIG. 21A shows a schematic view of the home screen of FIG. 20A. The card objects displayed on the home screen may include the broadcast image card object 2010 (Broadcast), the CP card object 2020 (Netcast Premium) and the application card object 2030 (Netcast Apps). The broadcast image card object 2010 may be configured such that it is not moved or replaced by another card object. It should be appreciated that any of the displayed card objects may also be fixed in place and/or size by a lock setting. Moreover, the application menu 2005 of FIG. 20A is not shown in FIG. 21A simply to ease discussion, but may be displayed below the card objects as previously described.

The pointer 2105 may be displayed on the display and controlled by the remote controller 2100. When the pointer 2105 is positioned over a card object (e.g., the application card object 2030), a selection of a button 2103 on the remote controller 2100 may select the card object and the card object may be dragged across the screen based on a movement of the remote controller 2100.

Figure 21B:
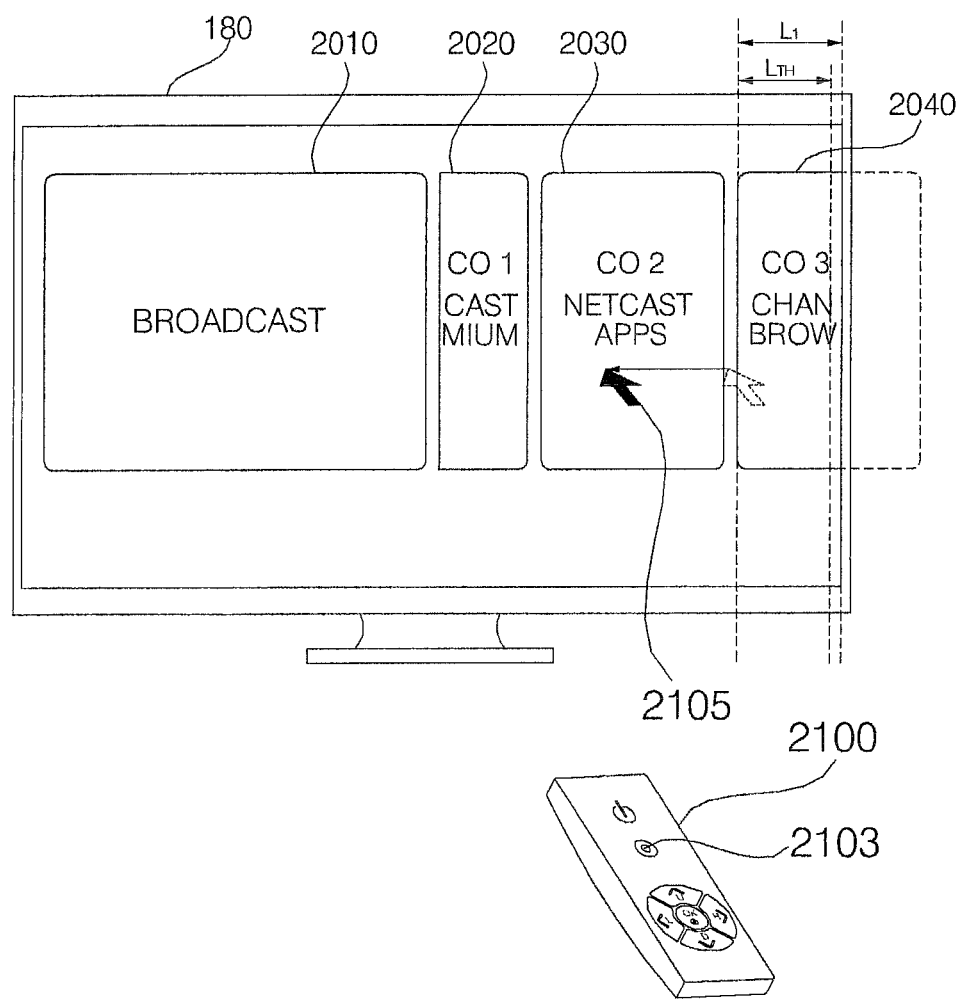

As shown in FIG. 21B, if remote controller 2100 is moved to the left while the first button 2103 is pressed, the pointer 2105 may be moved to the left accordingly to drag the Netcast Apps card object 2030 to the left. As shown, a movement of the Netcast Apps card object 2030 may cause a movement of the Netcast Premium card object 2020. Since the broadcast image card object 2010 is fixed on the display, the Netcast Premium card object 2020 is moved off-screen, as shown in FIG. 21B.

The movement of the Netcast Apps card object 2030 may also cause a card object next in line to be scrolled onto the display. Here, as a portion of the Netcast Premium card object 2020 is moved off-screen, the Netcast Apps card object 2030 is moved into the area previously occupied by the Netcast Premium card object 2020 and a portion of the Channel Browser card object 2040 (the third card object CO3 as shown in FIG. 20B) may be scrolled onto the display to follow the Netcast Apps card object 2030.

The width $L_1$ corresponds to a width of the portion of the Channel Browser card object 2040 newly displayed on the display 180. While the card objects are being dragged across the display, the controller 170 may determine whether the width $L_1$ is greater than or equal to a reference value $L_{TH}$. If width $L_1$ is greater than or equal to the prescribed amount $L_{TH}$, the controller may controls may replace all movable card objects to display new card objects. That is, the broadcast image card object 2010, the Channel Browser card object 2040 (the third card object CO3 as shown in FIG. 20B), and the TV Guide card object 2050 (the fourth card object CO4 as shown in FIG. 20B) may be displayed on the home screen. For example, the Channel Browser card object 2040 may be displayed in the area in which the Netcast Premiere card object 2020 was located and the TV Guide card object 2050 may be displayed in the area in which the application card object 2030 was located.

Moreover, the home screen may include designated areas for displaying each card object. These areas may be aligned based on a predetermined configuration. For example, the card object areas may be positioned on a grid such that when the card objects are scrolled they may be automatically aligned to the grid. Referring again to FIG. 21B, when the Channel Browser card object 2040 is scrolled onto the display by a width $L_1$ greater than or equal to $L_{TH}$, the Channel Browser card object 2040 may be snapped to grid in the area previously occupied by the Netcast Premium card object 2020. Here, the TV Guide card object may also be snapped to grid in the area previously occupied by the Netcast Apps card object 2030.

The grid for the card object areas may be automatically configured by the controller 170 based on the number and size of the displayed card objects, or may be manually configured. For example, when the display size of the broadcast image 2015 is changed, the number of card object areas may be automatically be changed. The grid for aligning the card objects may be changed accordingly to snap the card objects in place based on the new configuration.

The reference value $L_{TH}$ may be preset to any desired value. For example, the reference value $L_{TH}$ may be set as half the total width of the new card object, e.g., the channel browser card object 2040. The reference value $L_{TH}$ may also be set to, for example, a width of a displayed card object, half the width of the display area for the card objects, or the like. The width $L_1$ may be calculated based on changes in the display coordinate of the pointer 2105 during the drag operation.

The controller 170 may also determine whether to automatically scroll the card objects based on other types of inputs, such as a flick. As opposed to a drag input in which only width $L_1$ is used to automatically scroll the card objects, with a flick input, the speed in which the pointer 205 moved across the display may be considered in addition to the width $L_1$. For example, if the speed of the pointer is greater than a predetermined value and the width $L_1$ is greater than a minimum prescribed value, the card objects may be scrolled automatically onto the display. In this case, the width $L_1$ may be set to be a smaller value than with the dragging input. Moreover, the drag and flick inputs may be configured to correspond to a different type of scrolling action, as described in further detail with reference to FIG. 21D hereinbelow.

Figure 21C:
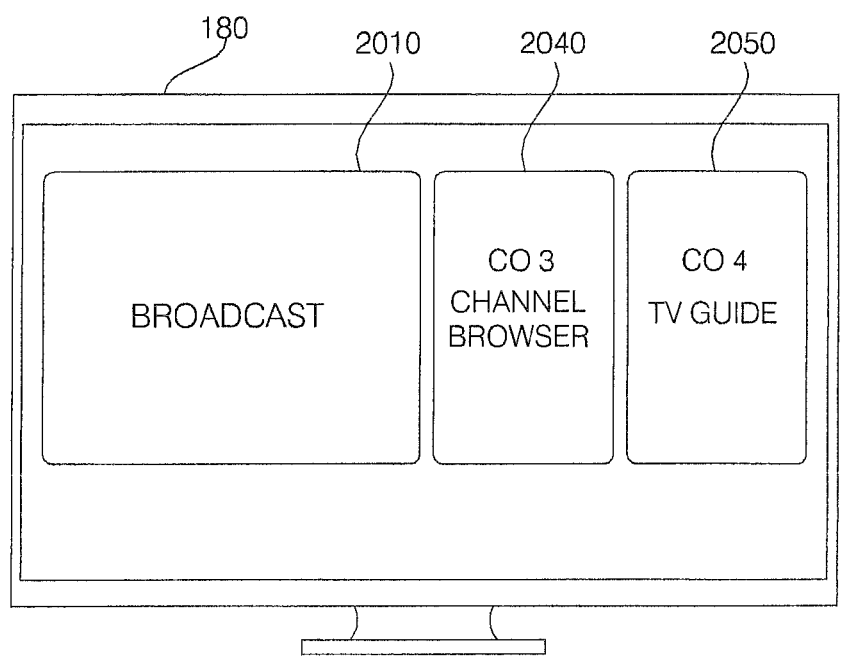
Figure 21D:
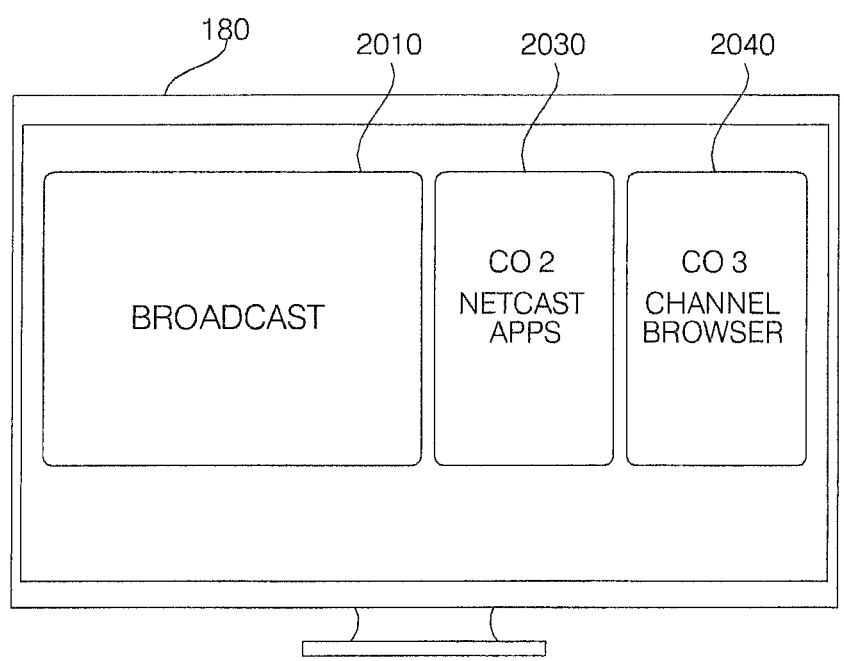

As shown in FIG. 21D, the card objects may be scrolled by one card object on the home screen based on the drag input. For example, unlike the home screen in FIG. 21C, the Netcast Apps card object 2030 (the second card object CO2) may be scrolled into the area previously occupied by the Netcast Premium card object 2020 and the Channel Browser card object 2040 (the third card object CO3) may be scrolled into the area previously occupied by the Netcast Apps card object 2030. As a result, if the width $L_1$ representing the displayed portion of the new card object is equal to or greater than a predetermined value $L_{TH}$, the card objects may be shifted by one position.

As previously described, a flick input may also be used to scroll the card objects. In one embodiment, both the flick and drag input may be used to control the scrolling of the card objects. For example, when a large number of card objects are displayed (e.g., by reducing the size of the Broadcast card object 2010 as well as the size of each card object), it may be desirable to provide an option to scroll just one card object or all card objects. Here, the flick input may used to scroll and replace all displayed card objects, and the drag input may be used to scroll and replace one card object.

In another embodiment, the distance $L_1$ may be used to determine a type of scrolling operation. Here, a predetermined threshold $L_{TH1}$ may correspond to a first type of scrolling operation, and a predetermined threshold $L_{TH2}$ may correspond to a second type of scrolling operation. For example, if $L_1$ is greater or equal to $L_{TH1}$, but less than $L_{TH2}$, where $L_{TH2}$ is greater than $L_{TH1}$, the card objects may be scrolled by a predetermined number of card objects (e.g., one new card object). However, if $L_1$ is greater than or equal to $L_{TH2}$, then all card objects may be replaced with new card objects (e.g., the next card objects available from the hidden area). Here, $L_{TH1}$ may be half the width of a card object, while $L_{TH2}$ may be half the width of the display screen. The values for the threshold distances, and the types of input operations associated thereto, may be stored in a preference setting on the display apparatus.

Figure 21E:
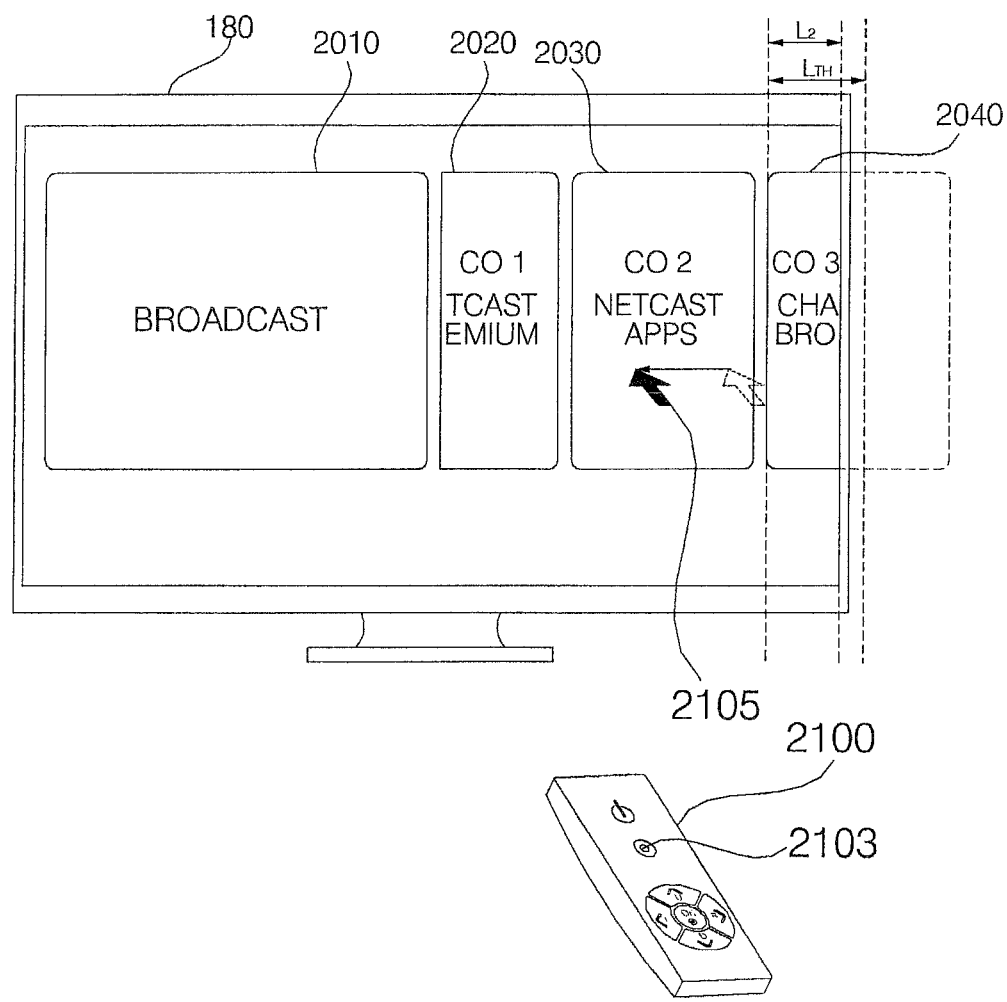
Figure 21F:
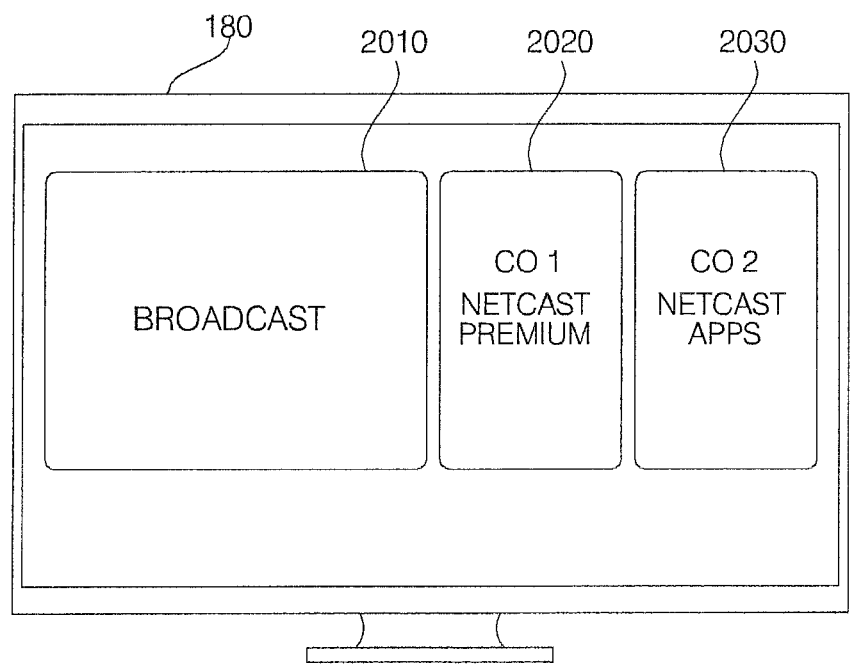

FIGS. 21E and 21F illustrate a movement of the card objects when a displayed portion of the new card object during the drag operation is insufficient. In FIG. 21E, similar to FIG. 21B if the drag operation is performed to the left in a state in which the first button 2103 of the remote controller 2100 is pressed, the Netcast Apps card object 2030 may be moved to the left according to the drag operation. As shown in FIG. 21E, a width $L_2$ represents the portion of the new card object (Channel Browser card object 2040) which is displayed on the display 180 and reference value $L_{TH}$ represents a predetermined threshold value.

The controller 170 may determine whether the width $L_2$ is less than the reference value $L_{TH}$. If the Channel Browser card object 2040 is not scrolled onto the screen by the threshold value $L_{TH}$, the controller 170 may not automatically move the card objects. For example, the controller may allow the card objects to return to their original positions. As a result, as shown in FIG. 21F, the broadcast image card object 2010, the Netcast Premium card object 2020 and the Netcast Apps card object 2030 may be displayed on the home screen.

Although FIGS. 21A to 21F show the scrolling of the card object according to a left drag input, it should be appreciated that the card objects may be scrolled to the right side of the display. Moreover, while the card objects are disclosed as being scrolled across the display, the card objects may be replaced instantly when the new card object is moved onto the screen by the prescribed amount.

Figure 22A:
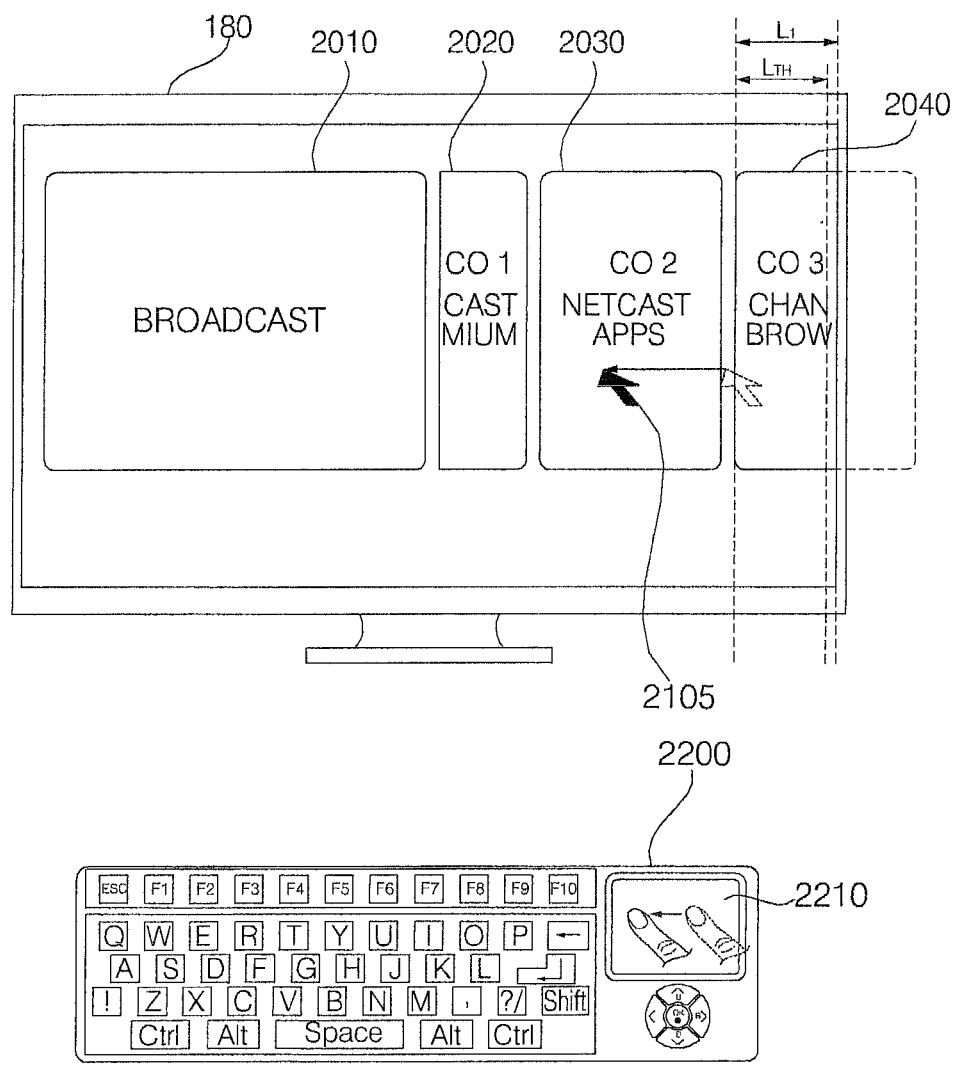
FIGS. 22A to 22B shows schematic views of a home screen to illustrate a movement of the card objects according to another embodiment.
Figure 22B:
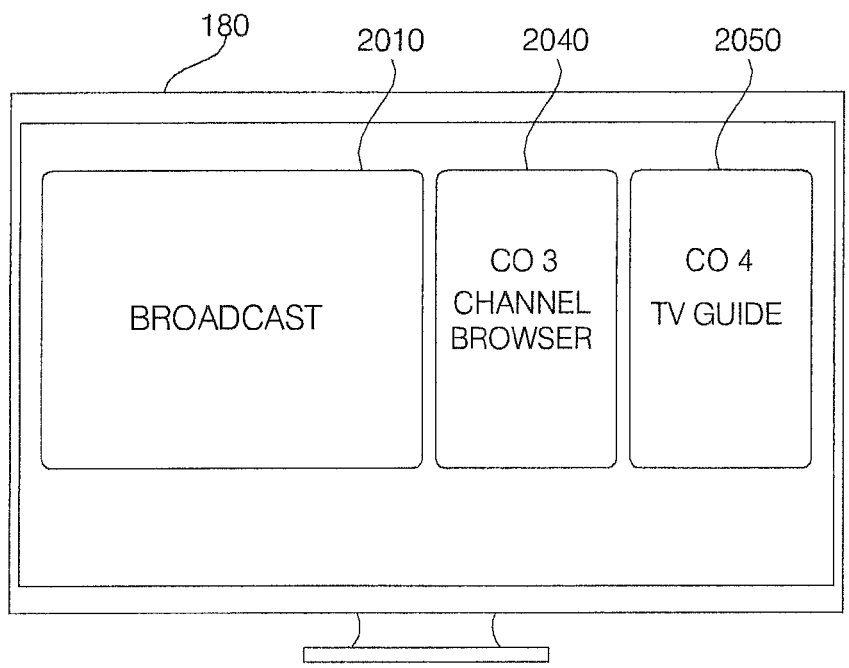

FIGS. 22A and 22B illustrate scrolling the card objects based on an input from a remote controller 2200 that includes a touch pad 2210. This embodiment includes features of the previously described embodiment with reference to FIGS. 21A to 21F, thus, duplicative description is omitted hereinbelow.

Referring to FIG. 22A, when the Netcast Apps card object 2030 is scrolled, the Netcast Premium card object 2020 and the Channel Browser card object 2040 may also be scrolled on the display 180, as previously described with reference to FIG. 21B. However, in this case, the remote controller 2210 may include a touch pad 2210 to control the pointer 2105. If a left drag input is received through the touch pad 2210, the pointer 2105 may be dragged to the left to correspond to the input. The card object may be moved and displayed according to the drag operation as previously described.

When the new card object (Channel Browser card object 2040) is scrolled onto the display be a predetermined amount such that width $L_1$ is greater than or equal to $L_{TH}$, the card objects may be automatically scrolled into prescribed positions. For example, as shown in FIG. 22B, the Channel Browser card object may be displayed in the first position previously occupied by the Netcast Premium card object 2020, and the TV Guide card object 2050 which is the next card object after card object 2040 may be displayed in the second position previously occupied by the Netcast Apps card object 2030. Alternatively, the card object may be shifted by one card object when the new card object is displayed by the prescribed amount.

The remote controller 2200 may include similar features as remote controller 200 of FIG. 13, as previously described. The remote controller 2200 may include a functional key, character keys (e.g., a QWERTY keyboard) and a directional key in addition to the touch pad 2210. Moreover, the remote controller 2200 may include a touch screen display and the input keys may be provided on the touch screen display. In certain embodiments, the image display apparatus may be provided with a touch screen display such that inputs may be made on the display of the display apparatus. Alternatively, rather than a touch screen display, proximity sensors may be provided around the display of the display apparatus to sense a position of a stylus or finger approaching the display.

Figure 23A:
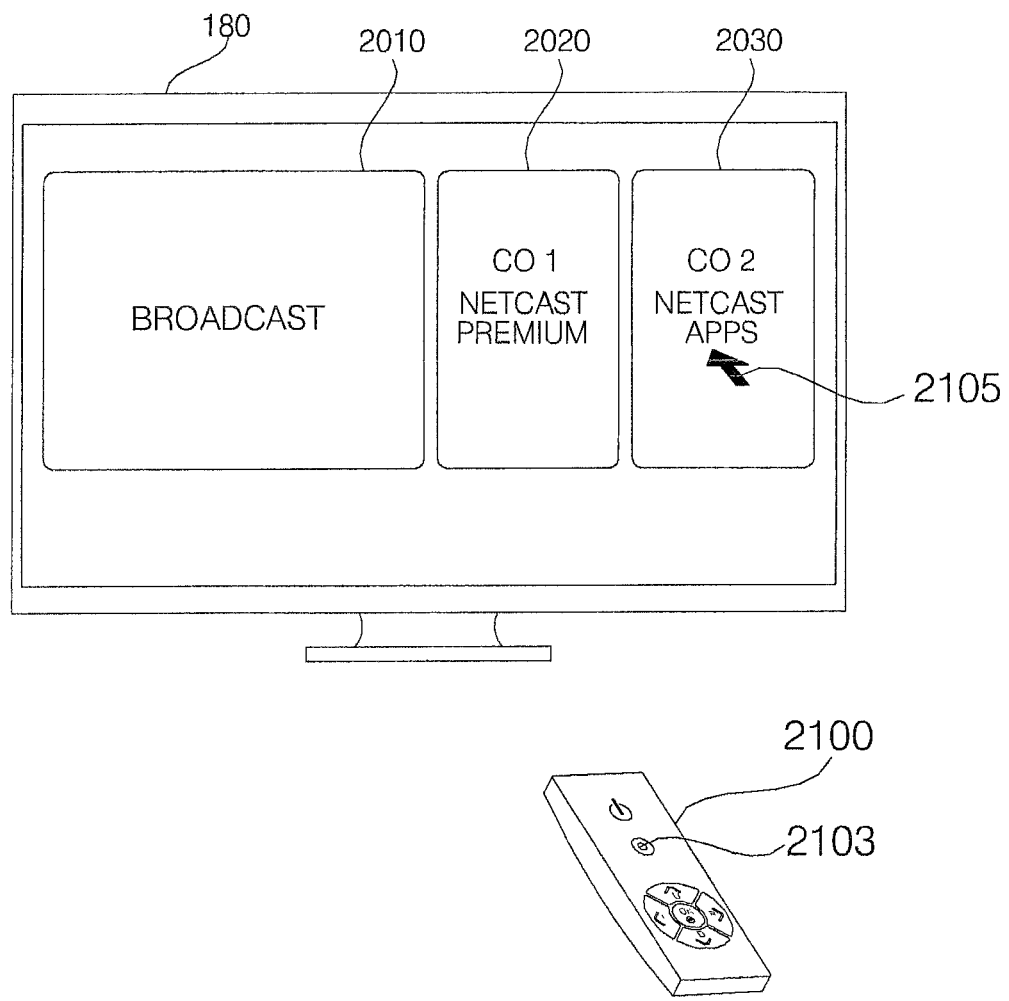
FIGS. 23A to 23E shows schematic views of a home screen to illustrate a movement of the card objects according to another embodiment.

FIGS. 23A to 23E illustrate a movement and display of the card objects based on an area of a displayed portion of a new card object. FIG. 23A schematically shows a home screen similar to FIG. 21A. Here, the broadcast image card object 2010, the Netcast Premium card object 2020 and the Netcast Apps card object 2030 may be displayed on the home screen. Moreover, a pointer 2105 may be provided that moves corresponding to a movement of the remote controller 2100. When a button 2103 provided on the remote controller 2100 is pressed while the pointer 2105 is positioned over the Netcast Apps card object, as shown in FIG. 23A, a drag operation may be performed.

Figure 23B:
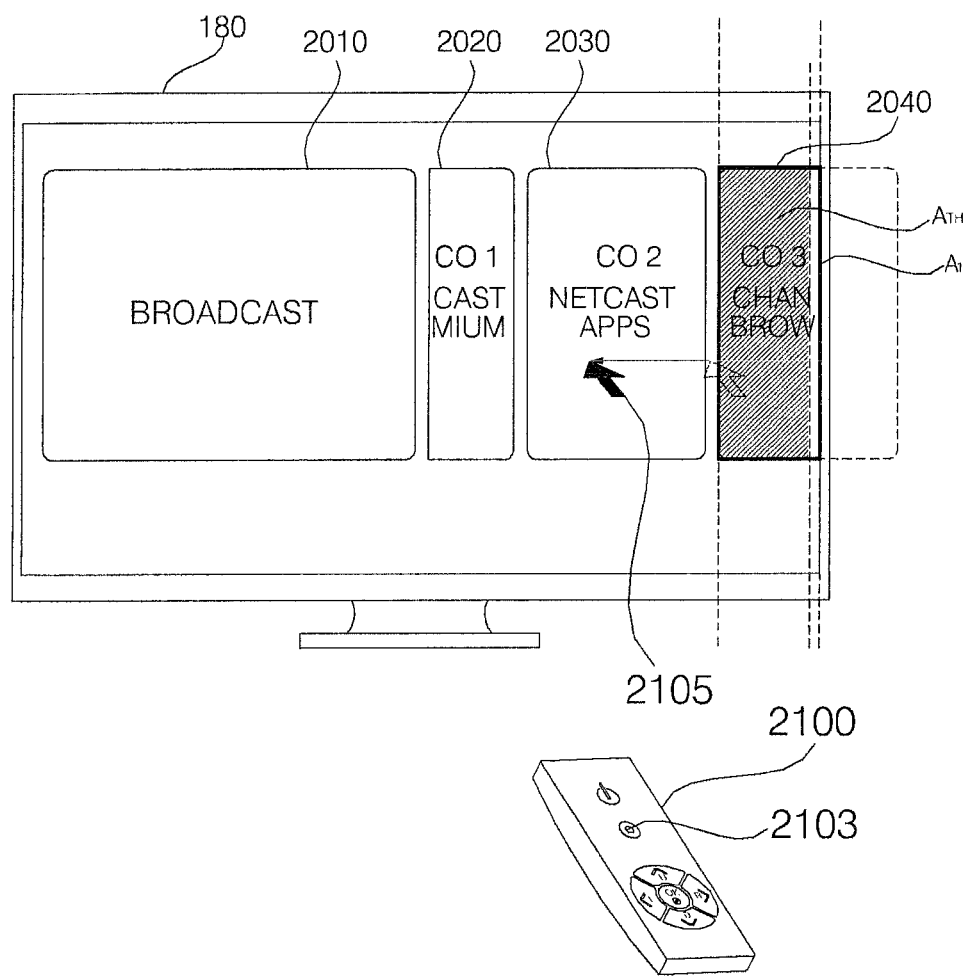

As shown in FIG. 23B, if the drag operation is performed to the left side in a state in which the button 2103 of the remote controller 2100 is pressed, that is, if the pointer 2105 is moved to the left, the application card object 2030 may be moved to the left according to the drag operation. At this time, the Netcast Premium card object 2020 that is displayed at the left side of the application card object 2030 may be moved to the left such that only a portion of the Netcast Premium card object 2020 is displayed. A portion of the Channel Browser card object 2040 may be displayed in the area in which the Netcast Apps card object 2030 was located, as shown in FIG. 23B.

An area $A_1$ may represent an area of a portion of the Channel Browser card object 2040 which is newly displayed on the display 180. An area $A_{TH}$ may represent a predetermined threshold value. The controller 170 determines whether the display area $A_1$ of the Channel Browser card object is greater than or equal to the reference value $A_{TH}$ upon the movement of the card object to the left or right. The display area $A_1$ may be calculated based on a change in the display coordinate of the pointer 2105, the shape, and size of the newly displayed card object, e.g., Channel Browser card object 2040.

Figure 23C:
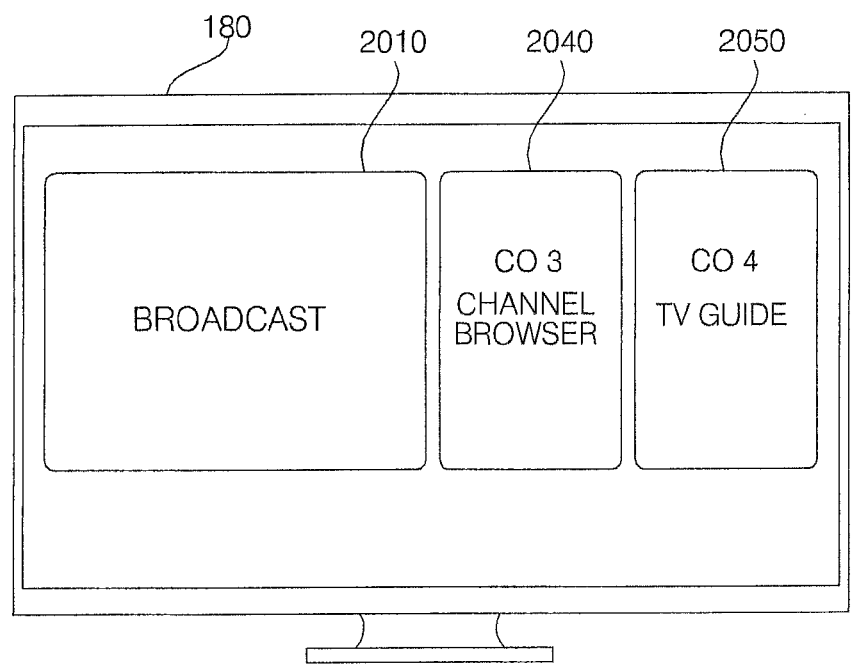

If the display area $A_1$ is greater than or equal to the reference value $A_{TH}$, as shown in FIG. 23C, the broadcast image card object 2010, the channel browser card object 2040, and the TV guide card object 2050 may be displayed on the home screen. For example, comparing FIG. 23C to FIG. 23A, the Channel Browser card object 2040 may be displayed in the area in which the Netcast Premium card object 2020 was previously displayed and the TV Guide card object 2050 may be displayed in the area in which the Netcast Apps card object 2030 was previously displayed.

Moreover, while the card objects are disclosed as being scrolled or moved by two card objects in FIG. 23C, the card objects may be scrolled by one card object as previously described with reference to FIG. 21D. Furthermore, if the number of card objects displayed on the home screen is greater than two, the card objects may be scrolled or moved by any predetermined number of card objects as preset in a preference setting.

As a result, if the display area $A_1$ of the newly displayed card object is greater than or equal to the predetermined value $A_{TH}$ during the drag operation, corresponding card objects may be immediately be moved and displayed in a corresponding area. In other words, once the threshold value is satisfied, a predetermined number of new card objects may be automatically be scrolled onto the display to replace a predetermined number of existing card objects. Moreover, the new card objects may be configured to instantly replace the existing card objects instead of scrolling the card objects across the home screen. Thus, the user may be able to readily display a desired card object.

Figure 23D:
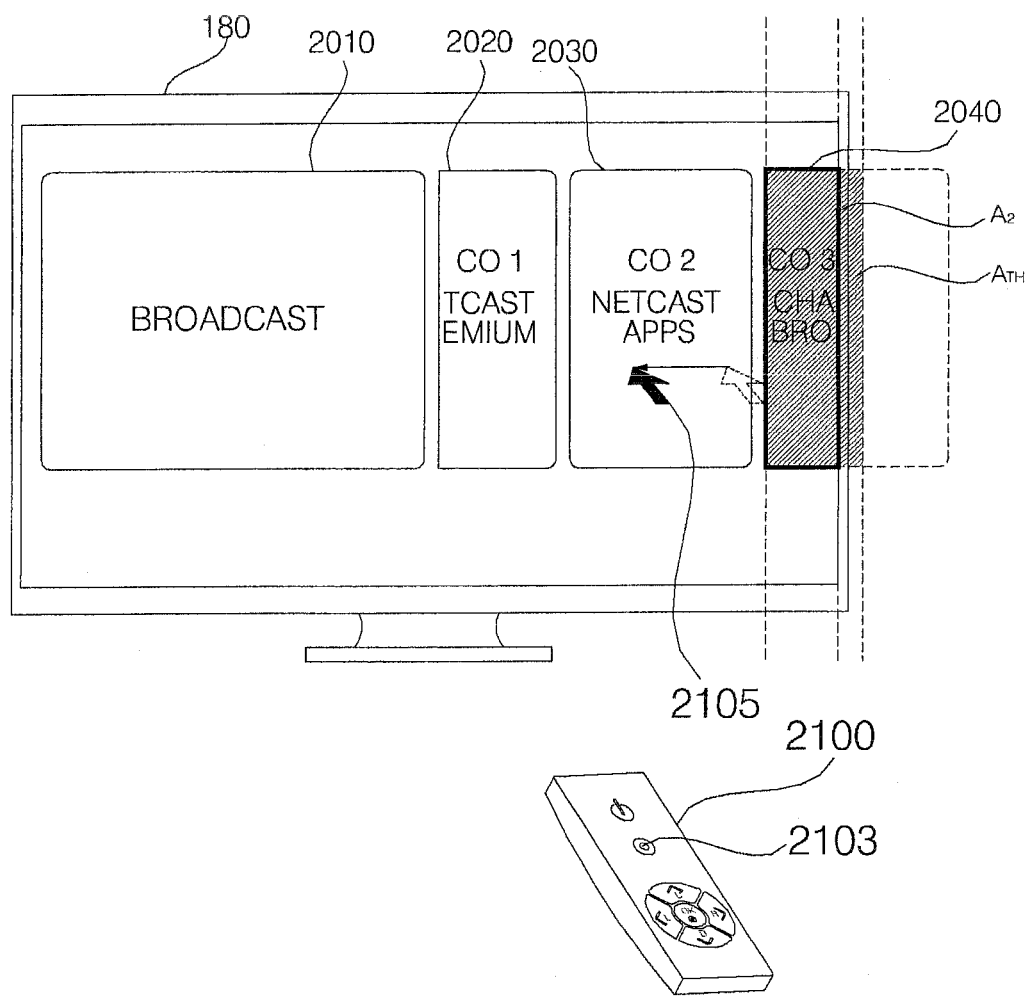

In FIG. 23D, similar to FIG. 23B, if the drag operation is performed to the left in a state in which the button 2103 of the remote controller 2100 is pressed, the Netcast Apps card object 2030 may be moved to the left according to the drag operation. Here, the display area A2 may represent the portion of the Channel Browser card object 2040 newly displayed on the display 180. The controller 170 may determine whether the display area A2 is less than the reference value ATH upon the movement of the Netcast Apps card object to the left or right. As shown in FIG. 23D, if the display area A2 is less than the reference value ATH, the card objects are not scrolled for display in a new position.

Figure 23E:
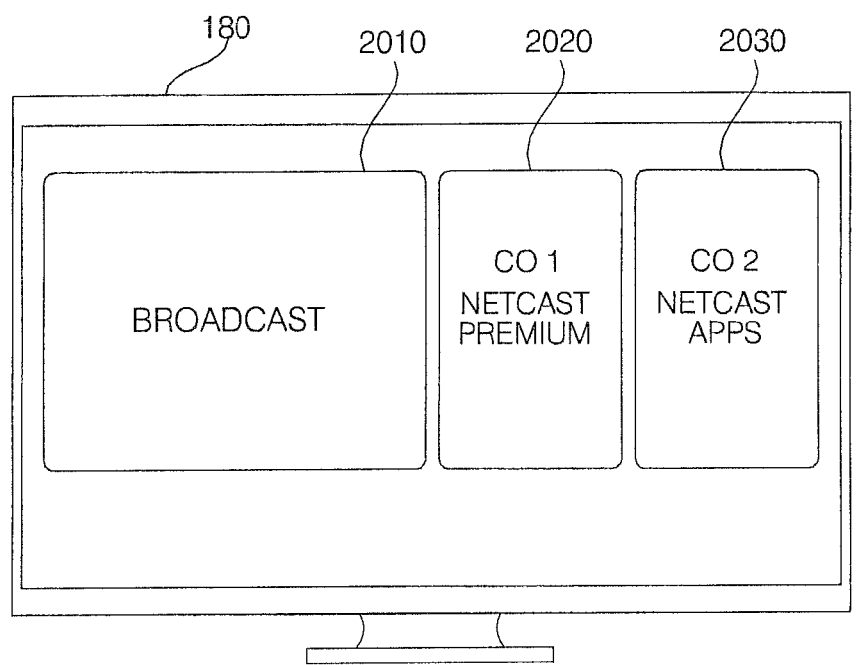

For example, as shown in FIG. 23D, if the button 2103 on the remote controller 2100 is not pressed during the drag operation, the drag operation is no longer performed. At this time, since the display area A2 is less than the reference value ATH, as shown in FIG. 23D, the controller 170 may control each card object to be displayed in its area without change, as shown in FIG. 23E. In other words, as shown in FIG. 23E, the broadcast image card object 2010, the Netcast Premium card object 2020, and the Netcast Apps card object 2030 may be displayed on the home screen.

Figure 24A:
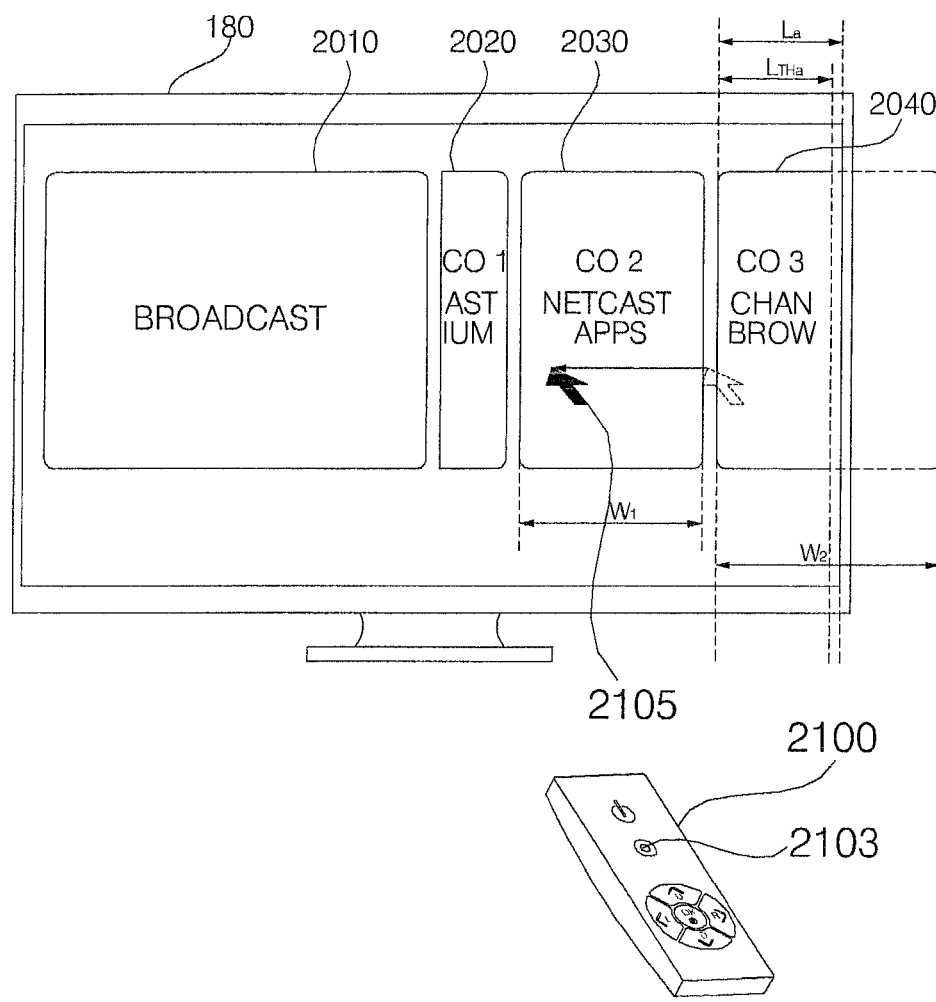
FIGS. 24A to 24B shows schematic views of a home screen according to an embodiment.

Similar to FIG. 21B, FIG. 24A shows the broadcast image card object 2010, the CP card object 2020 and the application card object 2030 displayed on the home screen. In FIG. 24A, however, the size of the Channel Browser card object 2040 may be different than the other card objects. Here, a width of the Netcast Apps card object 2030 may be $W_1$, and a width of the Channel Browser card object 2040 may be $W_2$. As shown, $W_2$ may be configured to be greater than $W_1$.

In FIG. 24A, the Netcast Apps card object 2030 may be selected and dragged to the left using the pointer 2105 controlled by a movement of the remote controller 2100. The drag operation may be performed in a state in which the button 2103 of the remote controller 2100 is pressed. A width $L_a$ may correspond to a portion of the Channel Browser card object 2040 that is newly displayed on the display 180.

Figure 24B:
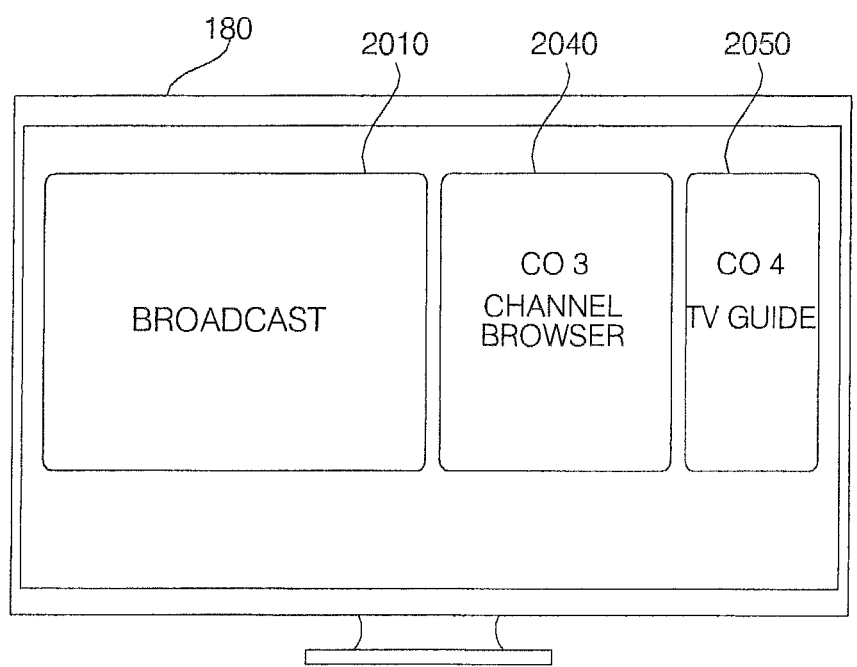

The controller 170 may determine whether the width $L_a$ of the channel browser card object 2040 newly displayed on the display 180 is greater than or equal to the reference value $L_{THa}$. If width $L_a$ is determined to be greater than $L_{THa}$, the controller may control each card object to be automatically moved and displayed, as shown in FIG. 24B. That is, the Broadcast image card object 2010, the Channel Browser card object 2040 and the TV Guide card object 2050 may be displayed on the home screen.

However, since the size of the Channel Browser card object 2040 of FIG. 24B is greater than that of FIG. 21C, as shown in FIG. 24A, the reference value $L_{THa}$ may be configured to be greater than the reference value $L_{TH}$ as previously described. For example, if the size of a card object is changed, the corresponding reference value may also be changed according to the size of the card object being scrolled onto the display 180. The predetermined threshold value $L_{THa}$ may be changed based on the shape of the card object, the drag direction or the position of the card object, in addition to the size of the card object.

Moreover, a configuration of the layout of the home screen, including the predetermined areas designated for displaying the card objects, may be changed. For example, in FIG. 24B, because the Channel Browser card object 2040 has a larger width, the TV Guide card object 2050 may be configured to have a smaller width such that both card objects may be displayed. Additionally, the Broadcast card object 2010 may also be resized to accommodate other card objects.

Although the width $W_2$ of the card object being newly displayed on the display 180 may be used as a criterion to set the threshold width $L_{THa}$, any distance or criteria (e.g., width of display area or preset custom width) may be used as previously described. Likewise, simply for ease of explanation, the width or a height is disclosed hereinbelow as being used as a criterion for setting the prescribed amount which the new card object must be displayed, however, any value or criteria may be used as previously described.

Figure 25A:
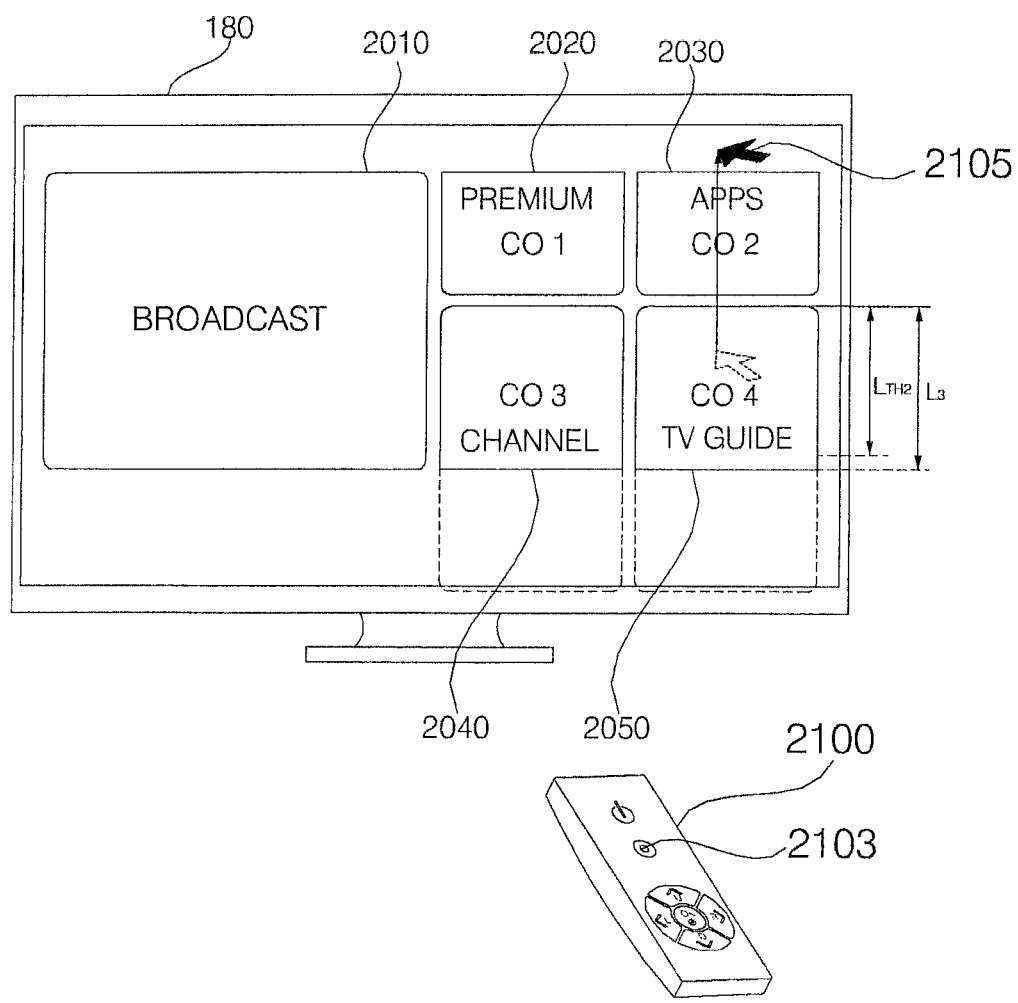
FIGS. 25A to 25D shows schematic views of a home screen to illustrate a movement of the card objects in a vertical direction according to an embodiment.

FIGS. 25A to 25D illustrate a method of moving the card objects vertically (e.g., moves up and down) as opposed to horizontally (e.g., moves left and right) as previously disclosed. Referring to FIG. 25A, the Netcast Apps card object 2030 may be selected and dragged upward using a pointer 2105 controlled by a movement of the remote controller 2100. A portion of the Channel Browser card object 2040 and the TV Guide card object 2050 may be partially displayed on the display 180 during the movement of the Netcast Apps card object 2030.

The height $L_3$ corresponds to a portion of the Channel Browser card object 2040 or the TV Guide card object 2050 newly displayed on the display 180. The drag operation may be performed in a state in which the button 2103 of the remote controller 2100 is pressed.

The controller 170 may determine whether the height $L_3$ of the Channel Browser card object 2040 (or the TV Guide card object 2050) newly displayed on the display 180 is greater than or equal to a reference value $L_{TH2}$ during the movement of the card objects up and down. The height $L_3$ may be calculated based on the display coordinate change of the pointer 2105.

Figure 25B:
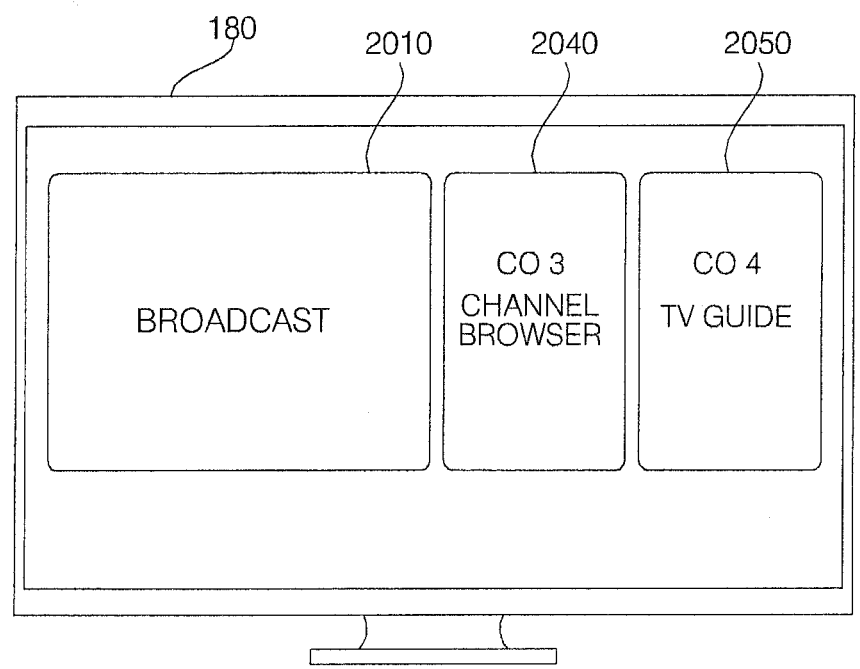

As shown in FIG. 25A, if the length $L_3$ is greater than the reference value $L_{TH2}$, the Broadcast card object 2010, the Channel Browser card object 2040 and the TV Guide card object 2050 may be displayed on the home screen. For example, compared with FIG. 25A, the Channel Browser card object 2040 may be displayed in the area in which the Netcast Premium card object 2020 was located and the TV Guide card object 2050 may be displayed in the area in which the Netcast Apps card object 2030 was located, as shown in FIG. 25B.

Figure 25C:
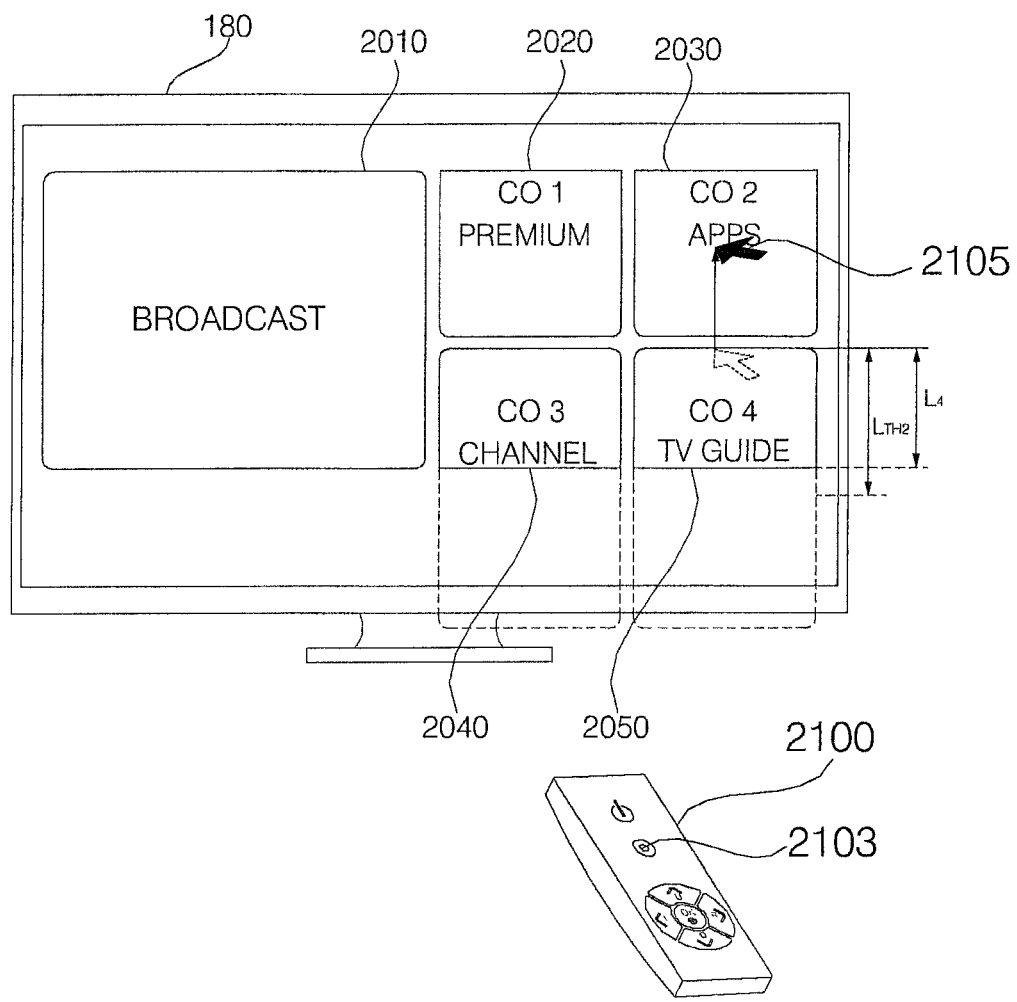
Figure 25D:
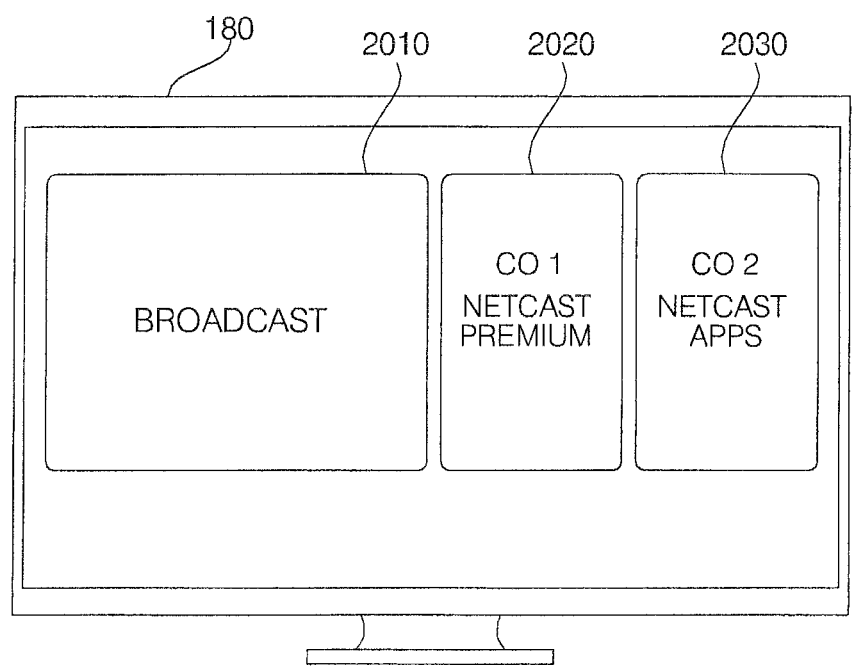

Referring now to FIG. 25C, if the height $L_4$ representing a portion of the Channel Browser card object 2040 or the TV guide card object 2050 newly displayed on the display 180 is less than the reference value $L_{TH2}$, as shown in FIG. 25D, the Broadcast card object 2010, the Netcast Premium card object 2020 and the Netcast Apps card object 2030 may be displayed on the home screen without change. For example, when the button 2103 is released, the card objects may slide across the screen to return to their original positions since the new card objects were not scrolled onto the display by the predetermined threshold amount.

Figure 26A:
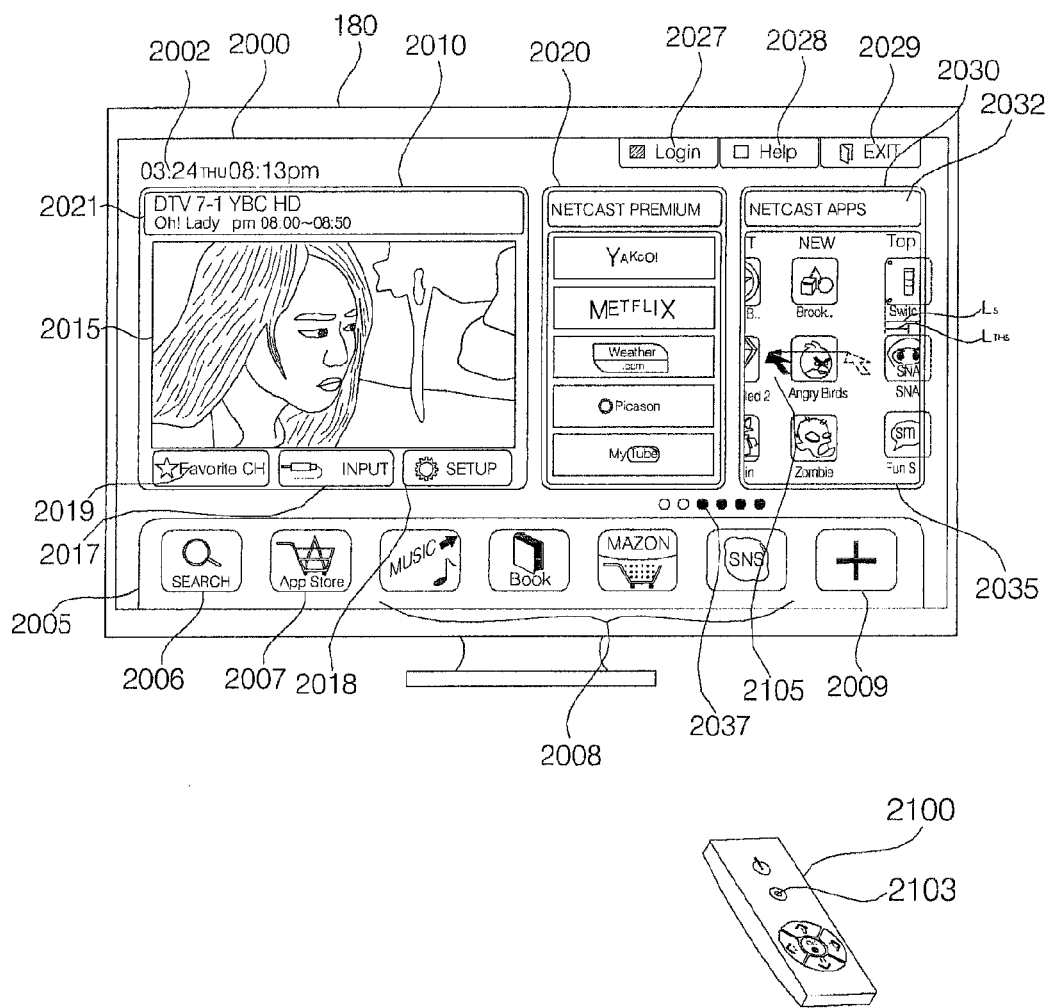
FIGS. 26A to 26B show a home screen to illustrate scrolling through a list displayed within a card object according to an embodiment.

FIGS. 26A to 26D illustrate a method of scrolling through a list displayed within a card object. Referring to FIG. 26A, the home screen may display a plurality of card objects 2010, 2020 and 2030 and the application menu 2105, similar to the home screen as shown in FIG. 20A.

As shown in FIG. 26A, the Netcast Apps card object 2030 may include an application list 2035 which displays a plurality of application icons available on the display apparatus. The application list 2035 may be selected and dragged to the left using a pointer 2105 which may be controlled be a movement of the remote controller 2100. When one icon is moved, new hidden icons may be scrolled onto the card object to be displayed.

Figure 26B:
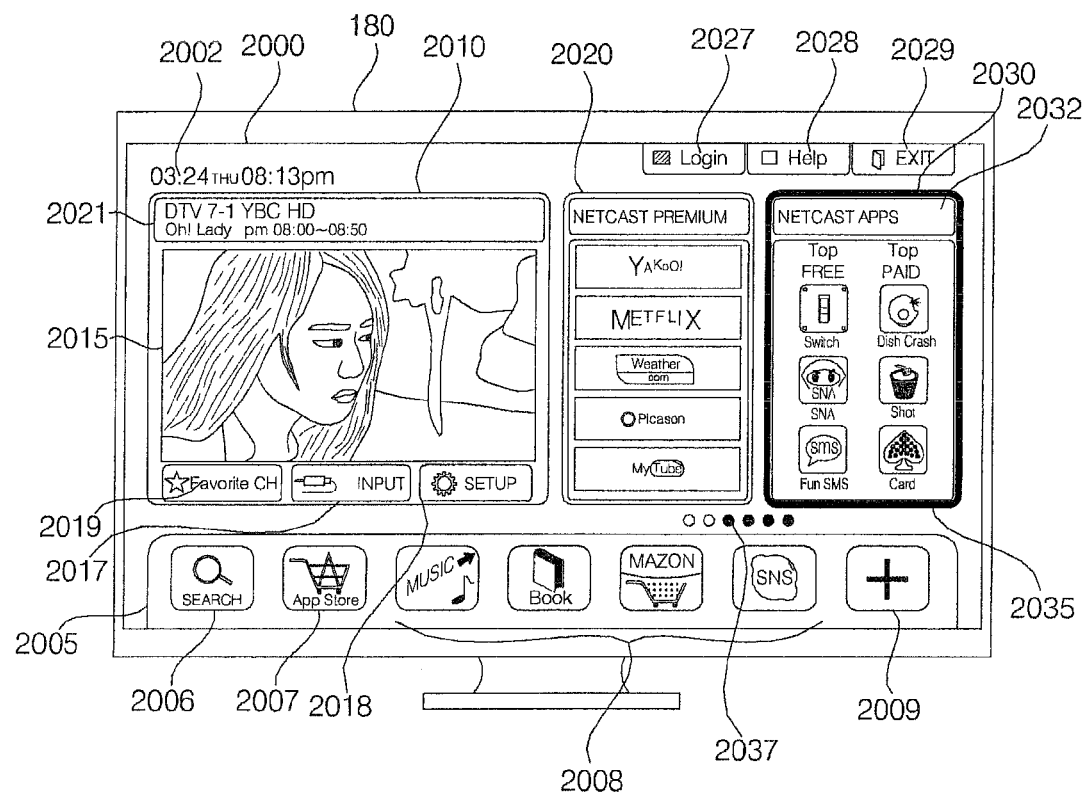

The width $L_5$ may represent a width of the application icon which is newly displayed on the display 180. The drag operation may be performed in a state in which the button 2103 of the remote controller 2100 is pressed. The controller 170 may determine whether the width $L_5$ is greater than or equal to the reference value $L_{TH5}$ upon scrolling the list displayed in the card object. If the width $L_5$ is greater than or equal to the reference value $L_{TH5}$, as shown in FIG. 26A, the application list 2035 within the application card object 2030 may be scrolled to display new icons, as shown in FIG. 26B.

For example, hidden application icons under categories "Top FREE" and "Top PAID" may follow the displayed categories "HOT" and "NEW". When the drag input causes the hidden applications icons under "Top FREE" to be displayed more than the prescribed threshold, the display categories "HOT" and "New" may be replaced by categories "TOP FREE" and "TOP PAID". The changed application list 2035, or the application card object 2030 including the application list 2035, may be displayed to allow the user to easily view the additional icons.

Figure 27A:
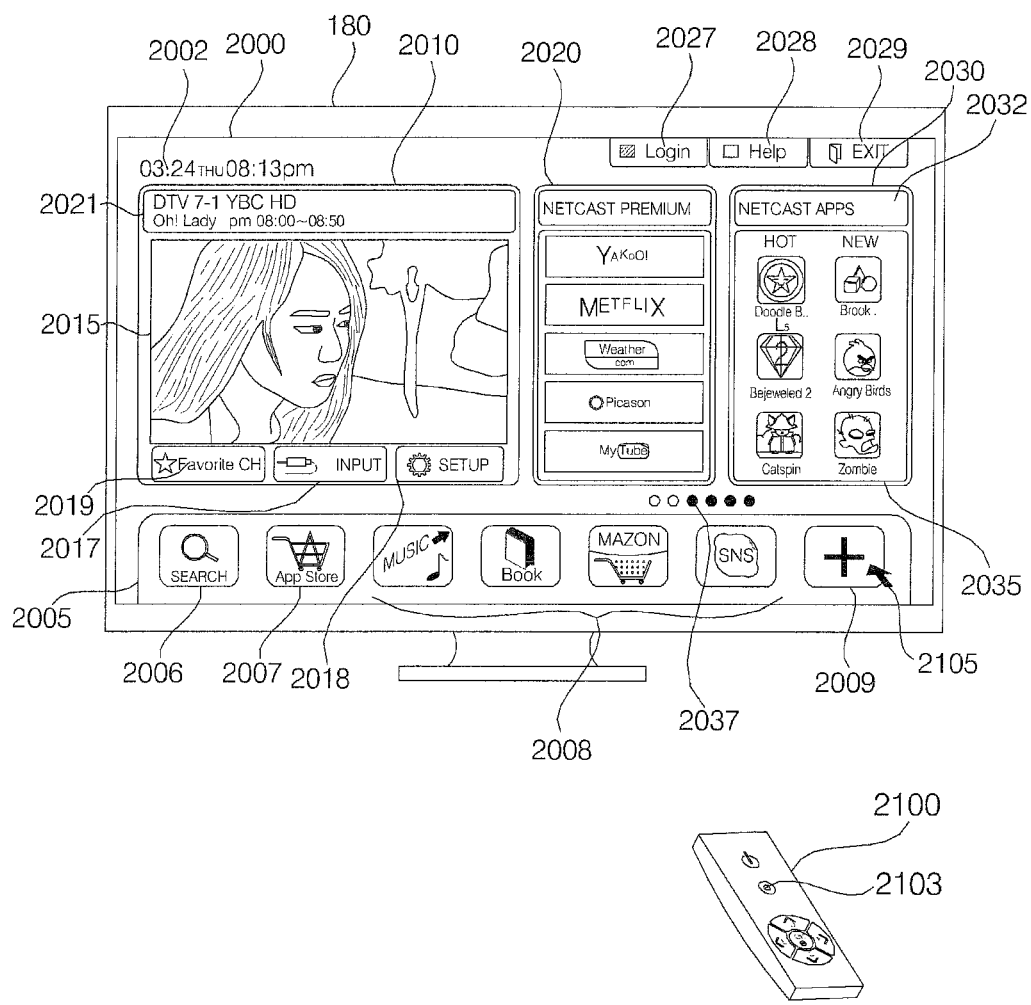

FIGS. 27A to 27D show a display screen to illustrate scrolling through an application list. As shown in FIG. 27A, the home screen may display a plurality of card objects 2010, 2020 and 2030 and the application menu 2005, similar to the home screen of FIG. 20A.

As shown in FIG. 27A, the '+' (View More) application item 2009 in the application menu 2005 may be selected using the pointer 2105 controlled by a movement of the remote controller 2100. For example, an object on the screen may be selected by pressing a predetermined button on the remote controller 2100 when the pointer 2105 is positioned over the object to be selected, for example, the button 2103 or a directional key.

Referring to FIG. 27B, in response to the selection of the '+' (View More) application item 2009, the compact-view application menu 2005 displayed on the home screen may be displayed as a full application list 1400. The full application list 1400 may include a compact-view application list 1410 which may correspond to the application menu 2005 and an extended application list 1450 which may include additional application items (application icons).

In particular the application icons of the compact-view application list 1410 may be the same as the icons displayed in the application menu 2005 of FIG. 27A, with the exception of the '+' (View More) application item 2009. In the compact-view application list 1410 of FIG. 27B, the '+' (View More) application item 2009 may be replaced by the '−' (compact-view) application item 1409 among the mandatory application items. That is, a selection of the compact-view application item 1409 may be provided to return the display back to the home screen of FIG. 27A.

The extended application list 1450 may include additional application icons which are also available on the image display apparatus. Referring to FIG. 27B, if a point within the extended application list 1450 is selected and dragged to the left using the pointer 2105 that is controlled by a movement of the remote controller 2100, all displayed icons may be scrolled across the display. If additional application icons are available off-screen, icons next in line may be scrolled into and newly displayed on the display 180.

Figure 27C:
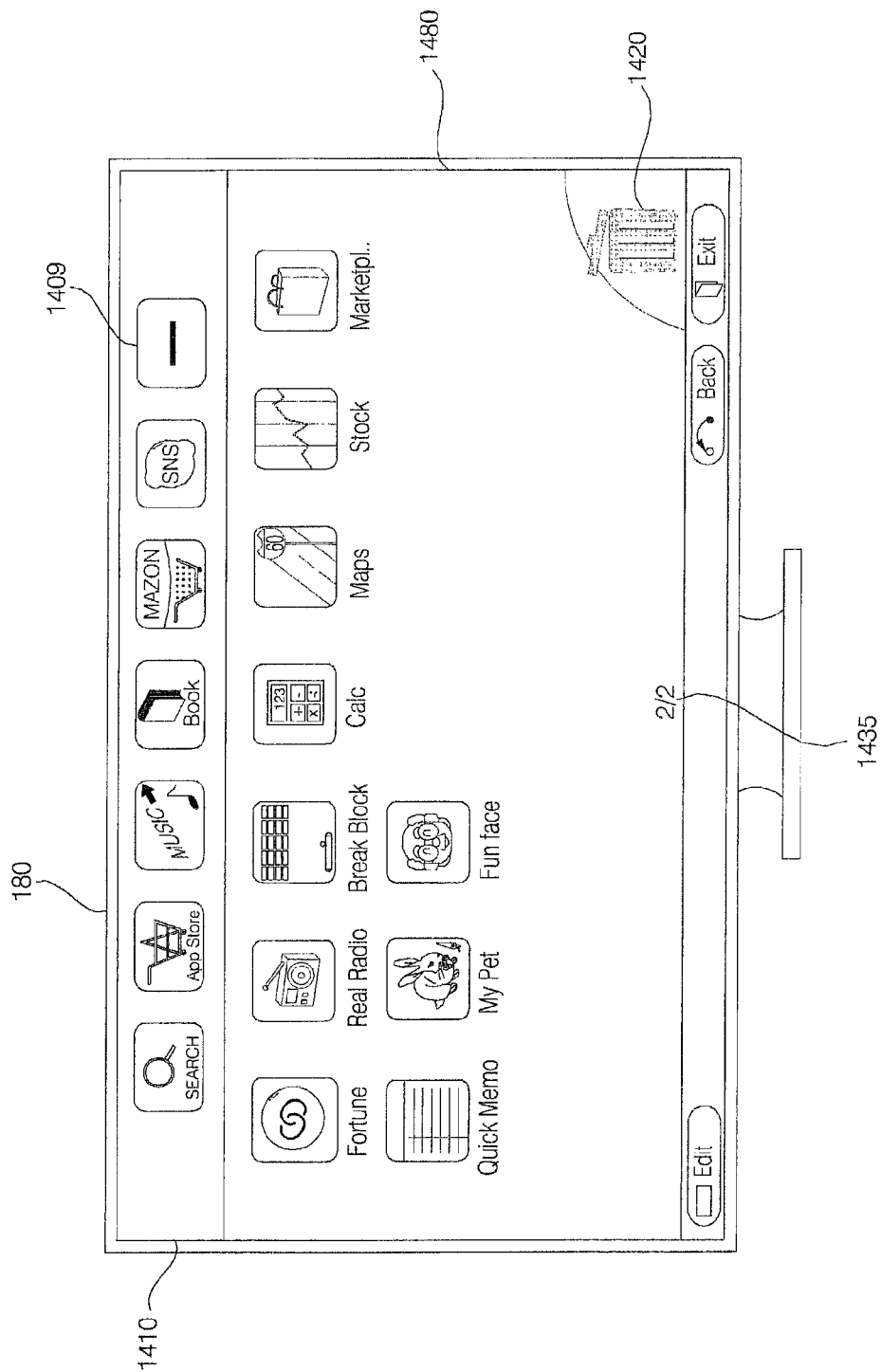

A width $L_6$ may represent a portion of the new application icon which is newly displayed on the display 180. The drag operation may be performed in a state in which the button 2103 on the remote controller 2100 is pressed. The controller 170 may determine whether the width $L_6$ is greater than or equal to the reference value $L_{TH6}$ upon scrolling the full application list 1400. If the width $L_6$ is greater than or equal to the reference value $L_{TH6}$, as shown in FIG. 27B, a new extended application list 1480 may be displayed, as shown in FIG. 27C. For example, when a scrolling input causes a new application icon to be partially displayed by more than a predetermined threshold, all displayed application icons in the extended application list 1450 may be replaced with additional application icons. As shown in FIG. 27C, the new full application list 1400 may include the compact-view application list 1410 and a new extended application list 1480.

FIG. 27D illustrates scrolling a portion of the application menu list. In this embodiment, specific application icons may be replaced rather than replacing all displayed icons. As shown in FIG. 27D, the application icons may be scrolled by three columns of application icons to display the extended application list 1490. For example, when the scrolling operation causes a new application icon to be displayed by more than a predetermined threshold, the application icons may be scrolled to display three new columns of application icon, replacing the first three columns of application icons. It should be appreciated that the number of columns that is replaced may be changed.

In this embodiment, the predetermined threshold may be set to various values that correspond to various scrolling operations. For example, the threshold may also be set to half the width of the extended application list window such that if the application icons are scrolled a distance greater than half of the window, all of the displayed application icons are replaced with new application icons, e.g., a new page is scrolled onto the display.

The application icon may also be scrolled manually to display any user selected column. For example, when the button 2103 on the remote controller is released while scrolling the application icons across the page, if any icon is partially displayed at that time, the controller may determine whether the partially displayed portion of that icon is greater than or equal to the predetermined threshold value. If so, that particular column of application icons may be automatically displayed (e.g., snap to grid) and a corresponding number of columns of icons at the opposite side of the window may be scrolled off the screen. In this way, the user may manually scroll through all available icons to display the desired icons. Thus, a flip-through operation may be performed.

In one embodiment, each row of application icons in the extended application menu 1450 may be scrolled individually. When a particular application icon is scrolled across the screen, the entire row may also be scrolled. However, the other rows of application icons may remain unchanged. For example, when icon "Feel IM" is scrolled to the left, the entire first row may be scrolled. When the "Real Radio" icon is partially displayed by more than a predetermined amount, the displayed application icons may be automatically scrolled as previously described (e.g., entire row replaced, one icon replaced, etc.). Here, the second and third rows may remain unchanged. It should be apparent that this method of scrolling may be applied to any of the previously described embodiments. For example, one column of card objects, as shown in FIG. 25C, may be scrolled vertically, independent of the other column of card objects. Also, if the home page as previously disclosed includes multiple rows of card objects, each row may be individually scrolled in the horizontal direction.

Moreover, as previously described, a card object displayed on a home screen may include a lock setting to fix a position and/or size of the card object. For example, the Broadcast card object 2010 may be locked such that the displayed video may continue to be viewed. If the Broadcast card object 2010 is not locked, it may be resized, moved, scrolled, or otherwise manipulated in the same manner as other objects, as the previously described. Moreover, any one of the other card objects, icons, thumbnails, or other disclosed objects may be locked on the home screen or menu screen. As an example, if the "Music" application icon, as shown in FIG. 27D is locked, the position and/or size of this icon may be fixed on the extended application list 1409. Hence, other icons may be scrolled independently of the "Music" icon and will not affect the position or display of this icon.

Figure 28A:
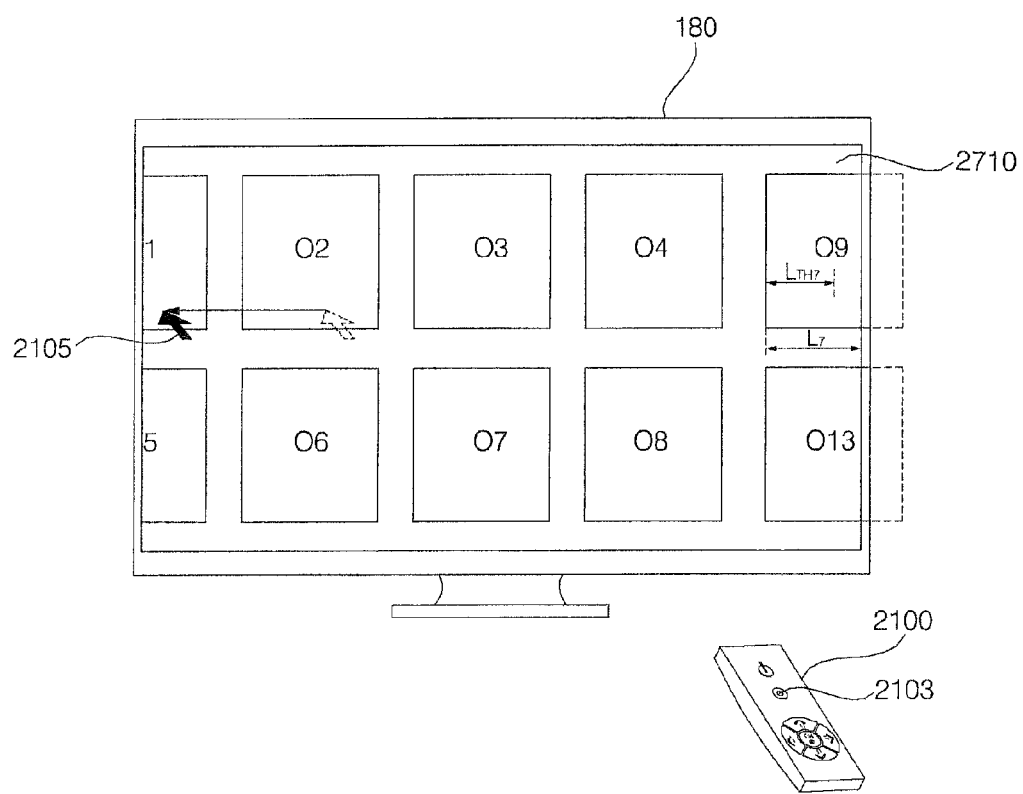
FIGS. 28A to 30B show schematic views of a display screen to illustrate a movement or replacement of displayed objects according to a drag operation.

FIGS. 28A to 30B show schematic views of a display screen to illustrate a movement or replacement of displayed objects according to a drag operation. Referring to FIG. 28A, a point within a first object list 2710 may be selected and dragged to the left using a pointer 2105 displayed in correspondence with a movement of the remote controller 2100. Here, a plurality of objects O1 to O8 may be displayed on the display 180. A second object list 2720 may be hidden from view and configured to be displayed after the first object list 2710. When the first object list 2710 is scrolled, some of the items within a second object list 2720 subsequent to the first object list 2710 may be newly displayed on the display 180.

A width $L_7$ may represent a width of a displayed portion of the newly displayed item of the second object list 2720. The drag operation may be performed in a state in which a button 2103 on the remote controller 2100 is pressed.

Figure 28B:
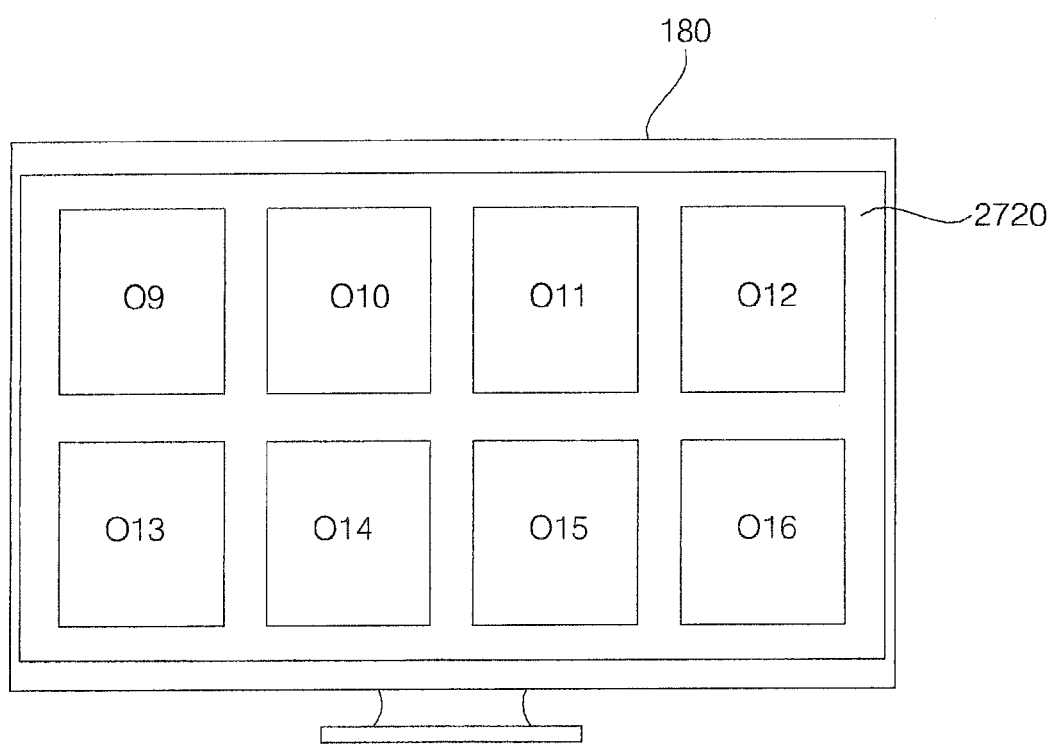

The controller 170 may determine whether the width $L_7$ is greater than or equal to a reference value while scrolling through the full application list 1400. If the width $L_7$ is equal to or greater than the reference value, the second object list 2720 including a plurality of objects O$_9$ to O16 may be displayed, as shown in FIG. 28B. Thus, the user may easily check other object items. The controller 170 may be configured to determine whether to automatically scroll the object when the button 2103 is released, or when the objects are scrolled more than the reference value. Moreover, in one embodiment, $L_7$ may also be configured to be a distance of the scroll operation, e.g., a coordinate change in the pointer irrespective of the amount in which the new icon is displayed.

Figure 29A:
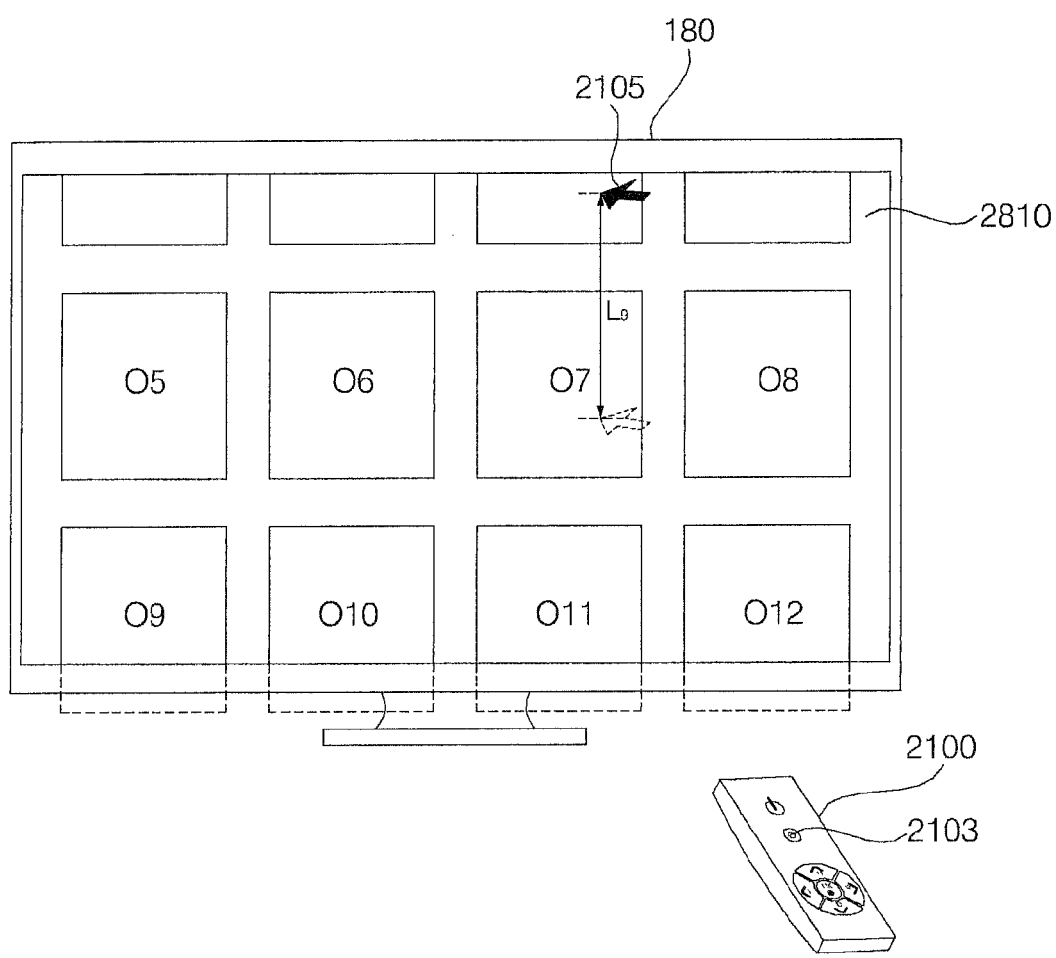
Figure 29B:
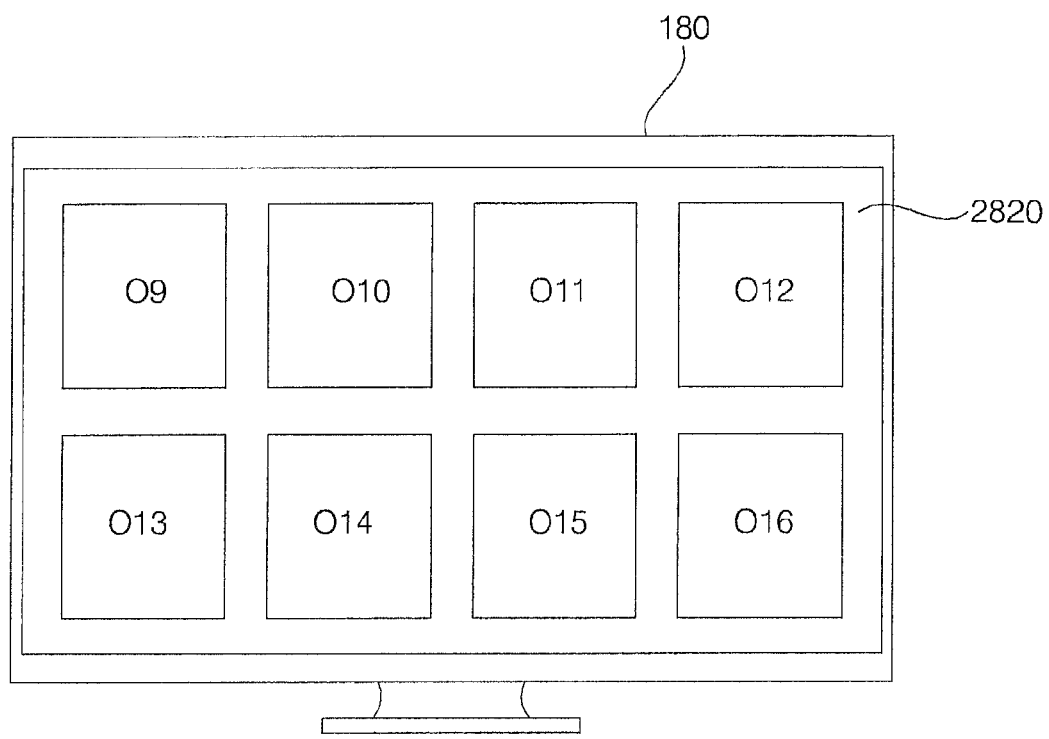

The embodiment of FIGS. 29A to 29B is similar to the embodiment of FIGS. 28A to 28B, except that the drag operation is performed vertically instead of horizontally. The reference value may be changed according to the drag direction. If a vertical distance $L_9$ is equal to or greater than the reference value, a first object list 2810 shown in FIG. 29A may be replaced with a second object list 2820, as shown in FIG. 29B.

Figure 30A:
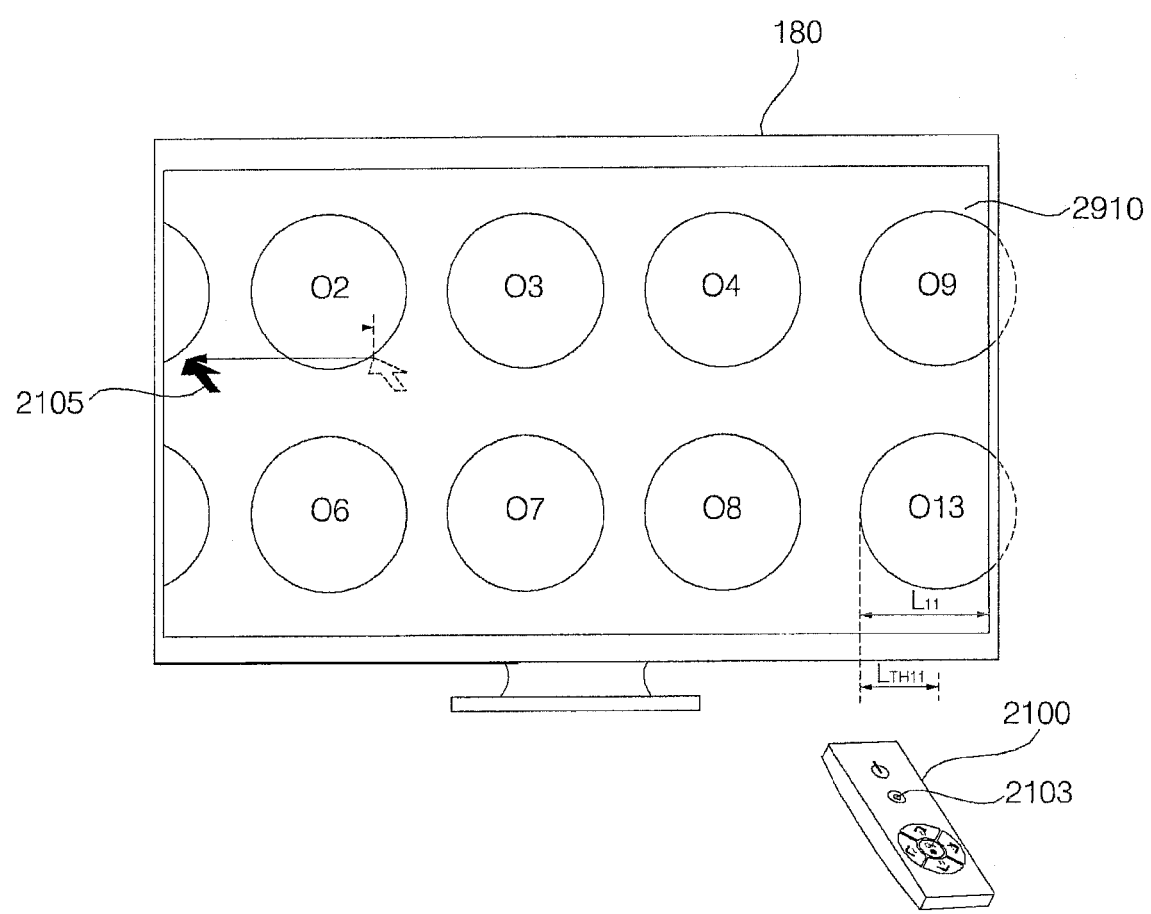
Figure 30B:
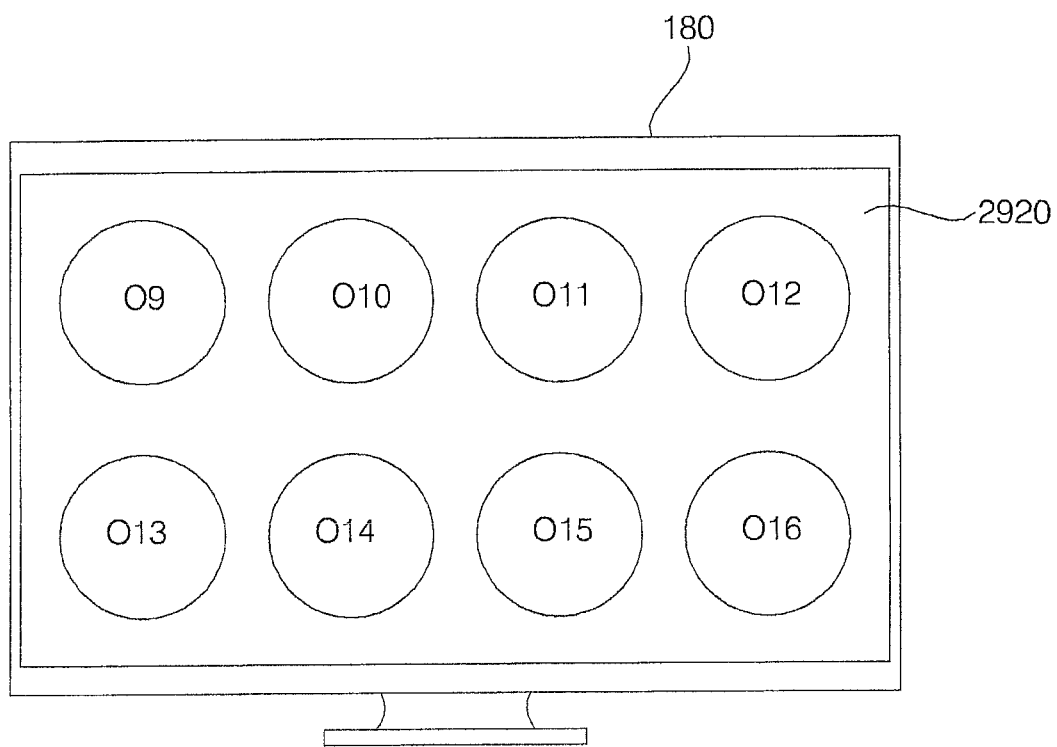

The embodiment as shown in FIGS. 30A to 30B is similar to the embodiment of FIGS. 28A to 28B, respectively, as previously described. Hence, repetitive description is omitted hereinbelow. While the shape of the objects are rectangular as shown in FIGS. 28 to 29, the shape of the objects may be circular in this embodiment, as shown in FIG. 30A. Moreover, various other shapes of the objects are also possible.

At this time, if a width $L_{11}$ that represents a partially displayed portion of an item O9 or O13 within the second object list 2920 that is newly displayed on the display 180 is greater than or equal to a reference value, a first object list 2910 may be replaced with a second object list 2920, as shown in FIG. 30B. Moreover, the first object list 2910 may be replaced with the second object list based on a partially display area of the newly displayed object O9 or O13. If the display of the objects are changed based on the display area, the reference value may be changed according to the shape of the object.

In one embodiment, a multifunctional display apparatus as broadly disclosed herein may include a receiver configured to receive a video signal; a network interface configured to receive data packets; a display module; a wireless input interface to receive signals from a remote controller; a storage device to store data; and a processor configured to control the display module based on a signal from the remote controller. In this embodiment, a video image received from the video signal may be displayed in a first area of the display module. A first card object may be displayed in a second area of the display module and a second card object may be displayed in a third area of the display module. The first and second card objects may include at least one link for connecting to a content provider or to a storage device or at least one link for retrieving the video image. Moreover, the first or second card objects may be scrolled across the display module to cause a third card object to be scrolled onto the display, the third card object being displayed in the second or third areas of the display if the third card object is scrolled onto the display module a prescribed amount.

In this embodiment, when the third card object is scrolled onto the display module the prescribed amount, the third card object may be displayed in the second area of the display and a fourth card object is displayed in the third area of the display, wherein the first and second card objects may be scrolled off the display module as the third and fourth card objects are scrolled into the second and third areas of the display such that the first and second card objects are no longer displayed.

In this multifunctional display apparatus, when the third card object may be scrolled onto the display module the prescribed amount, the second card object may be scrolled into the second area of the display and the third card object may be scrolled into the third area of the display module. The prescribed amount may be a prescribed distance or a prescribed area. The prescribed distance may be half of a width of the third card object and the prescribed area is half of an area of the third card object.

Moreover, the prescribed amount may be prestored in a preference setting of the multifunctional display device. An input to scroll the second card object may cause the first and third card objects to be scrolled on the display with the second card object. The video image displayed in the first area of the display module may be configured to be fixed on the display such that the video image is not moved when the first or second card object is scrolled across the display. Moreover, the first card object may be configured to be fixed on the display such that the first card object is not moved when the second card object is scrolled across the display.

The controller may be configured to reduce the size of the first area for displaying the video image, wherein the reducing the size of the first area reconfigures the display module to include a third area on the display module for displaying an additional card object. Moreover, the input may be a click and drag input to move the first card object across the display a first distance. The first card object may be scrolled using a pointer controlled by the remote controller and the remote controller may include a sensor to detect a motion of the remote controller, wherein the pointer may be configured to move on the display module to correspond to the movement of the remote controller. Here, the first card object may be scrolled across the display in a vertical or horizontal direction on the display.

In this multifunctional display apparatus, the at least one link for connecting to a content provider or to a storage device may include a URL configured to retrieve a multimedia content stored on the content server. The at least one link to retrieve the video signal may correspond to a channel in a broadcast signal, wherein a selection of the at least one link tunes the receiver to the channel. Moreover, the video image displayed in the area may be at least one of a broadcast video received at a tuner provided in the multifunctional display device, a streaming video received at a network interface provided in the multifunctional display device, or a video stored on a storage device provided in the multifunctional display device.

In one embodiment, a method of controlling a display on a multifunctional display device may include displaying a video image in a first area of the display; displaying a first card object in a second area of the display, the first card object having at least one link for connecting to a content provider or to a storage device; displaying a second card object in a third area of the display, the second card object having at least one link to tune to one or more channels of a broadcast signal or a network; scrolling the first or second card objects across the display, wherein the scrolling the first or second card objects causes a third card object to be scrolled onto the display; and displaying the third card object in the third area of the display if the fourth card object is scrolled onto the display a prescribed amount, and displaying the second card object in the second area of the display.

In one embodiment, a method of controlling a display on a multifunctional display device may include displaying a video image on the display; changing the displayed image to display a multifunctional menu screen on the display, wherein the multifunctional menu screen includes a first area configured to display a scaled image of the video image, a second area configured to display a plurality of application icons, and a third area configured to display a plurality of card objects that includes one or more links for connecting to a content server or to a storage device or for tuning the multifunctional display device to one or more channels of a broadcast signal; receiving an input from a motion sensing remote controller to scroll one of the displayed card objects by a prescribed amount; and scrolling a plurality of additional card objects onto the display to replace the plurality of displayed card objects in response to the input to scroll the one card object, wherein the scaled image displayed in the first area and the plurality of icons displayed in the second area remain stationary while the card objects are scrolled in the third area.

In accordance with an aspect of the present disclosure, a method for operating an image display apparatus may include displaying a home screen including a plurality of card objects on a display, moving and displaying a dragged card object by a drag input if a first-direction drag input for any one of the plurality of card objects displayed on the home screen is received, and moving the dragged card object to a position corresponding to a first direction and displaying the card object at the first position or replacing the dragged card object with another card object, if a first-direction length or a display area of a card object additionally moved to and displayed on the display is equal to or greater than a predetermined value.

In accordance with another aspect of the present disclosure, a method for operating an image display apparatus may include displaying a first list including a plurality of objects on a display, moving and displaying a dragged first list or dragged object if a first-direction drag input for a first list or a predetermined object of the first list is received, and displaying a second list including a plurality of objects at a position corresponding to a first direction if a first-direction length or a display area of an object additionally moved to and displayed on the display is equal to or greater than a predetermined value.

In accordance with a further aspect of the present disclosure, an image display apparatus configured to receive and process a broadcast image may include a display configured to display a home screen including a plurality of card objects, and a controller configured to move and display a dragged card object by a drag input if a first-direction drag input for any one of the plurality of card objects displayed on the home screen is received, and to move the dragged card object to a position corresponding to a first direction and to display the card object at the position or to replace the dragged card object with another card object, if a first-direction length or a display area of a card object additionally moved to and displayed on the display is equal to or greater than a predetermined value.

According to the embodiments of the present disclosure, it may be possible to move or replace a card object by dragging any one of a plurality of card objects displayed on a home screen. In particular, since the card object is moved to a position corresponding to a drag direction or replaced if a first-direction length or a display area of a card object additionally moved to and displayed on a display is equal to or greater than a predetermined value, a user can readily move or replace the card object. In addition, it may be possible to easily display hidden separate cards on the home screen.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multifunctional display apparatus, comprising:
   a receiver configured to receive a video signal;
   a network interface configured to receive data packets;
   a display module;
   a wireless input interface to receive signals from a remote controller;
   a storage device to store data; and
   a processor configured to control the display module based on a signal from the remote controller, wherein
   a video image received from the video signal is displayed in a first area of the display module,
   a first card object is displayed in a second area of the display module and a second card object is displayed in a third area of the display module, the first and second card objects including at least one link for connecting to a content provider or to a storage device or at least one link for retrieving the video image, and
   the first or second card objects are scrolled across the display module to cause a third card object to be scrolled onto the display, the third card object being displayed in the second or third areas of the display if the third card object is scrolled onto the display module a prescribed amount,
   wherein the prescribed amount is prestored in a preference setting of the multifunctional display device.

2. The multifunctional display apparatus of claim 1, wherein, when the third card object is scrolled onto the display module the prescribed amount, the third card object is displayed in the second area of the display and a fourth card object is displayed in the third area of the display.

3. The multifunctional display apparatus of claim 2, wherein the first and second card objects are scrolled off the display module as the third and fourth card objects are scrolled into the second and third areas of the display such that the first and second card objects are no longer displayed.

4. The multifunctional display apparatus of claim 1, wherein, when the third card object is scrolled onto the display module the prescribed amount, the second card object is scrolled into the second area of the display and the third card object is scrolled into the third area of the display module.

5. The multifunctional display apparatus of claim 1, wherein the prescribed amount is a prescribed distance or a prescribed area.

6. The multifunctional display apparatus of claim 5, wherein the prescribed distance is half of a width of the third card object and the prescribed area is half of an area of the third card object.

7. The multifunctional display apparatus of claim 1, wherein an input to scroll the second card object causes the first and third card objects to be scrolled on the display with the second card object.

8. The multifunctional display apparatus of claim 1, wherein the video image displayed in the first area of the display module is configured to be fixed on the display such that the video image is not moved when the first or second card object is scrolled across the display.

9. The multifunctional display apparatus of claim 1, wherein the first card object is configured to be fixed on the display such that the first card object is not moved when the second card object is scrolled across the display.

10. The multifunctional display apparatus of claim 1, wherein the controller is configured to reduce the size of the first area for displaying the video image, wherein the reducing the size of the first area reconfigures the display module to include a third area on the display module for displaying an additional card object.

11. The multifunctional display apparatus of claim 1, wherein the input is a click and drag input to move the first card object across the display a first distance.

12. The multifunctional display apparatus of claim 1, wherein the first card object is scrolled using a pointer controlled by the remote controller.

13. The multifunctional display apparatus of claim 1, wherein the remote controller includes a sensor to detect a motion of the remote controller, and wherein the pointer is configured to move on the display module to correspond to the movement of the remote controller.

14. The multifunctional display apparatus of claim 1, wherein the first card object is scrolled across the display in a vertical or horizontal direction on the display.

15. The multifunctional display apparatus of claim 1, wherein the at least one link for connecting to a content provider or to a storage device includes a URL configured to retrieve a multimedia content stored on the content server.

16. The multifunctional display apparatus of claim 1, wherein the at least one link to retrieve the video signal corresponds to a channel in a broadcast signal, and wherein a selection of the at least one link tunes the receiver to the channel.

17. The multifunctional display apparatus of claim 1, wherein the video image displayed in the area is at least one of a broadcast video received at a tuner provided in the multifunctional display device, a streaming video received at a network interface provided in the multifunctional display device, or a video stored on a storage device provided in the multifunctional display device.

18. A method of controlling a display on a multifunctional display device, comprising:
   displaying a video image in a first area of the display;
   displaying a first card object in a second area of the display, the first card object having at least one link for connecting to a content provider or to a storage device;
   displaying a second card object in a third area of the display, the second card object having at least one link to tune to one or more channels of a broadcast signal or a network;
   scrolling the first or second card objects across the display, wherein the scrolling the first or second card objects causes a third card object to be scrolled onto the display; and displaying the third card object in the third area of the display if the fourth card object is scrolled onto the display a prescribed amount, and displaying the second card object in the second area of the display, wherein the prescribed amount is prestored in a preference setting of the multifunctional display decive.

19. A method of controlling a display on a multifunctional display device, comprising:

displaying a video image on the display;

changing the displayed image to display a multifunctional menu screen on the display, wherein the multifunctional menu screen includes a first area configured to display a scaled image of the video image, a second area configured to display a plurality of application icons, and a third area configured to display a plurality of card objects that includes one or more links for connecting to a content server or to a storage device or for tuning the multifunctional display device to one or more channels of a broadcast signal;

receiving an input from a motion sensing remote controller to scroll one of the displayed card objects by a prescribed amount; and scrolling a plurality of additional card objects onto the display to replace the plurality of displayed card objects in response to the input to scroll the one card object, wherein the scaled image displayed in the first area and the plurality of icons displayed in the second area remain stationary while the card objects are scrolled in the third area.

* * * * *